United States Patent
Czinger et al.

(10) Patent No.: US 10,960,929 B2
(45) Date of Patent: Mar. 30, 2021

(54) SYSTEMS AND METHODS FOR VEHICLE SUBASSEMBLY AND FABRICATION

(71) Applicant: Divergent Technologies, Inc., Los Angeles, CA (US)

(72) Inventors: Kevin R. Czinger, Greenwich, CT (US); William Bradley Balzer, Santa Monica, CA (US); Praveen Varma Penmetsa, Long Beach, CA (US); Zachary Meyer Omohundro, Hermosa Beach, CA (US); Matthew M. O'Brien, Hermosa Beach, CA (US); Broc William Tenhouten, Granada Hills, CA (US); Richard W. Hoyle, Clarkston, MI (US)

(73) Assignee: Divergent Technologies, Inc., Los Angeles, CA (US)

( * ) Notice: Subject to any disclaimer, the term of this patent is extended or adjusted under 35 U.S.C. 154(b) by 0 days.

(21) Appl. No.: 15/253,826

(22) Filed: Aug. 31, 2016

(65) Prior Publication Data

US 2017/0050677 A1    Feb. 23, 2017

Related U.S. Application Data

(63) Continuation-in-part of application No. 14/788,154, filed on Jun. 30, 2015, now Pat. No. 9,975,179.

(Continued)

(51) Int. Cl.
*B62D 27/02* (2006.01)
*B62D 23/00* (2006.01)
(Continued)

(52) U.S. Cl.
CPC ............ *B62D 21/17* (2013.01); *B22F 3/1055* (2013.01); *B22F 5/10* (2013.01); *B22F 7/08* (2013.01);
(Continued)

(58) Field of Classification Search
CPC .............................. B62D 23/005; B62D 27/023
See application file for complete search history.

(56) References Cited

U.S. PATENT DOCUMENTS

| 2,421,351 A | 5/1947 | Page |
| 3,292,969 A | 12/1966 | Eggert, Jr. |

(Continued)

FOREIGN PATENT DOCUMENTS

| CA | 2818928 A1 | 6/2012 |
| CN | 87102543 A | 10/1988 |

(Continued)

OTHER PUBLICATIONS

Tube defined: https://www.dictionary.com/browse/tube (Year: 2018).*

(Continued)

*Primary Examiner* — Hilary L Gutman
(74) *Attorney, Agent, or Firm* — Arent Fox LLP

(57) ABSTRACT

A vehicle chassis is provided. The vehicle chassis may comprise one or more vehicle chassis modules or chassis substructures that are formed from a plurality of customized chassis nodes and connecting tubes. The customized chassis nodes and connecting tubes may be formed of one or more metal and/or non-metal materials. The customized chassis nodes may be formed with connecting features to which additional vehicle panels or structures may be permanently or removeably attached. The vehicle chassis modules or chassis substructures may be interchangeably and removeably connected to provide a vehicle chassis having a set of predetermined chassis safety or performance characteristics.

4 Claims, 41 Drawing Sheets

Related U.S. Application Data

(60) Provisional application No. 62/255,372, filed on Nov. 13, 2015, provisional application No. 62/212,556, filed on Aug. 31, 2015, provisional application No. 62/020,084, filed on Jul. 2, 2014.

(51) Int. Cl.
| | | |
|---|---|---|
| *B62D 21/17* | (2006.01) | |
| *B22F 5/10* | (2006.01) | |
| *B33Y 10/00* | (2015.01) | |
| *B33Y 80/00* | (2015.01) | |
| *B22F 3/105* | (2006.01) | |
| *B62D 29/04* | (2006.01) | |
| *B62D 29/00* | (2006.01) | |
| *B22F 7/08* | (2006.01) | |

(52) U.S. Cl.
CPC .............. *B33Y 10/00* (2014.12); *B33Y 80/00* (2014.12); *B62D 23/005* (2013.01); *B62D 27/023* (2013.01); *B62D 27/026* (2013.01); *B62D 29/005* (2013.01); *B62D 29/046* (2013.01); *B62D 29/048* (2013.01); *B22F 2003/1057* (2013.01)

(56) References Cited

U.S. PATENT DOCUMENTS

| | | | |
|---|---|---|---|
| 3,665,670 A | 5/1972 | Rummler | |
| 3,756,635 A | 9/1973 | Beers | |
| 4,259,821 A | 4/1981 | Bush | |
| 4,557,097 A | 12/1985 | Mikulas, Jr. | |
| 4,583,755 A | 4/1986 | Diekman | |
| 4,618,163 A * | 10/1986 | Hasler | B62D 23/005 280/785 |
| 4,660,345 A | 4/1987 | Browning | |
| 4,721,407 A * | 1/1988 | Liu | B62K 19/22 403/198 |
| 4,735,355 A | 4/1988 | Browning | |
| 4,804,209 A | 2/1989 | Fischer | |
| 4,950,522 A * | 8/1990 | Vogt | B62D 25/105 296/191 |
| 5,116,071 A | 5/1992 | Calfee | |
| D331,378 S | 12/1992 | Muller | |
| 5,262,121 A * | 11/1993 | Goodno | B29C 33/3821 156/156 |
| 5,272,805 A | 12/1993 | Akeel et al. | |
| 5,346,237 A | 9/1994 | Wang | |
| 5,458,393 A * | 10/1995 | Benedyk | B62D 23/005 296/203.01 |
| 5,478,100 A | 12/1995 | McDermitt, Jr. | |
| 5,720,092 A | 2/1998 | Ni et al. | |
| 5,720,511 A | 2/1998 | Benedyk | |
| 5,848,853 A | 12/1998 | Clenet | |
| 5,917,726 A | 6/1999 | Pryor | |
| 5,944,441 A | 8/1999 | Schutze | |
| 6,010,182 A | 1/2000 | Townsend | |
| 6,170,596 B1 | 1/2001 | Triarsi et al. | |
| 6,247,869 B1 | 6/2001 | Lichvar | |
| 6,349,237 B1 | 2/2002 | Koren et al. | |
| 6,357,822 B1 * | 3/2002 | Panoz | B62D 21/157 296/187.12 |
| 6,412,857 B2 | 7/2002 | Jaekel | |
| 6,470,990 B1 | 10/2002 | Panoz | |
| 6,630,093 B1 * | 10/2003 | Jones | B29C 70/088 264/136 |
| 6,665,935 B2 * | 12/2003 | Panoz | B62D 23/00 280/785 |
| 7,000,936 B2 | 2/2006 | Schmider | |
| 7,044,535 B2 | 5/2006 | Durand | |
| 7,133,812 B1 | 11/2006 | Weber | |
| 7,270,346 B2 | 9/2007 | Rowe et al. | |
| 7,341,285 B2 | 3/2008 | McPherson | |
| 7,552,569 B2 | 6/2009 | Rotherroe | |
| 8,070,216 B2 | 12/2011 | Defoy et al. | |
| 8,317,257 B2 | 11/2012 | Rolfe et al. | |
| 8,528,291 B2 | 9/2013 | Allred et al. | |
| 8,530,015 B2 * | 9/2013 | Mendiboure | B62D 29/002 296/187.02 |
| 8,544,587 B2 | 10/2013 | Holroyd et al. | |
| 8,590,654 B2 | 11/2013 | Kerner et al. | |
| 8,998,307 B1 * | 4/2015 | Joyce | B62D 29/008 296/193.12 |
| 9,567,013 B2 | 2/2017 | Ehrlich et al. | |
| 9,975,179 B2 | 7/2018 | Czinger et al. | |
| 10,174,621 B2 * | 1/2019 | Burd | B22F 5/04 |
| 2002/0043814 A1 * | 4/2002 | Weiman | B62D 21/09 296/29 |
| 2002/0050064 A1 * | 5/2002 | Furuse | B62D 23/005 29/897.2 |
| 2003/0102668 A1 | 6/2003 | Tarbutton et al. | |
| 2003/0230443 A1 | 12/2003 | Cramer et al. | |
| 2005/0046166 A1 | 3/2005 | Reim et al. | |
| 2005/0138885 A1 | 6/2005 | Rotherroe | |
| 2005/0280185 A1 | 12/2005 | Russell et al. | |
| 2007/0222257 A1 * | 9/2007 | Flendrig | B60J 5/0405 296/146.6 |
| 2007/0246972 A1 * | 10/2007 | Favaretto | B62D 23/005 296/205 |
| 2009/0014121 A1 | 1/2009 | McPherson | |
| 2010/0288569 A1 | 11/2010 | Fish | |
| 2011/0158741 A1 * | 6/2011 | Knaebel | B62D 23/005 403/265 |
| 2011/0167758 A1 | 7/2011 | Daadoush | |
| 2012/0090770 A1 * | 4/2012 | Cavaliere | B29C 70/30 156/172 |
| 2013/0081249 A1 * | 4/2013 | McLean | A47F 5/0846 29/428 |
| 2013/0160295 A1 | 6/2013 | Das et al. | |
| 2014/0023812 A1 | 1/2014 | Hammer et al. | |
| 2014/0241790 A1 | 8/2014 | Woleader et al. | |
| 2015/0052025 A1 | 2/2015 | Apsley et al. | |
| 2015/0115665 A1 * | 4/2015 | Joyce | B21D 11/10 296/210 |
| 2016/0016229 A1 | 1/2016 | Czinger et al. | |
| 2016/0061381 A1 | 3/2016 | Kotliar | |
| 2016/0238324 A1 * | 8/2016 | Butcher | B29D 23/00 |
| 2016/0297479 A1 * | 10/2016 | Ritschel | B62D 25/06 |
| 2016/0346997 A1 * | 12/2016 | Lewis | B29C 67/0055 |
| 2017/0057558 A1 * | 3/2017 | Hillebrecht | B62D 21/02 |
| 2017/0080673 A1 * | 3/2017 | Schaedler | B32B 3/12 |

FOREIGN PATENT DOCUMENTS

| | | |
|---|---|---|
| CN | 1590185 A | 3/2005 |
| CN | 201400267 Y | 2/2010 |
| CN | 201484210 U | 5/2010 |
| CN | 103341625 A | 10/2013 |
| CN | 103 465 636 A | 12/2013 |
| CN | 103895717 A | 7/2014 |
| CN | 203887169 U | 10/2014 |
| CN | 104 590 397 A | 5/2015 |
| CN | 105501299 A | 4/2016 |
| CN | 207072403 U * | 3/2018 |
| DE | 4423642 C1 | 10/1995 |
| DE | 19929057 A1 | 12/2000 |
| DE | 10309631 A1 | 9/2004 |
| DE | 102010033289 A1 | 2/2012 |
| DE | 201620105052 U1 | 4/2017 |
| EP | 0230611 A2 | 8/1987 |
| EP | 0450358 A1 | 10/1991 |
| EP | 3135566 A1 | 8/2015 |
| FR | 940982 A | 12/1948 |
| FR | 2941166 A1 | 7/2010 |
| JP | H04021759 Y2 | 5/1992 |
| JP | 2004216425 A | 8/2004 |
| JP | 2011213312 A | 10/2011 |
| KR | 20160056634 A | 5/2016 |
| WO | WO-9949150 A1 | 9/1999 |
| WO | WO-0129143 A1 | 4/2001 |
| WO | WO-02090146 A2 | 11/2002 |
| WO | 2012166505 A1 | 12/2012 |

(56) References Cited

FOREIGN PATENT DOCUMENTS

| WO | 2014028169 | A2 | | 2/2014 | |
|---|---|---|---|---|---|
| WO | 2015089315 | A1 | | 6/2015 | |
| WO | WO-2015118268 | A1 | * | 8/2015 | ........... B62D 25/105 |
| WO | 2015175892 | A1 | | 11/2015 | |

OTHER PUBLICATIONS

Medial axis tree—an internal supporting structure for 3D printing, Mar. 25, 2015: https://www.sciencedirect.com/science/article/pii/S0167839615000357 (Year: 2015).*
The investigation of a method to generate conformal lattice structures; Nov. 17, 2011; https://dspace.lboro.ac.uk/dspace-jspui/bitstream/2134/9146/1/Thesis-2011-Craddock.pdf (Year: 2011).*
Intralattice; Aug. 31, 2015; http://www.intralatticepro.com/documentation/userdocs_V8/ (Year: 2015).*
Design and optimization of lattice structures; Jun. 23, 2015; https://insider.altairhyperworks.com/design-and-optimization-of-lattice-structures-for-3d-printing-using-altair-optistruct/ (Year: 2015).*
Altair Optistruct Revolutionizes Lattice Structures; Feb. 26, 2015 (Year: 2015).*
Carbon fiber race car technology hits the streets. Published online Jul. 1, 2005. Accessed Oct. 5, 2015. http://www.compositesworld.com/articles/carbon-fiber-race-car-technology-hits-the-streets.
Chalcraft; E., "Road-ready 3D-printed car on the way. Published Mar. 7, 2013; Accessed Jul. 8, 2015. http://www.dezeen.com/2013/03/07/road-ready-3d-printed-car-on-the-way/".
George; A., "The Germans Have Figured Out How to 3-D Print Cars. Published Mar. 19, 2014; Accessed Jul. 8, 2015. http://www.wired.com/2014/03/edag-3-d-printed-car/".
3D Printing Transforms The Automotive Industry. Published Jan. 20, 2016; Accessed Dec. 27, 2016. https://www.sculpteo.com/blog/2016/01/20/3d-printing-transforms-the-automotive-industry.
Design Democracy: Drones Meet 3D Printed Cars For A Self-Driven Future. Published Nov. 9, 2016; Accessed Dec. 27, 2016. https://3dprintingindustry.com/news/design-democracy-drones-meet-3d-printed-cars-self-driven-future-98125/.
LM3D Home Page. Published 2015; Accessed Dec. 27, 2016. https://localmotors.com/3d-printed-car/.
Stratasys Automotive Website. Published 2016; Accessed Dec. 27, 2016. http://www.stratasys.com/industries/automotive.
Architecture>Grasshopper (online). Andrea Springer, 2013. Accessed Oct. 21, 2015. Retrieved from the internet: http://www.andreaspringerstudio.com/architecture/grasshopper/.
Coldewey, D.,Fine Ride: World's First 3-D Printed Bike Frame Weighs Just 3 Pounds. Published Feb. 14, 2014; Accessed Jul. 8, 2015. http://www.nbcnews.com/tech/innovation/fine-ride-worlds-first-3-d-printed-bike-frame-weighs-n30761.
Flying Machine Website.,3D Printed Titanium: Bike of the Future. Accessed Jul. 8, 2015. http://www.flyingmachine.com.au/3d-printed-titanium-bike-of-the-future/.
International search report and written opinion dated Aug. 24, 2015 for PCT Application No. US2015/030996.
International search report and written opinion dated Sep. 20, 2016 for PCT Application No. PCT/US2016/035893.
International search report and written opinion dated Oct. 6, 2015 for PCT Application No. US2015/038449.
Androole.,Custom 3D Printed Carbon Fiber Bike Frame. Accessed Jul. 8, 2015. http://www.instructables.com/id/Custom-3D-Printed-Carbon-Fiber-Bike-Frame/.
Extended European Search Report and European Search Opinion dated Jan. 18, 2018, regarding EP15815934.
Anonymous: "Lightweight Bike Stem using metal Additive Manufacturing", Feb. 10, 2012 (Feb. 10, 2012), XP055442489, Retrieved from the Internet: URL:https://www.3trpd.co.uk/portfolio/lightweight-bike-stem-using-metal-am/gallery/c onsumer-goods-case-studies/ [retrieved on Jan. 19, 2018], the whole document.
Jey Won et al: "Rapid prototyping of robotic systems", Proceedings of the 2000 IEEE International Conference on Robotics and Automation. ICRA 2000. San Francisco, CA, Apr. 24-28, 2000; [Proceedings of the IEEE International Conference on Robotics and Automation], New York, NY : IEEE, US, Apr. 24, 2000 (Apr. 24, 2000), pp. 3077-3082, XP002233177, ISBN: 978-0-7803-5887-4, p. 1, col. 2; figures 1-7.
Shury, John: "This 3D Printed Carbon Fibre Car Wants to Reinvent Manufacturing", In Composites Today [online], Jul. 16, 2015 [retrieved on Oct. 21, 2016], retrieved from the internet: <URL: http://www.compositestoday.com/2015/07/ths-3d-printed-carbon-fibre-car-wants-to-reinvent-manufacturing/>, see the entire document.
Written Opinion dated Mar. 8, 2018, regarding Singapore Application No. 11201610967.
George, A., "3-D Printed Car is as Strong as Steel, Half the Weight, and Nearing Production," Published Feb. 27, 2013; Accessed Jul. 8, 2015, http//www.wired.com/2013/02/3d-printedcar/. (Examiner crossed through above reference in Jan. 11, 2017 IDS. Applicant now providing updated NPL.).
3D Prints of the World Website, Accessed Jul. 8, 2015, http://3dprintsoftheworld.com/object/viz-1-tack-bike-frame-3d-printed-lugs. (Examiner crossed through above reference in Jan. 11, 2017 IDS. Applicant now providing updated NPL.).
International Search Report and Written Opinion dated Nov. 21, 2016, regarding PCT Application No. PCT/US2016/049796. (Examiner crossed through above reference in previously filed IDS. Applicant now providing updated NPL.).
First Office Action dated Aug. 10, 2018, regarding China Application No. CN201580047291.2.
Supplementary European Search Report and Search Opinion dated Apr. 5, 2019 regarding EP16842953.8.
Written Opinion dated May 3, 2019, regarding Singapore Application No. SG11201801033P.
Second China Office Action dated May 30, 2019, regarding CN201580047291.2 with Machine Translation.
Altair Optistruct Revolutionizes Lattice Structures for 3D Printing; Feb. 26, 2015 (Year 2015), www.altair.com/(X(1)S(zwygunynpzj1mvuglgxh4s1u))/Default.aspx?AspxAutoDetectCookieSupport=1).
Australian Examination Report No. 2 dated Mar. 15, 2019, regarding AU2015284265.
Singapore First Written Opinion dated Mar. 6, 2019, regarding Application No. SG10201806531Q.
Nickel, L., "3D Printing the World's First Metal Bicycle Frame," Metal Powder Report, Apr. 30, 2014, vol. 69, No. 2, pp. 38-40.
Notice of Reasons for Rejection dated Jun. 3, 2019, regarding Japanese Application No. JP2017-0521019.
Communication Pursuant to Article 94(3) EPC received in European Patent Application No. 15815934.3 dated Nov. 15, 2019.
Decision of Rejection received in Japanese Patent Application No. 2017-521019, dated Apr. 27, 2020.
Notice of Reasons for Rejection received in Japanese Patent Application No. 2018-510710, dated May 12, 2020.
Examination Report No. 1 received in Australian Patent Application No. 2016315829, dated Apr. 22, 2020.
Examination Report No. 3 for Standard Patent Application received in Australian Patent Application No. 2015284265, dated Mar. 11, 2020.
Second Written Opinion received in Singapore Application No. 11201801033P, dated Mar. 2, 2020.
Crolla "Automotive Engineering—Powertrain, Chassis System and Vehicle Body", Section 15—Vehicle Modeling, Section 16—Structural Design, Section 17—Vehicle Safety, Jul. 30, 2009.
Notice of Reasons for Rejection received in Japanese Patent Application No. 2019-218476, dated Mar. 9, 2020.
Examination Report received in Singapore Application No. 10201806531Q, dated Dec. 30, 2019.
Notification of the First Office Action received in Chinese Patent Application No. 201680062251.X, dated Feb. 3, 2020, with English Translation.
Shury, "This 3D Printed Carbon Fibre Car Wants to Reinvent Manufacturing", https://www.compositestoday.com/2015/07/this-3d-printed-carbon-fibre-car-wants-to-reinvent-manufacturing, dated Jul. 16, 2015.

(56) References Cited

OTHER PUBLICATIONS

Singapore Examination Report dated Jan. 24, 2019, regarding Singapore Application No. 11201610967R.
Communication pursuant to Article 94(3) received in European Patent Application No. 15815934.3, dated Jul. 23, 2020.
Brazilian PTO published a Preliminary Office Action issued on Brazilian Application No. BR 11 2018 003879.2 dated Aug. 17, 2020.
Communication pursuant to Article 94(3) EPC issued on Application No. EP 16 842 953.8-1009 dated Oct. 1, 2020.
Office Action issued on Patent Application in Mexico No. MX/a/2017/000061 dated Jul. 24, 2020.

* cited by examiner

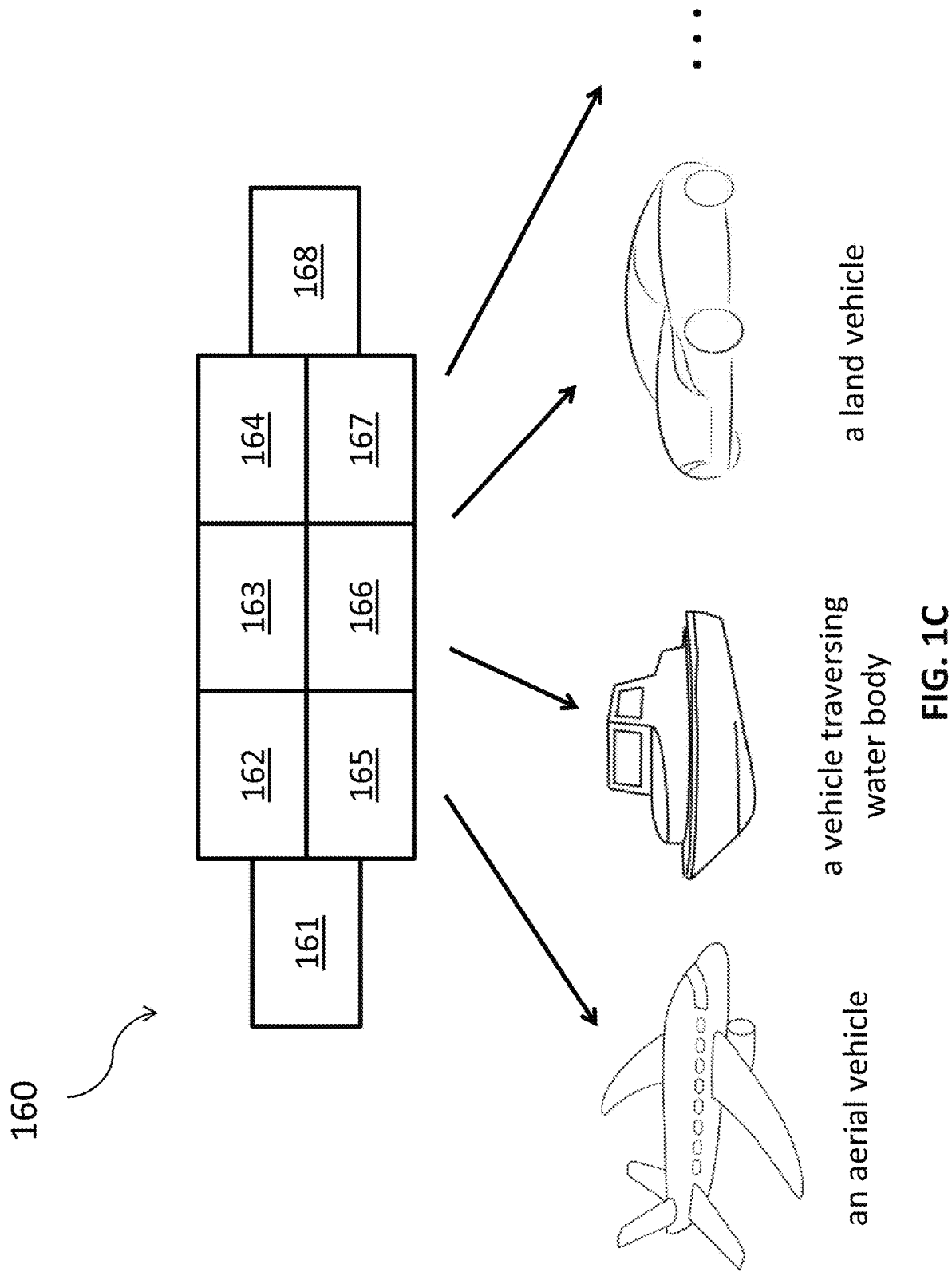

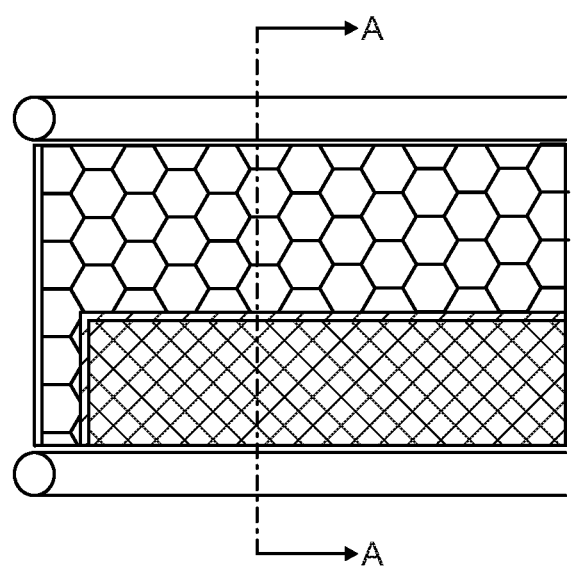
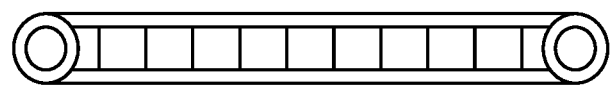
Section A:A
FIG. 13

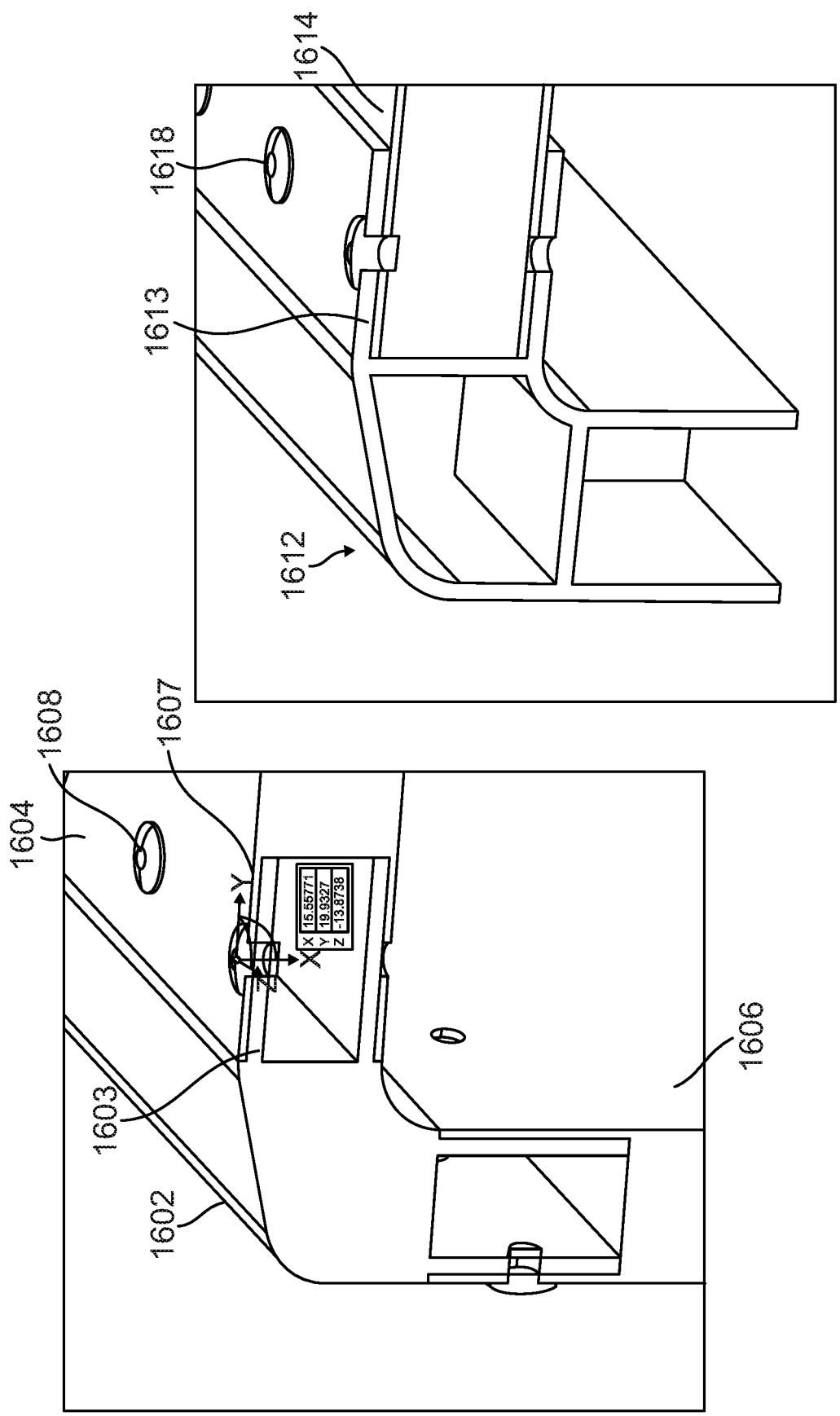

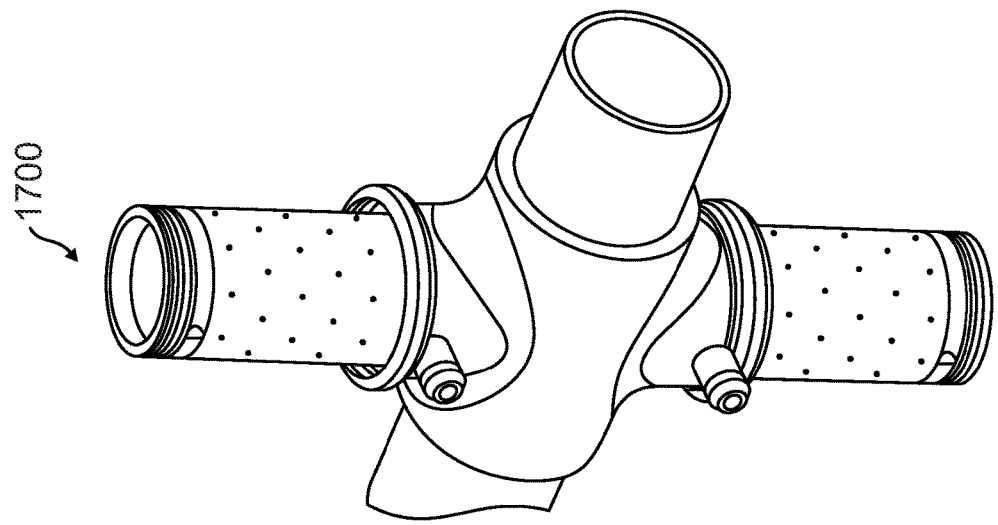
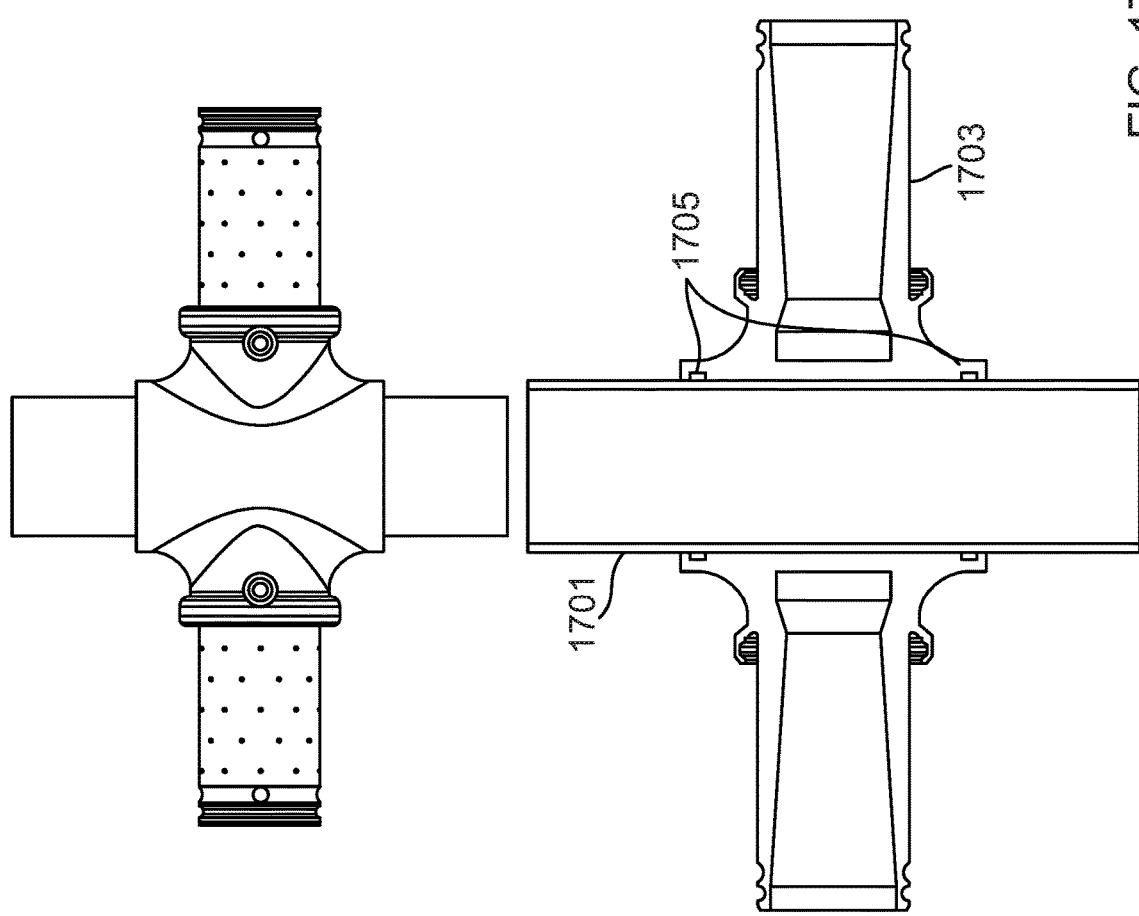
FIG. 17A

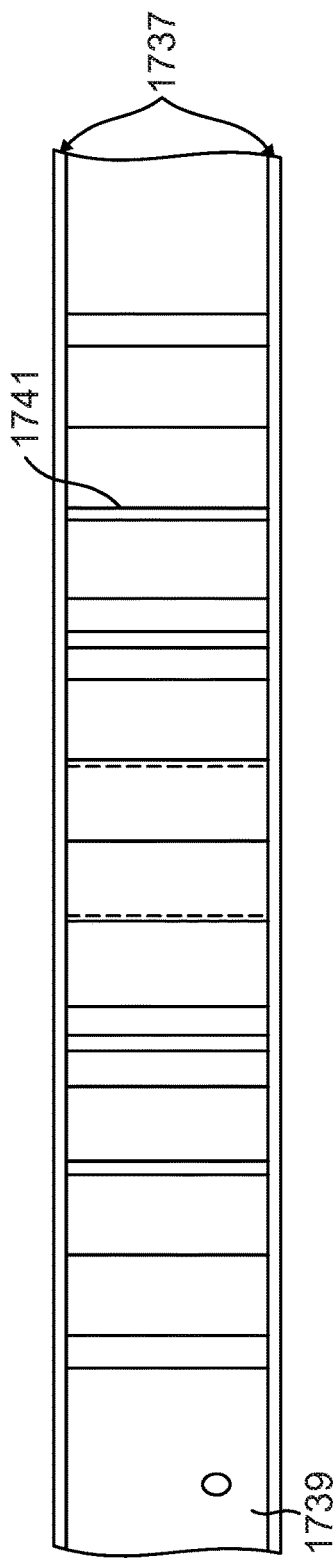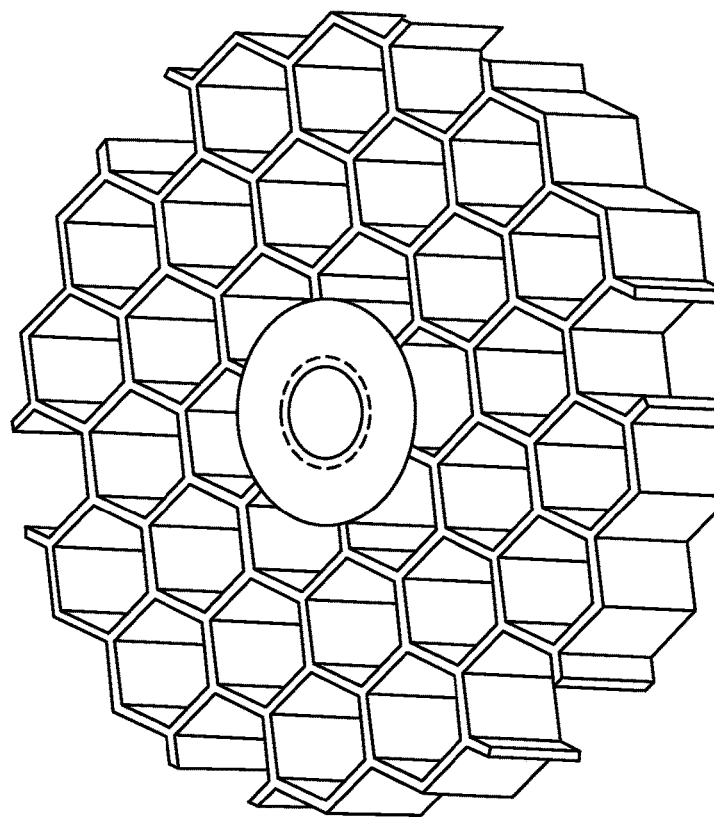
FIG. 17G

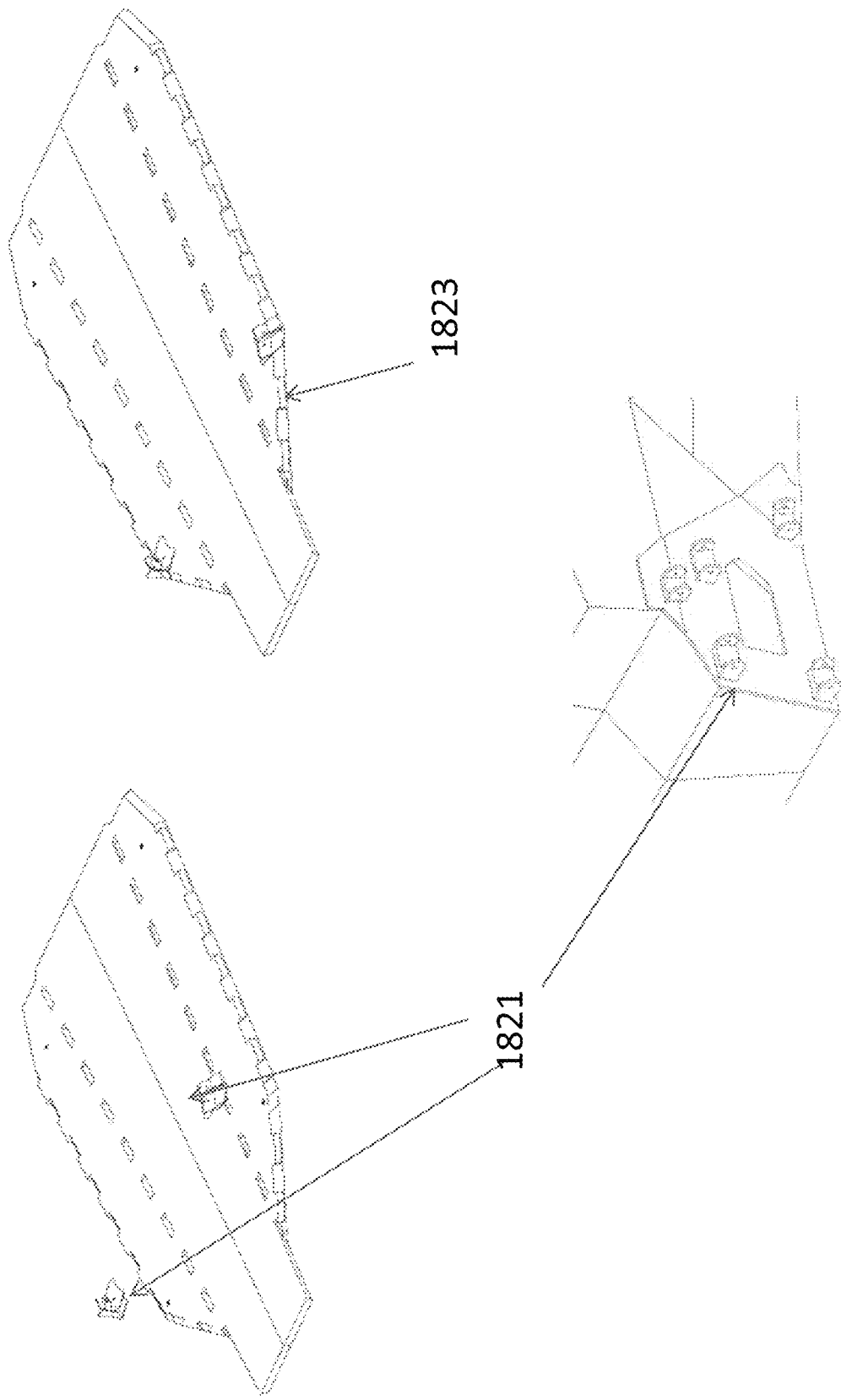

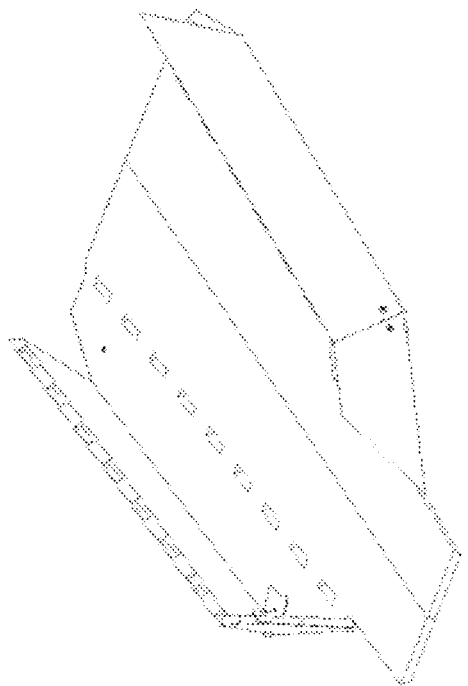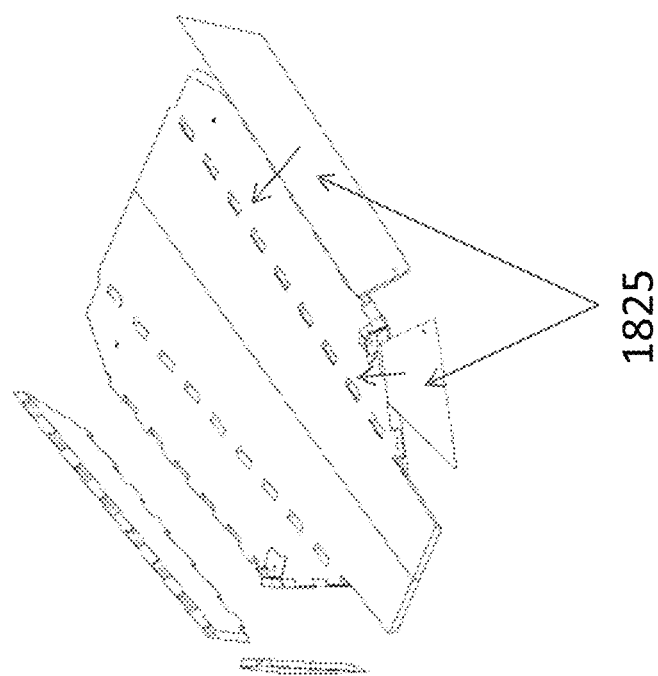
FIG. 18E

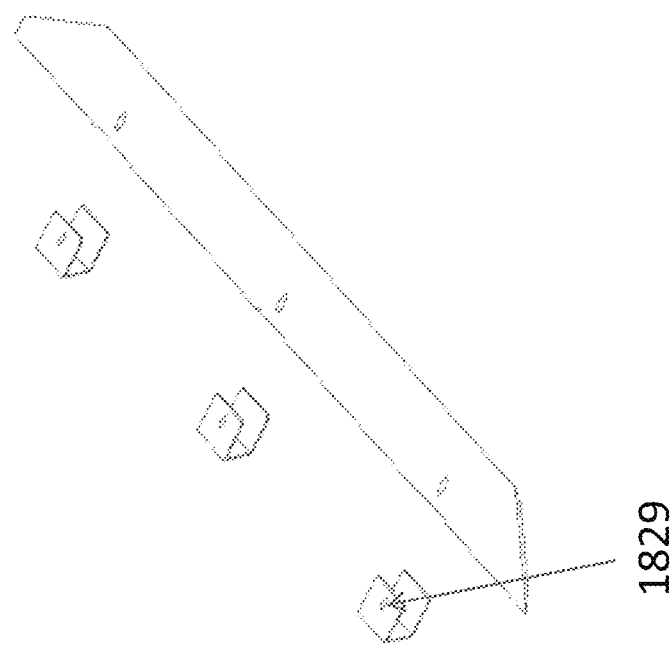
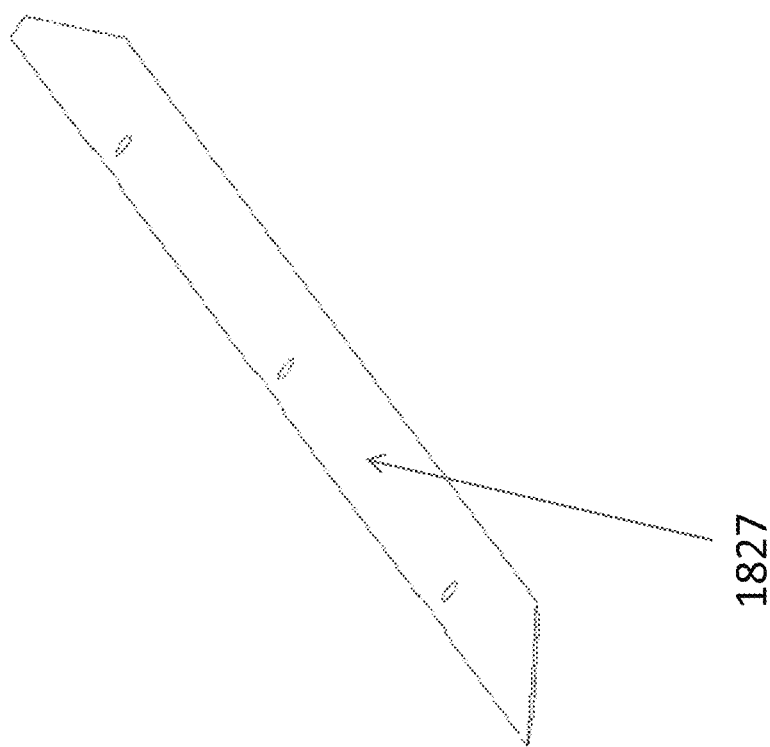
FIG. 18F

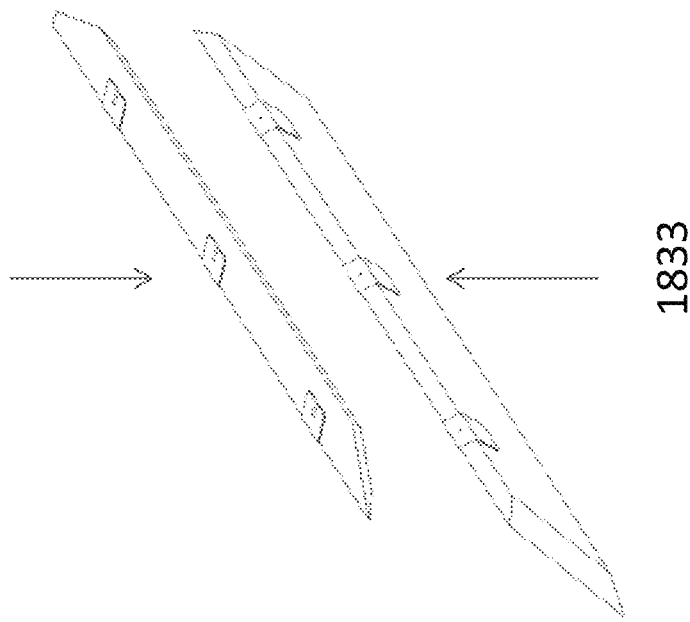
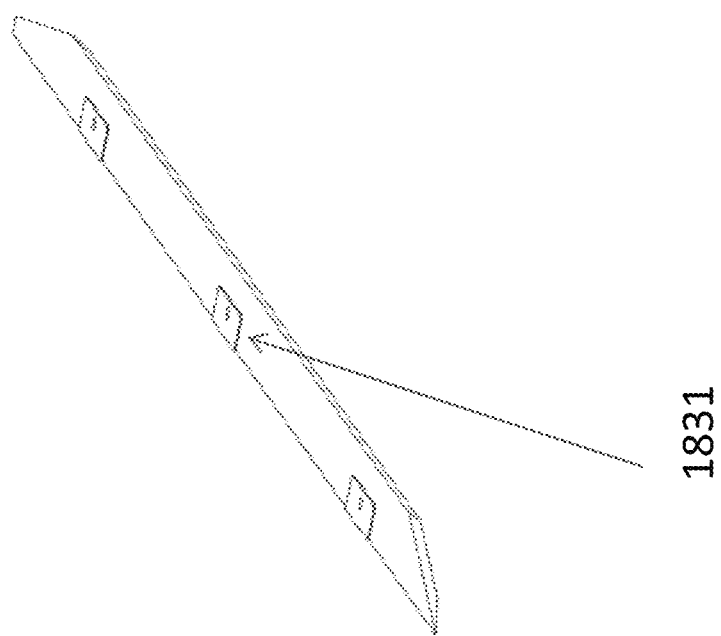
FIG. 18G

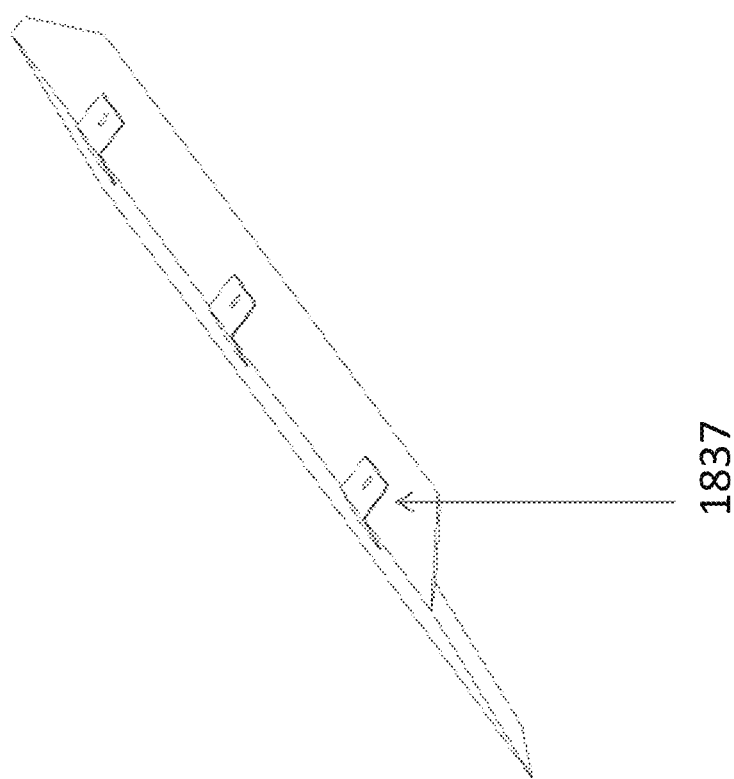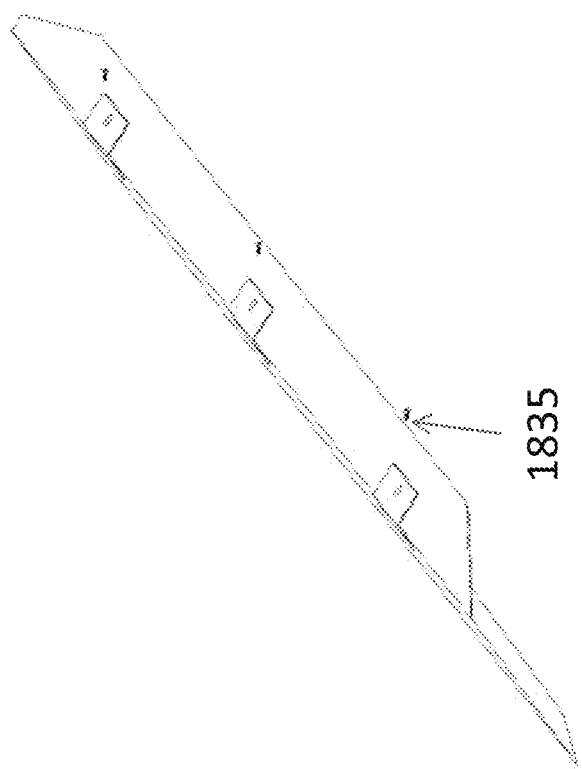
FIG. 18H

SYSTEMS AND METHODS FOR VEHICLE SUBASSEMBLY AND FABRICATION

CROSS-REFERENCE

This application is a continuation-in-part application of U.S. patent application Ser. No. 14/788,154, filed Jun. 30, 2015, now published as US 2016/0016229, which claims priority to U.S. Provisional Application No. 62/020,084, filed Jul. 2, 2014, which application also claims the benefit of U.S. Provisional Application No. 62/212,556, filed Aug. 31, 2015, and U.S. Provisional Application No. 62/255,372, filed Nov. 13, 2015, each of which is entirely incorporated herein by reference.

BACKGROUND

Space frame and monocoque construction are both used in automotive, structural, marine, and many other applications. One example of space frame construction can be a welded tube frame chassis construction, often used in low volume and high performance vehicle design due to the advantages of low tooling costs, design flexibility, and the ability to produce high efficiency structures. These structures require that tubes of the chassis be connected at a wide variety of angles and may require the same connection point to accommodate a variety of tube geometries. Traditional methods fabrication of joint members for connection of such tube frame chassis may incur high equipment and manufacturing costs. Additionally, monocoque design may lead to design inflexibility when using planer elements, or high tooling costs when shaped panels are incorporated.

SUMMARY

A need exists for a fabrication method which may be able to generate joints to connect tubes and/or panels with a variety of geometric parameters. Provided herein is a method of 3-D printing joints for the connection of tubes, such as carbon fiber tubes. Additionally herein is a method of 3D printing joints for the connection of panels, such as aluminum honeycomb panels. The joints may be printed according to the specification of geometric and physical requirements at each tube and/or panel intersection point. Such geometric and physical requirements may incorporate safety requirements and/or features. The method of 3-D printing the joints may reduce manufacturing costs and may be easily scaled.

The 3-D printing method described in this disclosure may allow for the printing of fine features on the joints that may not be achievable through other fabrication methods. An example of a fine feature described in this disclosure may be centering features to force the center of a connecting tube and the center of an adjoining joint protrusion to be co-axial. The centering features may provide a gap between an outer surface of inner region of a joint and an inner surface of a connecting tube, through which adhesive may be applied. Another example may be that nipples can be printed on the joint which may connect to equipment to introduce adhesive to bind a joint and tube assembly.

Aspects of the invention may be directed to a method of fabricating a vehicle, the method comprising: designing a vehicle chassis comprising one or more connecting tubes or panels and one or more joint members, by incorporating one or more safety considerations into a design of the vehicle chassis; determining a stress direction and magnitude to be exerted by the one or more connecting tubes or panels at the one or more joint members; and manufacturing the one or more joint members, each joint member having a configuration that (1) supports the stress direction and magnitude exerted by the one or more connecting tubes or panels at the joint member, and (2) incorporates the one or more safety considerations.

Additional aspects of the invention are directed to a method of fabricating a joint member for connection of a plurality of connecting tubes and/or panels forming a space frame, a monocoque structure, or a hybrid of the two, the method comprising: determining a relative tube angle, tube size, and tube shape for each of the plurality of connecting tubes and/or panels to be connected by the joint member; determining a stress direction and magnitude to be exerted by the plurality of connecting structural members at the joint member; and 3-D printing the joint member having a configuration that (1) accommodates the relative tube or a panel, angle, tube or panel size, and tube or panel shape at each joint member, and (2) supports the stress direction and magnitude exerted by the plurality of connecting tubes or other structural members, such as panels.

In some embodiments, the space frame is configured to at least partially enclose a three-dimensional volume. Each connecting tube of the plurality of connecting tubes may have a longitudinal axis along a different plane. The space frame may be a vehicle chassis frame.

The method may further comprise 3-D printing centering features on at least a portion of the joint member. The centering features may be printed on a joint protrusion of the joint member configured to be inserted into a connecting tube. The characteristics of the centering features can be determined based on the stress direction and magnitude to be exerted by the plurality of connecting tubes at the joint member. The stress direction and magnitude to be exerted by the plurality of connecting tubes at the joint member may be determined empirically or computationally.

An additional aspect of the invention may be directed to a vehicle chassis comprising: a plurality of connecting tubes; and a plurality of joint members, each joint member sized and shaped to mate with at least a subset of the plurality of the connecting tubes in the plurality of connecting tubes to form a three-dimensional frame structure, wherein the plurality of joint members are formed by a 3-D printer.

In some embodiments, each joint member of the plurality of joint members is sized and shaped such that the joint member contacts an inner surface and an outer surface of a connecting tube when the connecting tube is mated to the joint member. Optionally, at least one joint member of the plurality of joint members comprises internal routing features formed during 3-D printing of the joint member. The internal routing features may provide a network of passageways for transport of fluid through the vehicle chassis when the three-dimensional frame structure is formed. The internal routing features may provide a network of passageways for transport of electricity through electrical components throughout the vehicle chassis when the three-dimensional frame structure is formed.

The plurality of joint members may comprise mounting features formed during 3-D printing of the joint members. The mounting features may provide panel mounts for mounting of panels on the three-dimensional frame structure.

A system for forming a structure may be provided in accordance with an additional aspect of the invention. The system may comprise: a computer system that receives input data that describes a relative tube angle, tube size, and tube shape for each of a plurality of connecting tubes to be connected by a plurality of joint members to form a frame of the structure, wherein the computer system is programmed to determine a stress direction and magnitude to be exerted by the plurality of connecting tubes at the plurality of joint members: and a 3-D printer in communication with the computer system configured to generate the plurality of joint members having a size and shape that (1) accommodates the relative tube, angle, tube size, and tube shape at each joint member, and (2) supports the stress direction and magnitude exerted by the plurality of connecting tubes.

In some cases, the frame of the structure at least partially encloses a three-dimensional volume. The plurality of joint members may further comprise centering features on at least a portion of the joint member formed by the 3-D printer. The centering features may be printed on a joint protrusion of the joint member configured to be inserted into a connecting tube. The characteristics of the centering features may be determined based on the stress direction and magnitude to be exerted by the plurality of connecting tubes at each joint member.

In another aspect of the invention, a structure for a vehicle is provided. The structure may comprise a plurality of panels or tubes having honeycomb shaped internal structures; and a plurality of joint members, each joint member configured to mate with at least a subset of the plurality of panels or tubes to form a three-dimensional structure. In some embodiments, the internal structures are formed by 3D printing. In some cases, the joint members are also formed by 3D printing.

In some embodiments, the three-dimensional structure which comprises a plurality of panels or tubes is formed to meet safety considerations for the vehicle. In some cases, the at least one of the plurality of panels or tubes or the plurality of joint members is designed to break or deform in a controlled and directed manner upon a collision of the vehicle exceeding a threshold force.

In some embodiments, the plurality of tubes are designed and made to mate with at least one joint member. In some embodiments, at least one panel of the plurality of panels comprises mounting features to be connected with at least one joint member or other panel. In some embodiments, at least a subset of the three-dimensional structure is removable and interchangeable with another set of components to provide the vehicle with desired safety or performance characteristics.

In an additional aspect of the invention, a vehicle chassis support component is provided. The vehicle chassis support component may comprise: at least one outer surface; an internal structure within an interior bound by the outer surface; and one or more mounting features that permit the vehicle chassis support component to connect with one or more other structural members of the vehicle. In some embodiments, the internal structure of the vehicle panel is integrally formed with the at least one outer surface by a 3D printer.

In some embodiments, the internal structure comprises three dimensional honeycomb structures. In some embodiments, at least one surface of the support component comprises a first sheet and a second sheet forming an outer surface of a vehicle panel, and the internal structure is between the first sheet and the second sheet. In some cases, the vehicle panel may further comprise inserting features to accept functional components such as node members. The node members may be used for determining a location of the panel relative to other components of the vehicle. In some embodiments, at least one surface is cylindrical to form an outer surface of a vehicle tube, and the internal structure is within the tube. In some embodiments, the one or more structural members comprises at least a joint member having one or more connecting features to be mated with the vehicle chassis support component. At least one joint member is formed by a 3D printer.

In another yet related aspect of the invention, a method of fabricating a vehicle is provided. The method comprises: designing a vehicle chassis comprising (1) one or more connecting tubes or panels, and (2) one or more joint members, by incorporating one or more safety considerations into a design of the vehicle chassis; determining a stress direction and magnitude to be exerted by the one or more connecting tubes or panels at the one or more joint members; and manufacturing the one or more joint members, each joint member having a configuration that (1) supports the stress direction and magnitude, and (2) incorporates the one or more safety considerations. In some embodiments, the manufacturing of the one or more joint members comprises 3-D printing the one or more joint members. In some embodiments, the one or more connecting tubes or panels comprise a honeycomb structure. In some embodiments, the joint member is configured to cause the one or more connecting tubes or panels, or the one or more joint members, to break or deform in a controlled and directed manner upon a collision of the vehicle exceeding a threshold force.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein), of which:

FIG. 1C shows an example of a schematic vehicle chassis constructed from a plurality of chassis modules.

FIG. 13 provides an example of a structural feature that may be provided to a joint.

FIGS. 16A-16B show examples of connecting joints with panels using various configurations.

FIGS. 17A-17G show various embodiments of connecting various vehicle components, such as the joints, tubes, and/or panels.

FIGS. 18A-18K show various examples for fabricating various vehicle components.

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

This disclosure provides a method to fabricate a joint member by additive and/or subtractive manufacturing, such as 3-D printing. The joint member may be configured to provide a connection of a plurality of connecting tubes, which may be used for the construction of a lightweight space frame. A space frame can be a frame that has a three-dimensional volume. A space frame can be a frame that can accept one or more panels to at least partially enclose the frame. An example of a space frame may be a vehicle chassis. Various aspects of the described disclosure may be applied to any of the applications identified here in addition to any other structures comprising a joint/tube frame construction. It shall be understood that different aspects of the invention may be appreciated individually, collectively, or in combination with each other.

Figure 1A:
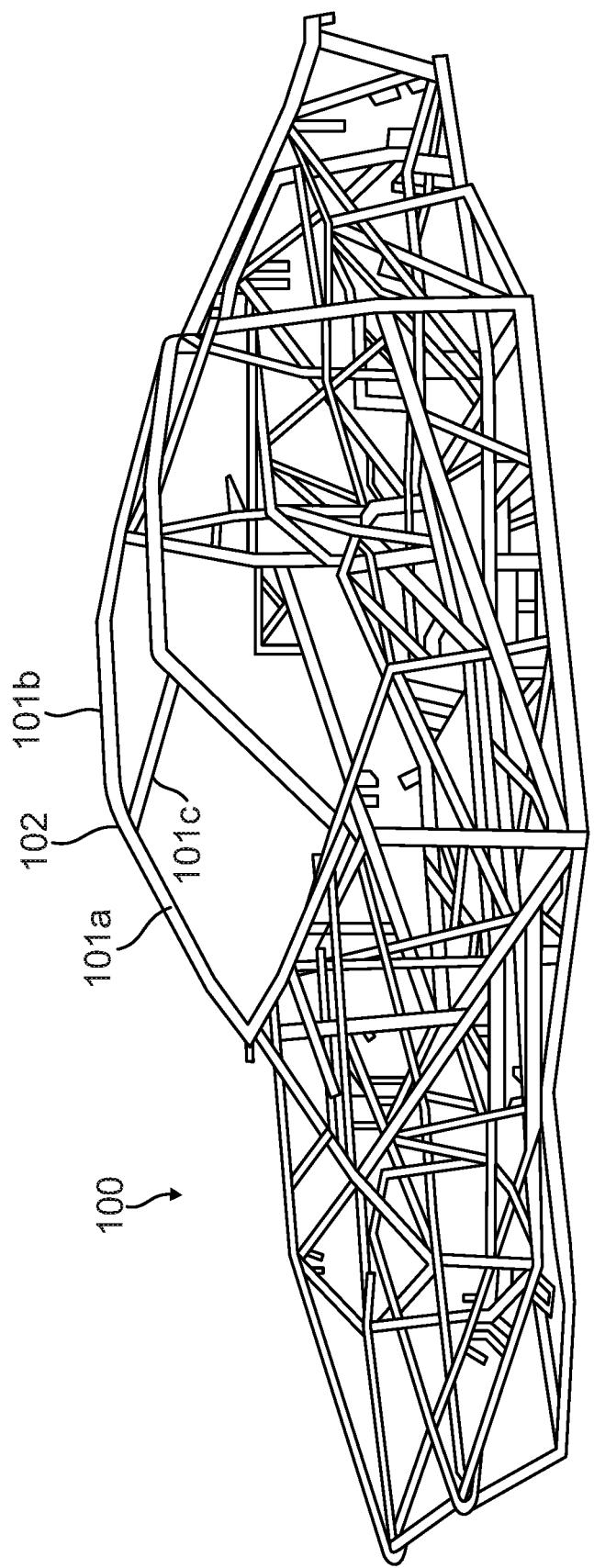
FIG. 1A shows an example of a space frame chassis constructed from carbon fiber tubes connected by 3-D printed nodes.

FIG. 1A shows a vehicle chassis 100 including connecting tubes 101a, 101b, 101c connected by one or more nodes (a.k.a. joints) 102, in accordance with an embodiment of the invention. Each joint member can comprise a central body and one or more ports that extent from the central body. A multi-port node, or joint member, may be provided to connect tubes, such as carbon fiber tubes, to form a two or three-dimensional structure. The structure may be a frame. In one example, a two dimensional structure may be a planar frame, while a three dimensional structure may be space frame. A space frame may enclose a volume therein. In some examples, a three dimensional space frame structure may be a vehicle chassis. The vehicle chassis may be have a length, width, and height that may enclose a space therein. The length, width, and height of the vehicle chassis may be greater than a thickness of a connecting tube.

A vehicle chassis may form the framework of a vehicle. A vehicle chassis may provide the structure for placement of body panels of a vehicle, where body panels may be door panels, roof panels, floor panels, or any other panels forming the vehicle enclosure. Furthermore the chassis may be the structural support for the wheels, drive train, engine block, electrical components, heating and cooling systems, seats, or storage space. A vehicle may be a passenger vehicle capable of carrying at least about 1 or more, 2 or more, 3 or more, 4 or more, 5 or more, 6 or more, 7 or more, 8 or more, ten or more, twenty or more, or thirty or more passengers. Examples of vehicles may include, but are not limited to sedans, trucks, buses, vans, minivans, station wagons, RVs, trailers, tractors, go-carts, automobiles, trains, or motorcycles, boats, spacecraft, or airplanes (e.g., winged aircraft, rotorcraft, gliders, lighter-than-air aerial vehicles). The vehicles may be land-based vehicles, aerial vehicles, water-based vehicles, or space-based vehicles. Any description herein of any type of vehicle or vehicle chassis may apply to any other type of vehicle or vehicle chassis. The vehicle chassis may provide a form factor that matches the form factor of the type of vehicle. Depending on the type of vehicle, the vehicle chassis may have varying configurations. The vehicle chassis may have varying levels of complexity. In some instances, a three-dimensional space frame may be provided that may provide an outer framework for the vehicle. The outer framework may be configured to accept body panels to form a three-dimensional enclosure. Optionally, inner supports or components may be provided. The inner supports or components can be connected to the space frame through connection to the one or more joint members of the space frame. Different layouts of multi-port nodes and connecting tubes may be provided to accommodate different vehicle chassis configurations. In some cases, a set of nodes can be arranged to form a single unique chassis design. Alternatively at least a subset of the set of nodes can be used to form a plurality of chassis designs. In some cases at least a subset of nodes in a set of nodes can be assembled into a first chassis design and then disassembled and reused to form a second chassis design. The first chassis design and the second chassis design can be the same or they can be different. Nodes may be able to support tubes in a two or three-dimensional plane. For example, a multi-prong node may be configured to connect tubes that do not all fall within the same plane. The tubes connected to a multi-prong node may be provided in a three-dimensional fashion and may span three orthogonal axes. In alternate embodiments, some nodes may connect tubes that may share a two-dimensional plane. In some cases, the joint member can be configured to connect two or more tubes wherein each tube in the two or more tubes has a longitudinal axis along a different plane. The different planes can be intersection planes.

The connecting tubes 101a, 101b, 101c of the vehicle may be formed from a carbon fiber material, or any other available composite material. Examples of composite materials may include high modulus carbon fiber composite, high strength carbon fiber composite, plain weave carbon fiber composite, harness satin weave carbon composite, low modulus carbon fiber composite, or low strength carbon fiber composite. In alternate embodiments, the tubes may be formed from other materials, such as plastics, polymers, metals, or metal alloys. The connecting tubes may be formed from rigid materials. The connecting tubes may be formed of one or more metal and/or non-metal materials. The connecting tubes may have varying dimensions. For example, different connecting tubes may have different lengths. For example, the connecting tubes may have lengths on the order of about 1 inch, 3 inches, 6 inches, 9 inches, 1 ft, 2 ft, 3 ft, 4 ft, 5 ft, 6 ft, 7 ft, 8 ft, 9 ft, 10 ft, 11 ft, 12 ft, 13 ft, 14 ft, 15 ft, 20 ft, 25 ft, or 30 ft. In some instances, the tubes may have the same diameter, or varying diameters. In some instances, the tubes may have diameters on the order of about 1/16", 1/4", 1/2", 1", 2", 3", 4", 5", 10", 15", or 20".

The connecting tubes may have any cross-sectional shape. For example, the connecting tubes may have a substantially circular shape, square shape, oval shape, hexagonal shape, or any irregular shape. The connecting tube cross-section could be an open cross section, such as a C-channel, I-beam, or angle.

The connecting tubes 101a, 101b, 101c may be hollow tubes. A hollow portion may be provided along the entire length of the tube. For example, the connecting tubes may have an inner surface and an outer surface. An inner diameter for the tube may correspond to an inner surface of the connecting tube. An outer diameter of the tube may correspond to an outer diameter of the tube. In some embodiments, the difference between the inner diameter and the outer diameter may be less than or equal to about 1/32", 1/16", 1/8", 1/4", 1/2", 1", 2", 3", 4, or 5". A connecting tube may have two ends. The two ends may be opposing one another. In alternative embodiments, the connecting tubes may have three, four, five, six or more ends. The vehicle chassis frame may comprise carbon fiber tubes connected with nodes 102.

The multi-port nodes 102 (a.k.a. joints, joint members, joints, connectors, lugs) presented in this disclosure may be suitable for use in a vehicle chassis frame such as the frame shown in FIG. 1. The nodes in the chassis frame 100 may be designed to fit the tube angles dictated by the chassis design. The nodes may be pre-formed to desired geometries to permit rapid and low cost assembly of the chassis. In some embodiments the nodes may be pre-formed using 3-D printing techniques. 3-D printing may permit the nodes to be formed in a wide array of geometries that may accommodate different frame configurations. 3-D printing may permit the nodes to be formed based on a computer generated design file that comprises dimensions of the nodes.

A node may be composed of a metallic material (e.g. aluminum, titanium, or stainless steel, brass, copper, chromoly steel, or iron), a composite material (e.g. carbon fiber), a polymeric material (e.g. plastic), or some combination of these materials. The node can be formed from a powder material. The nodes may be formed of one or more metal and/or non-metal materials. The 3-D printer can melt and/or sinter at least a portion of the powder material to form the node. The node may be formed of a substantially rigid material.

A node may support stress applied at or near the node. The node may support compression, tension, torsion, shear stresses or some combination of these stress types. The magnitude of the supported stress at the node may be at least 1 Mega Pascal (MPa), 5 MPa, 10 MPa, 20 MPa, 30 MPa, 40 MPa, 50 MPa, 60 MPa, 70 MPa, 80 MPa, 90 MPa, 100 MPa, 250 MPa, 500 MPa, or 1 GPa. The type, direction, and magnitude of stress may be static and dependent on the location of the node in a frame. Alternately the stress type, direction, and magnitude may be dynamic and a function of the movement of the vehicle, for example the stress on the node may change as the vehicle climbs and descends a hill.

Figure 1B:
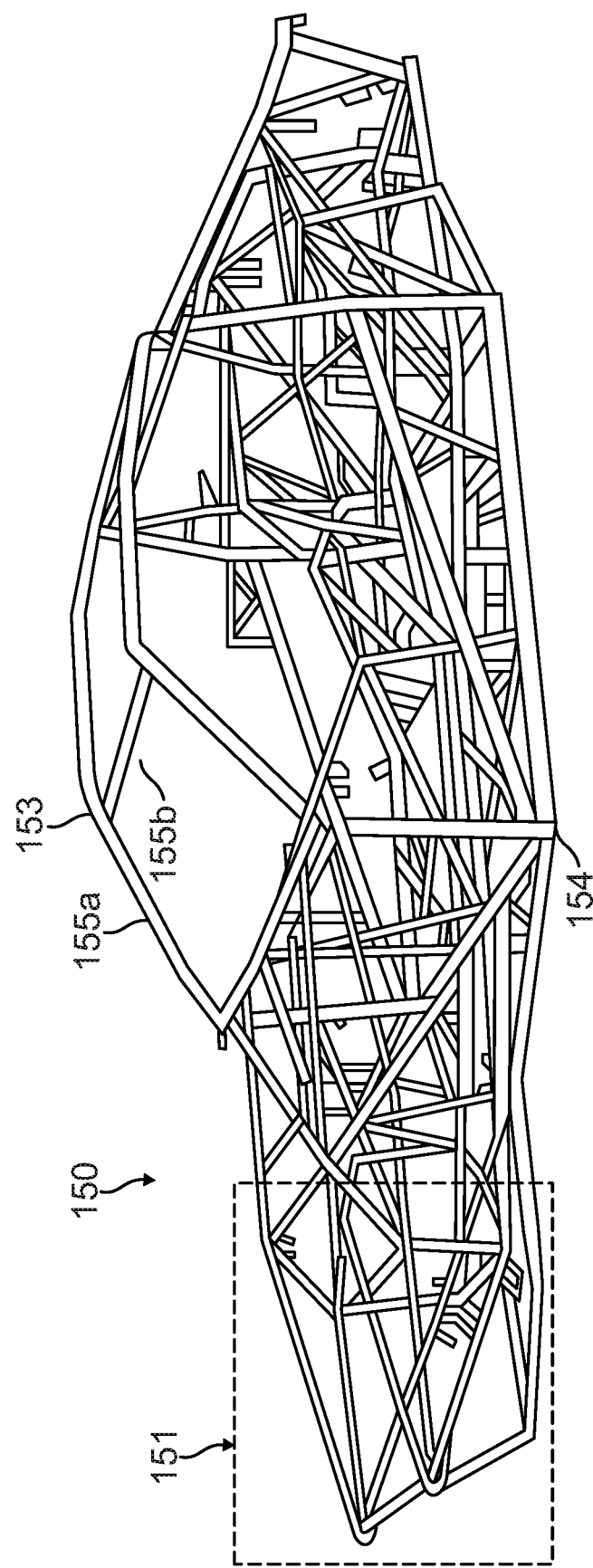
FIG. 1B shows an example of a space frame chassis where safety features may be incorporated or desired.

FIG. 1B shows an example of a space frame chassis where safety features may be incorporated or desired. In some embodiments it may be desirable for safety features to be built into the space frame to meet safety requirements. The safety requirements may be legally-mandated safety requirements. For example laws of statutes of a jurisdiction (e.g., country, province, region, state, city, town, village) may delineate one or more safety requirements. The safety requirements may be determined by a governmental agency or other regulatory body. In some embodiments, the safety requirements may be government mandated. In some embodiments, safety requirements may be determined by a non-governmental body. For instance, a private third party may determine one or more safety requirements. The one or more safety requirements by the private third party may optionally be stricter than safety requirements provided by the government. In some instances, the private third party may be a manufacturer or designer of a vehicle chassis. The private third party may be a group or consortium of manufacturers or designers of a vehicle chassis. Safety requirements may include one or more parameter or metric that the vehicle or vehicle chassis must meet to be considered safe.

An example of a safety requirement may be that the vehicle must be able to withstand a certain type of crash with little or no risk of harm to passengers of vehicle. In some embodiments, at least one of the plurality of panels or tubes or the plurality of joint members is designed to break or deform in a controlled and directed manner upon a collision of the vehicle exceeding a threshold force. For instance, a crumple zone 151 may be provided for a vehicle chassis 150. The crumple zone may be configured to absorb some of the impact of a crash. The crumple zone of the vehicle chassis may be configured to deform in order to absorb the impact. The crumple zones may be located anywhere along the vehicle chassis. In some instances, the crumple zones may be located at portions that are further away from passengers of the vehicle. For instance, the crumple zones may be located at front or rear portion of the vehicle. Optionally, crumple zones may be located at an upper, lower, or side portions of the vehicle. Some areas may be designed to absorb differing amounts of energy from different crash scenarios (e.g., magnitude and/or direction of crash). For instance, a first crumple zone may be designed to crumple when the crash is of a first threshold magnitude, while a second crumple zone may be designed to crumple when the crash is of a second threshold magnitude higher than the first threshold magnitude (and optionally not crumple when the crash is below the second threshold magnitude). Any number of different crumple zones and/or gradations of crumpling thresholds may be provided throughout the vehicle. There may be one or more zones of the vehicle that may be resistant to crumpling.

The crumple zones and/or any other safety features may be configured to protect one or more areas of the vehicle, such as areas where passengers may be seated, or areas with components to be protected (e.g., fuel tank, engine, expensive components).

A vehicle chassis 150 may be made of one or more nodes 153, 154 and/or one or more connecting tubes 155a, 155b. The nodes and/or connecting tubes may incorporate safety features that may aid in complying with safety requirements. In some instances, the nodes and/or connecting tubes may include features that may absorb impact of a crash, as described in greater detail elsewhere herein. The nodes and/or connecting tubes themselves may crumple. In other examples, the nodes and/or connecting tubes may be configured to guide portions of the chassis or rest of the vehicle that may move during an impact in a desired direction (e.g., in a way that may absorb impact but not harm passengers), and/or may prevent portions of the chassis or the rest of the vehicle from moving in an undesired direction (e.g., toward passengers in a way that may potentially harm passengers). One or more body panels or other components of the vehicle may incorporate safety features as well. For instance, the body panels may incorporate energy absorbing or crumpling features, or may be connected to features that absorb energy of impact or crumple.

An example of a safety requirements may include, but is not limited to, ability to withstand a crash at predetermined velocities at predetermined angles with little or no risk of harm to the passengers. Another example of a safety requirement may be to provide little or no damage to a fuel tank in the event of a crash. A safety requirement may include the ability to provide an alert when certain conditions that may indicate defect or malfunction of the vehicle is detected. Safety requirements may include little or no risk of flying shrapnel. The safety requirements may include airbags or other features that may protect or restrain passengers in the event of a crash.

The assembly of the vehicle chassis from the nodes and/or the tubes may include connecting the nodes and corresponding tubes using various methods. In some embodiments, one or more tubes may fit in respective acceptor ports of a node and then the one or more tubes are attached to the node optionally with aid of an adhesive. Attaching the node and tubes together using adhesives (e.g., gluing the node and tubes together) upon assembly may advantageously provide a lightweight structure.

In some alternative embodiments, the tubes and nodes may be pre-attached (e.g., with aid of adhesives) and then connected together using one or more fasteners, such as screws, bolts, nuts, or rivets. For instance, a tube may be pre-attached (e.g., pre-glued) to a component (or a portion) of a node, which may be fastened to another node component, which may or may not have its own pre-attached tube. A tube may be pre-attached to a node component at a single end or multiple ends. Pre-attachment may occur prior to assembly of the vehicle chassis. For example, they may be pre-assembled at a location separate from a location of assembly. They may be pre-assembled at a manufacturing site. They may be subsequently shipped to the site of assembly and the node components may be fastened together. Alternatively, the tubes may be attached to node components at the site of assembly and then the node components may be fastened (e.g., bolted) together. The fastening between node components may permit the node components to be relatively fastened to one another. The one or more fasteners may be removable. Further details may be considered elsewhere herein.

Alternatively or additionally, the assembly of the chassis may use combinations of adhesive techniques and/or fastening techniques to connect the nodes and tubes. Any or all of the nodes may be formed as a single integral piece or may include multiple components that may be fastened to one another and may optionally be removable from one another.

When using adhesives to attach the one or more tubes to the nodes, it can reduce the overall weight of the vehicle. However, when a certain part of the vehicle needs to be replaced due to a crash or a component failure, it may be difficult to replace the certain part only without abandoning the entire structure, or to remove the certain part alone. Using a technique where node components are attached to one another with aid of one or more fasteners may facilitate disassembly of the vehicle chassis as needed. For instance, one or more fasteners may permit the node components to be removable relative to one another by unfastening the node components. Then, the portion of the vehicle chassis that needs to be replaced can be swapped in for a new piece that can be fastened to the existing vehicle chassis structure. For example, when a certain part of the vehicle needs to be replaced, the corresponding tubes and nodes may be easily disassembled, and a new replacement part may be fastened (e.g., bolted, screwed, riveted, clamped, interlocked) to the original structure. This may provide a wide range of flexibility, and the portions of the vehicle chassis may range from a single piece to whole sections of the vehicle. For instance, if a section of a vehicle crumpled on impact 151, the entire section may be disassembled from the vehicle chassis and replaced with a new section which is undamaged. In some instances, such section of a vehicle may be a chassis module, a chassis sub-structure, a chassis sub-assembly, or any other part of a vehicle chassis a discussed herein. The new section may be pre-assembled and then attached to the vehicle chassis at the connection points, or may be assembled piecemeal on the existing vehicle chassis. Such flexibility may also allow easy upgrades or modifications to the vehicle. For instance, if a new feature is possible for the vehicle chassis, much of the original chassis can be retained while the new feature is installed on the vehicle.

In some embodiments, certain parts/sections of the vehicle may be attached using fastening techniques, while other parts are attached using adhesives. Alternatively or additionally, nodes and tubes may be attached using adhesives within certain sections, while fastening techniques are used for inter-section connections. For example, within a replaceable section (e.g., a crumple zone) nodes and tubes may be attached together using adhesives, while the replaceable section may be attached to other parts of the vehicle using fastening techniques such that when the replaceable part is destroyed in a crash, it can be replaced by a new part easily. A tube may have one end glued to an integral one-piece node whereas the other end glued to another node or node component which may permit a bolting section with another node component. A node may be glued to a tube at one acceptor port and glued to another tube at another acceptor port, and may or may not be formed of multiple node components that may be fastened together.

FIG. 1C shows an example of a vehicle chassis 160 constructed by a plurality of chassis modules (e.g., chassis module 161, 162, . . . , 168). The vehicle chassis may be used for any type of vehicles, including but limited to an aerial vehicle, a vehicle traversing water body, a land vehicle, or any other suitable type of vehicles. An individual chassis module may be a sub-structure, a section, a sub-section, a part, a sub-part, a modular block, a building block of a vehicle chassis, and/or parts/sections/portions thereof. For example, a chassis module may be a floor, a front panel, a rear panel, a roof panel, a pillar, a front wing, a dash panel, a rocker panel, a portion of a fuselage of an aerial vehicle, a nose section of an aerial vehicle, a section of a deck, any other part/section of a vehicle, or parts/sections/sub-parts/sub-sections thereof. In another example, a crumple zone may comprise a plurality of chassis modules or a single chassis module.

One or more individual chassis module may be determined/defined by a designer and/or a user based on one's design/performance need from the vehicle. Alternatively or in combination, an individual chassis module may be determined by a manufacturer based on manufacturing process, e.g., an individual stage, an individual step, a type of tool/equipment/machine used during manufacturing. Alternatively or in combination, an individual chassis module may be determined by an assembler based on various considerations of assembly. For example, certain nodes, connectors, and/or panels may be assembled together to form a certain chassis module at a site of assembly.

A vehicle chassis or any part of a vehicle chassis can be built from one or more chassis modules in a plug and play fashion. For example, one or more chassis modules on a front part of a vehicle chassis can be detached/disassembled, and one or more chassis modules from another vehicle chassis can be attached/assembled to the front part. Chassis modules from different types of vehicles may have interchangeabilities (e.g., with compatible interfaces) such that chassis modules may be mixed and matched from different types of vehicles to create a vehicle chassis based on the user's needs. This can provide a flexible construction of a vehicle chassis based on any performance, aesthetics, and/or other needs a user may have.

One or more vehicle chassis modules may be assembled to form a vehicle chassis using any suitable techniques including but not limited to fastening techniques, adhesives, or combinations thereof. When one or more chassis modules need to be replaced due to a vehicle crash, a mechanical or electrical malfunction, and/or a chassis module upgrade or modification, the one or more chassis modules can be easily swapped with new ones.

Chassis modules used to build an individual vehicle chassis may have different structures, shapes, sizes, materials, and/or functions from one another. Alternatively or additionally, one or more chassis modules used for building an individual vehicle chassis may be identical repeat structures. The same design pattern for 3-D printing (or other manufacturing methods), manufacturing method and condition, and/or assembly process can be used for these identical chassis modules to save manufacturing cost. The chassis modules can be reconfigurable. For example, 3-D printing, extruding, casting, or any other method may be used to reshape or reconfigure partially or entirely a chassis module. Alternatively or additionally, the chassis modules may be re-usable. For example, one or more chassis modules from a scrapped vehicle may be reused on other vehicles.

A chassis module may have a hybrid structure. For example, a chassis module may be formed from a combination of different types of materials, such as a composite material (e.g., carbon fibers), a metal material (e.g. aluminum, titanium, or stainless steel, brass, copper, chromoly steel, iron, other metal materials, or an alloy formed therefrom), a polymeric material (e.g., plastic), or combinations thereof. The chassis module may be formed of one or more metal and/or non-metal materials. Alternatively or in combination, a chassis module may be formed using a combination of different methods, such as using adhesives, fasteners, or other connecting methods.

Figure 1D:
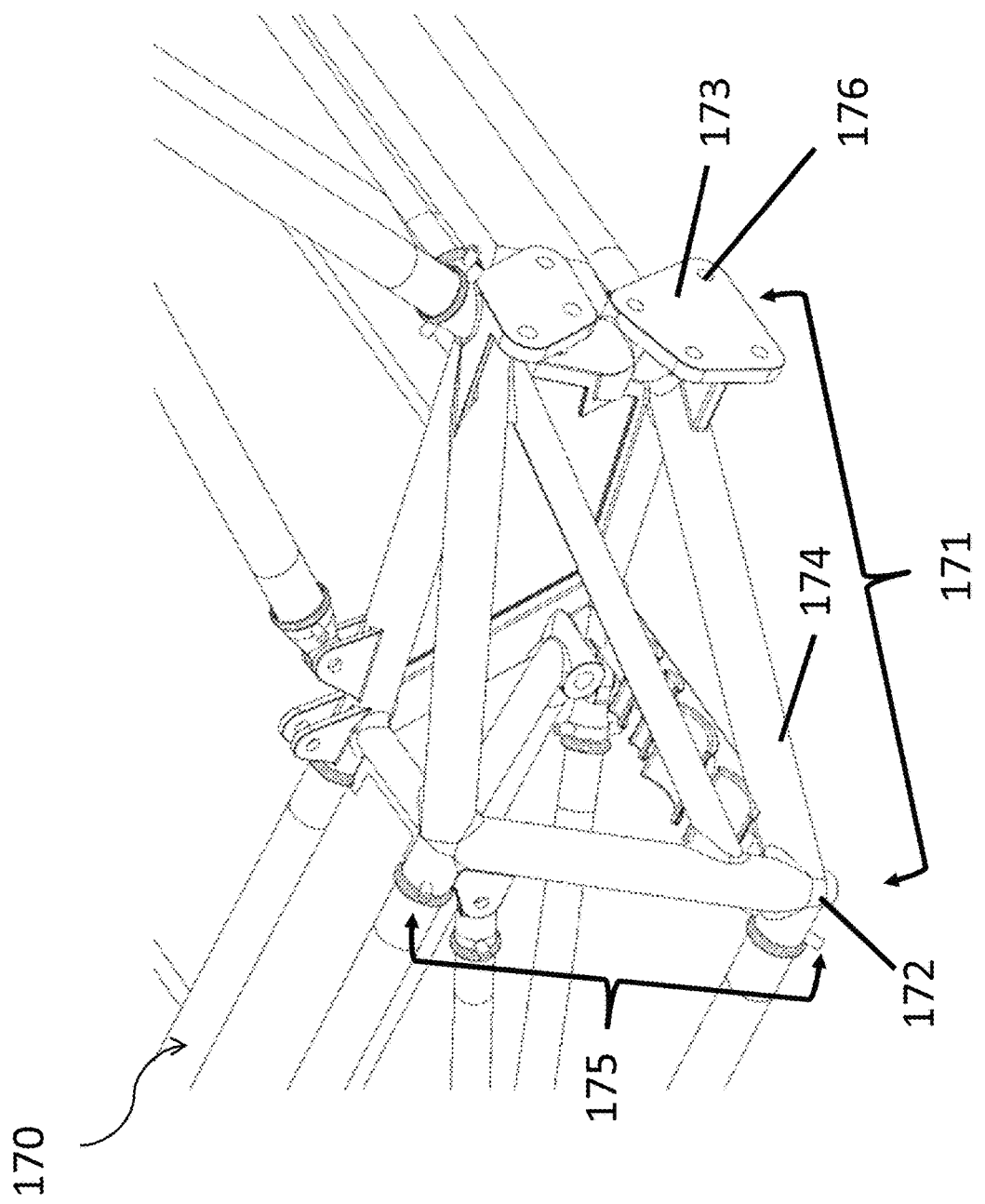
FIG. 1D shows an example of a substructure of a chassis module built from one or more chassis sub-assemblies.

FIG. 1D shows an example of a chassis sub-structure (or a chassis module, or a portion of a chassis module) built from one or more chassis sub-assemblies. A chassis sub-structure can be a unique portion of a vehicle chassis. A vehicle chassis can be constructed from repeating chassis sub-structures with similar dimensions and/or configurations.

A chassis sub-structure may have a hybrid structure. For example, a chassis sub-structure may be formed from a combination of different types of materials, such as a composite material (e.g., carbon fibers), a metal material (e.g. aluminum, titanium, or stainless steel, brass, copper, chromoly steel, iron, other metal materials, or an alloy formed therefrom), a polymeric material (e.g., plastic), or combinations thereof. The chassis sub-structure may be formed of one or more metal and/or non-metal materials. Alternatively or in combination, a chassis sub-structure may be formed using a combination of different methods, such as using adhesives, fasteners, or other connecting methods.

A chassis sub-assembly 171 may be formed by connecting a connector (e.g., a tube) 174 to one or more nodes (e.g., joints) 172, 173 together using fastening techniques, adhesives, or combinations thereof. One or more chassis sub-assemblies (e.g., sub-assemblies 174, 175) may be connected together to form a chassis module or a chassis sub-structure using fastening techniques (e.g., 176), adhesives, or combinations thereof. Alternatively or additionally, an individual chassis sub-assembly may be formed by one or more connectors, one or more nodes, and/or one or more panels using fastening techniques and/or adhesives. A sub-assembly may be determined to include minimized or optimized number of nodes such that an optimized number of chassis modules or chassis sub-structures can be used for chassis assembly.

Chassis sub-assemblies can have repeat structures with similar dimensions or configurations. A chassis module or a chassis sub-structure may be formed from similar chassis sub-assemblies. A chassis module or a chassis sub-structure can be formed from different sub-assemblies. Alternatively, a chassis module or a chassis sub-structure can be formed from combinations of sub-assemblies with repeat structures and different structures to achieve an optimized design and manufacturing processes.

A chassis sub-assembly may have a hybrid structure. For example, a chassis sub-assembly may be formed from a combination of different types of materials, such as a composite material (e.g., carbon fibers), a metal material (e.g. aluminum, titanium, or stainless steel, brass, copper, chromoly steel, iron, other metal materials, or an alloy formed therefrom), a polymeric material (e.g., plastic), or combinations thereof. A chassis sub-assembly may be formed of one or more metal and/or non-metal materials. Alternatively or in combination, a chassis sub-assembly may be formed using a combination of different methods, such as using adhesives, fasteners, or other connecting methods.

Figure 1G:
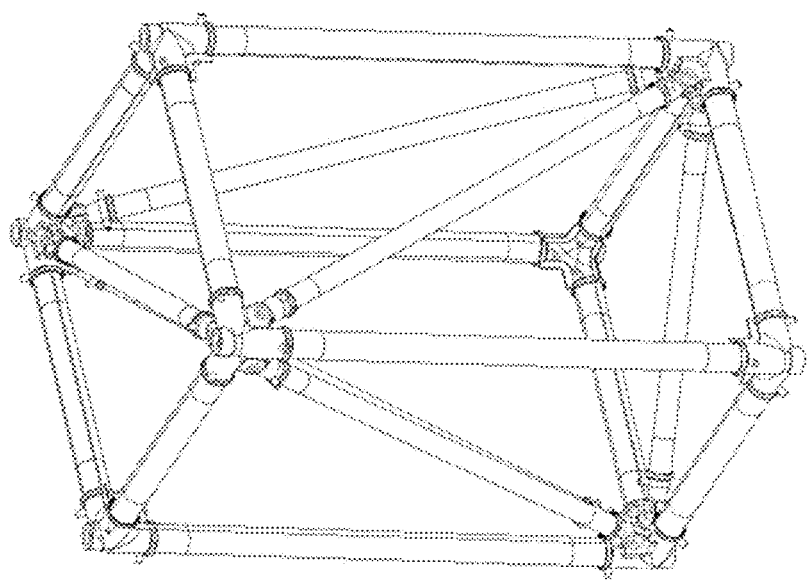
FIGS. 1E-1K show various embodiments of vehicle chassis modules.
Figure 1F:
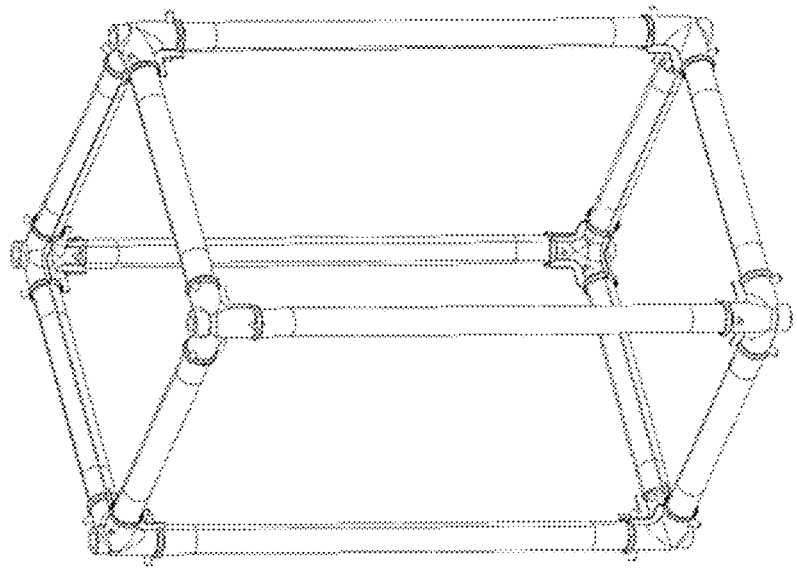
Figure 1E:
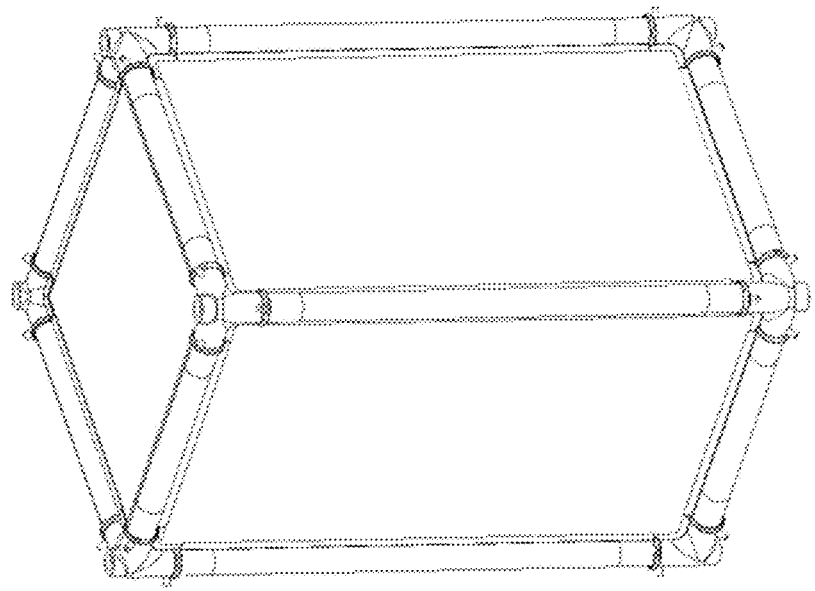
Figure 1I:
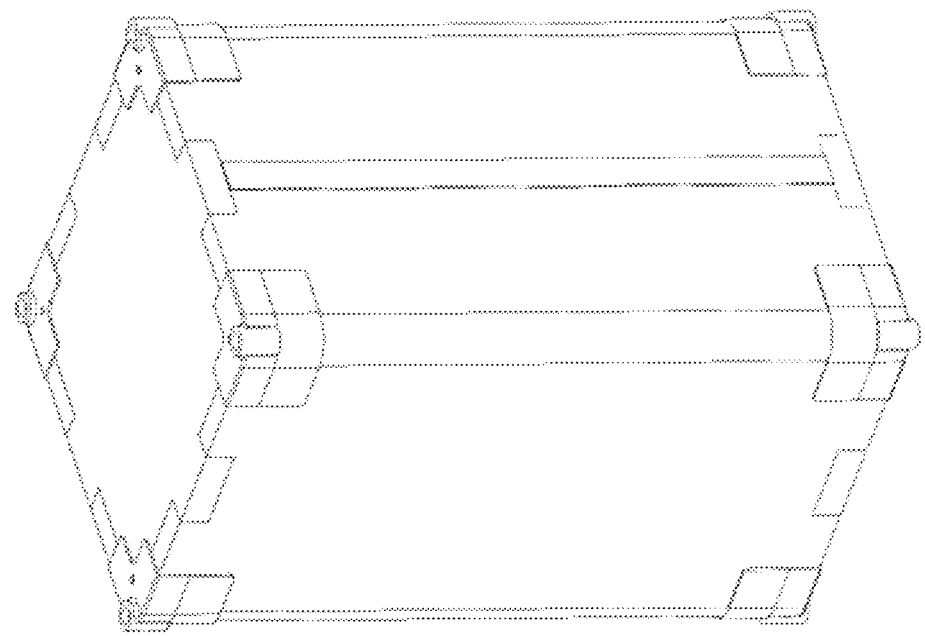
Figure 1H:
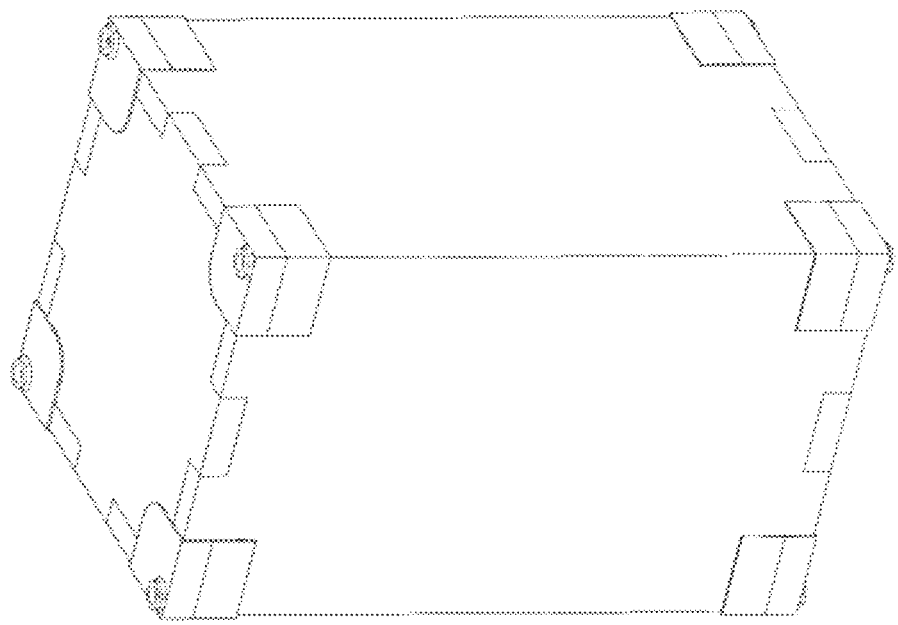
Figure 1K:
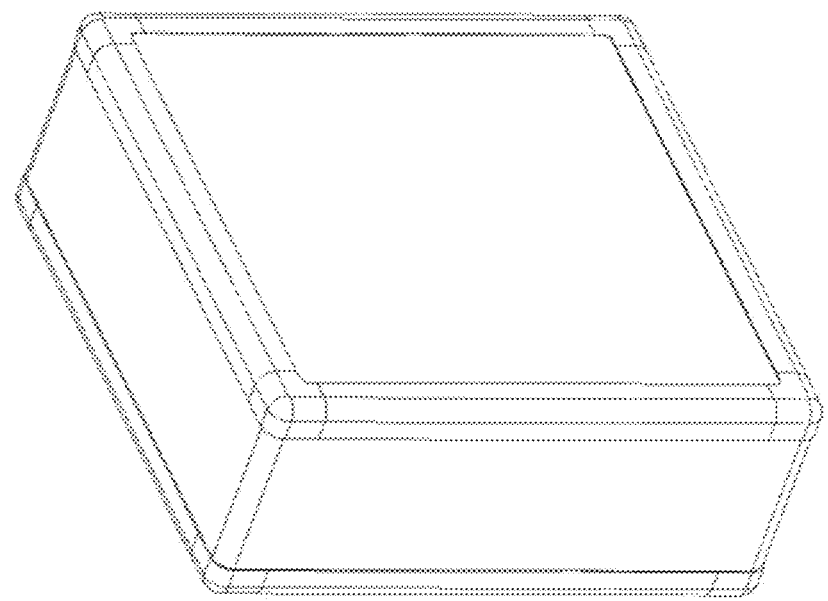
Figure 1J:
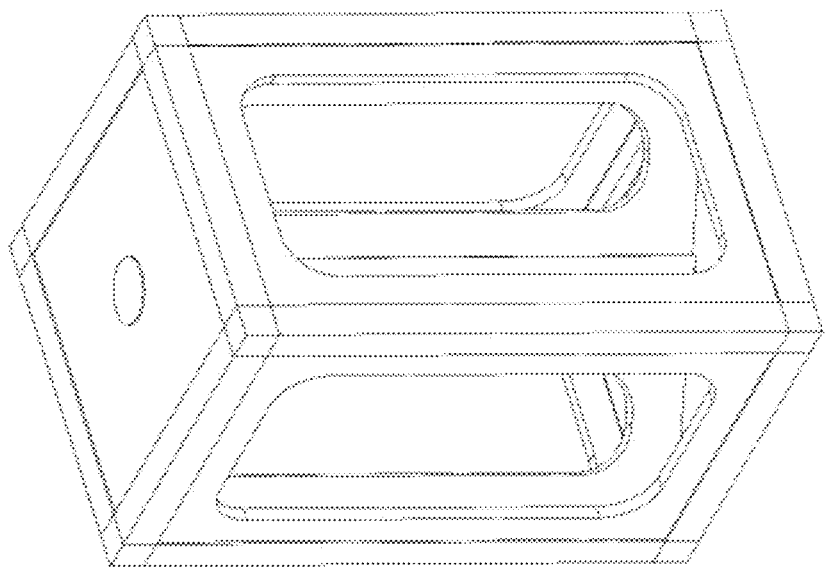

FIGS. 1E-1K show various embodiments of vehicle chassis modules with various shapes and configurations. FIGS. 1E-1F show chassis modules formed by connecting one or more connectors and one or more nodes together. An angle between a connector and a node may be around 90°. FIG. 1G shows a chassis module formed by connecting one or more connectors and one or more nodes, where a connector is placed diagonally across a rectangular plane to provide a stronger structure to the chassis module. FIGS. 1H, 1I, 1J, and 1K show chassis modules that are formed by connecting one or more connectors, one or more nodes, and one or more panels together. FIG. 1J shows a chassis module formed by a combination of connectors, nodes, and panels. The chassis module may have a hollow structure, and one or more tubes, one or more nodes, and/or one or more panels may be formed inside the hollow center to provide structural support and/or other functions.

Figure 1M:
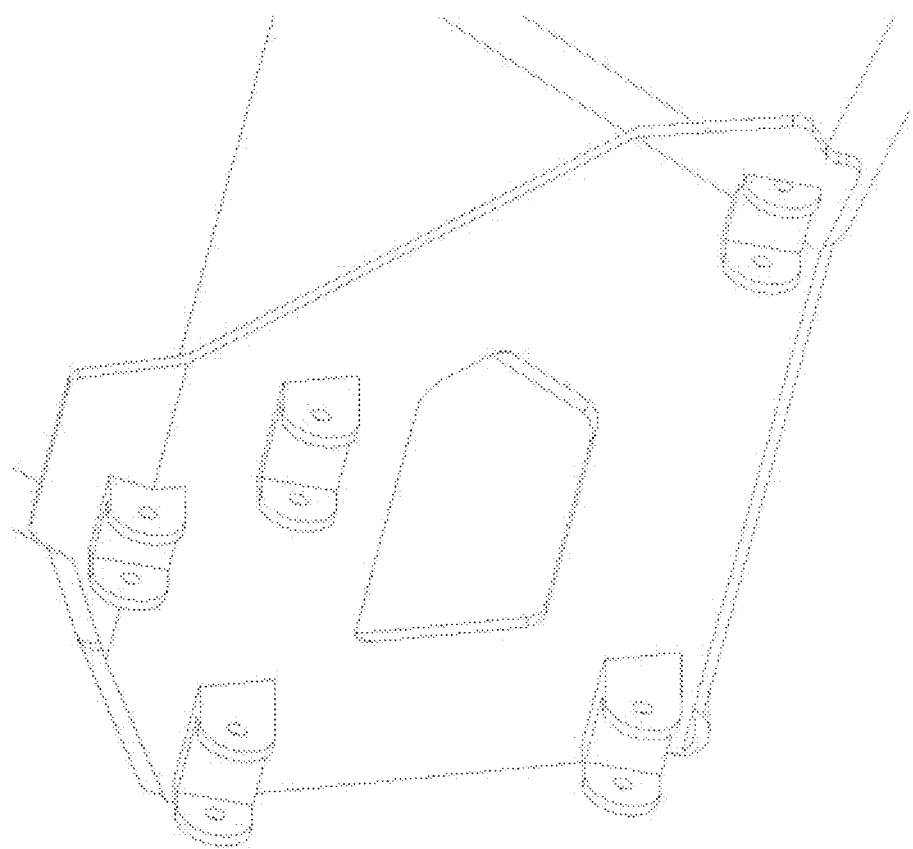
FIGS. 1L-1M show examples of connecting tubular and panel based stressed members.
Figure 1L:
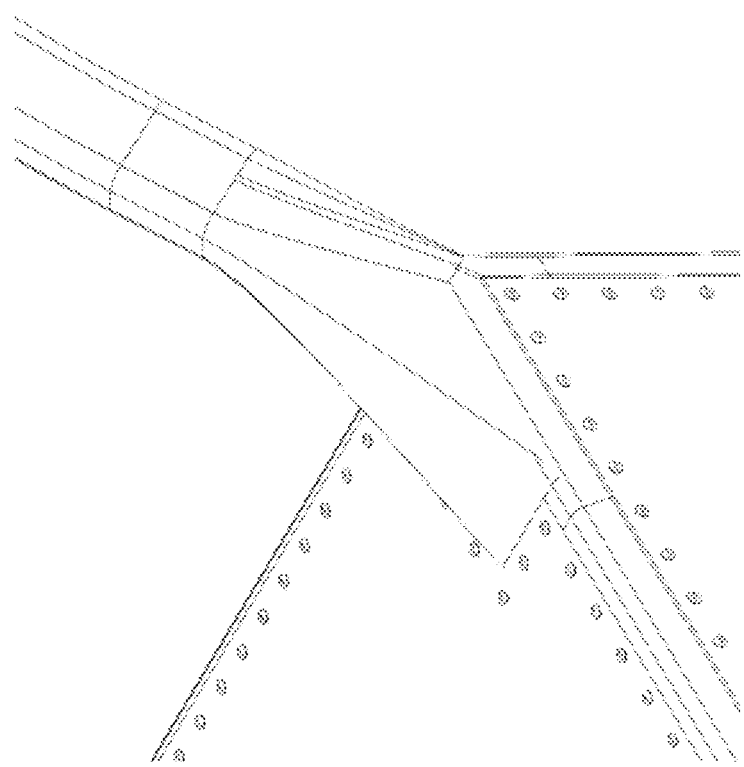

FIGS. 1L-1M show examples of connecting tubular and panel based stressed members. FIG. 1L shows a portion of a chassis module where a node is used to connect tubes and panels. One or more fasteners (e.g., bolts) may be used for the connections. FIG. 1M shows one or more flanges attached to a node. The flange may have one or more holes to be used for connecting other parts (e.g., nodes and/or panels) using fasteners. The flanges may be attached to the node using adhesives and/or fastening techniques. A chassis module can have one or more configurations of tubes connected to tubes, tubes connected to panels, panels connected to panels, and combinations thereof.

A chassis module can have any other shapes, structures, dimensions, and/or configurations than those listed in FIGS. 1E-1M. For example, a chassis module can have 2D structure or 3D structure of pyramid shapes, triangle shapes, square shapes, trapezoid shapes, and/or any other shapes. Chassis modules can be repeat structures that have similar dimensions and/or configurations. Chassis modules may have interfaces that can be interchangeable among different types of vehicles.

Figure 2A:
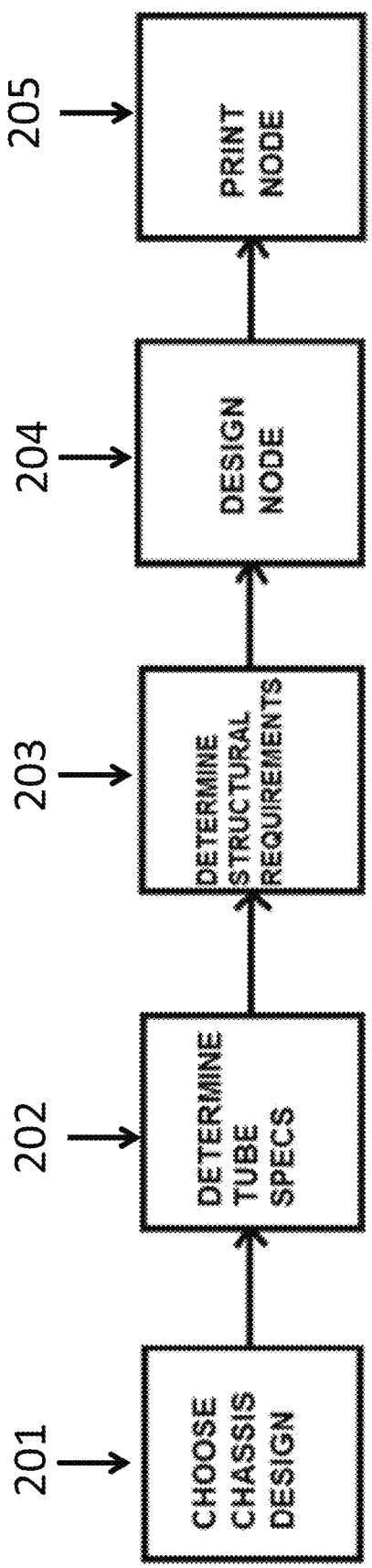
FIG. 2A shows a flow chart of the process used to design and build joints.

FIG. 2A shows a flow chart describing a method for 3-D printing joint members for connecting tubes, such as carbon fiber tubes, in a space frame. In this method a chassis design model is chosen 201. The chassis design model may be a new design or a design stored in a library which may comprise previously used designs or common stock designs. The chassis design can be generated by a user that forms the joints with the 3-D printing process or by a user that is different from the user that forms the joints. The chassis design can be editable. The chassis design can be made available through an online marketplace. From the chosen chassis design the tube specification (e.g. inner and outer diameter, tube cross section, and angle of tubes relative to each other at connection points) are determined 202. Next the dynamic and static stresses at each tube connection point are determined 203. The dynamic and static stresses at each tube connection point can be determined using a computational model, for example a finite element analysis. Using the physical and structural properties determined in steps 202 and 203 the joint (node) is designed 204. Finally in the last step the joints are generated using a 3-D printer according to the specification determined by the earlier steps 205. Two or more joints can be formed simultaneously. Alternatively joints can be formed one at a time.

A chassis design model may be generated in any available structural design software program, for example AutoCAD, Autodesk, Solid Works, or Solid Edge. The chassis design model may be generated in a simple, custom design tool tailored to the requirements of space frame design. This customized tool could interface to existing structural design software to automatically generate complete node geometries from a minimal set of input data (e.g. relative angles of tubes entering a given node). After generating a model of the chassis each tube connection point may be defined. Tube connection points may be locations where a joint is used to connect two or more tubes. Characteristics of the tube connection points may be determined by the model and used to define the joint structure needed for the design, for example the number of tubes, tube dimensions, and relative angles of tubes may be determined. The number of tubes at each joint may be determined from the chassis model, for example a joint may connect 2, 3, 4, 5, 6, 7, 8, 9, or 10 tubes. The diameter and cross sectional shape of each connecting tube at a joint location may be determined from the model. For example a joint may connect a square tube, round tube, oval tube, triangular tube, pentagonal tube, hexagonal tube, or an irregularly shaped tube. The tubes connected to the joint may all have the same cross section shape or they may vary. The diameter of the connecting tube may be determined from the model, a connecting tube may have a diameter of at least about 1/16", 1/8", 1/4", 1/2", 1", 2", 3", 4", 5", 10", 15", or 20". The tubes connected to the joint may all have the same diameter or the diameter may vary. The relative angles of the tubes at each joint may also be determined from the chassis model.

Optionally, a user may design a portion of the chassis design or provide specifications for the design to comply with. The software executed by one or more processors may design the rest of the chassis or provide details for the chassis in compliance with the specification. The processor may generate at least a portion of the design without requiring any further human intervention. Any of the features described herein may be initially designed by the software, a user, or both the software and the user.

Locations of additional structural, mechanical, electrical, and fluid components may also be determined from the structural design software. For example the location of shear panels, structural panels, shock systems, engine block, electrical circuits, and fluid passageways may be determined by structural design software. The chassis model may be used to define the joint design such that the joints can integrate with locations of the structural, mechanical, electrical, and fluid components.

The chassis model may be used to calculate stress direction and magnitude at each joint. The stress may be calculated using a finite element analysis employing a linear or non-linear stress model. Stress may be calculated on the joints while the chassis is stationary or while the chassis is moving along a typical path, for example, along a straight line, curved trajectory, along a smooth surface, along a rugged surface, flat terrain, or hilly terrain. The calculated stress on the joint may be shear, tensile, compressive, torsional stress, or a combination of stress types. Joints may include design features to support the calculated stresses. The design features included on the joint may be configured to comply with a specific safety standard. For example the joint may be configured to withstand the calculated stress within a factor of safety of at least 1, 2, 3, 4, 5, 10, 15, 20, 25, 30, 35, 40, 45, or 50. Joints may be designed to support tubes over a frame that may vibrate or undergo shock or impact. For example, a vehicle chassis may be driven over a road, and may experience long-term vibrations. The joints may be able to withstand the forces and stresses exerted on the joint caused by the vibrations over a long period of time. In another example, a vehicle may experience an impact if the vehicle were to hit another object. The joints may be designed to withstand the impact. In some instances, the joints may be designed to withstand the impact up to a certain predetermined degree. Optionally, it may be desirable to for the joints to deform or alter their configuration beyond the predetermined degree and absorb shock. The joints may be designed to meet various frame specifications and criteria. In some cases, the joints may be designed to form a chassis that meets state or national safety requirements for consumer and/or commercial vehicles.

Figure 2B:
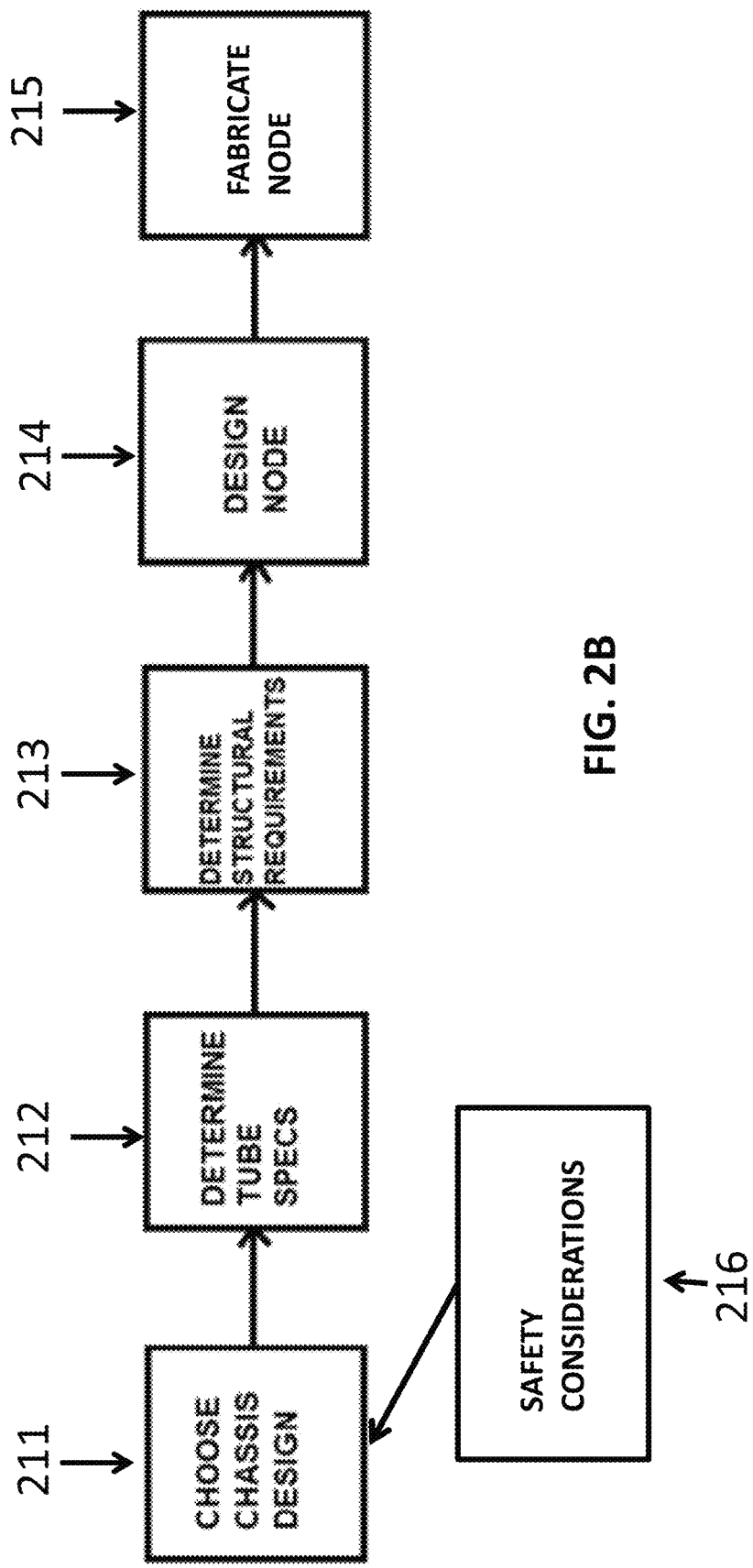
FIG. 2B shows an additional example of a flow chart of a process used to design and build joints.

FIG. 2B shows an additional example of a flow chart of a process used to design and build joints. As previously described, a chassis design may be chosen 211. The chassis design may be generated from scratch or may be selected from a set of pre-existing chassis design models. The chassis design may be modified from a pre-existing chassis design model. The chassis design may take safety considerations 216 into account. For instance, safety requirements, such as legal or private safety requirements may be considered when forming a chassis design.

For example, a software may be provided that may aid in the chassis design. A user interface, such as a graphical user interface on a screen or other type of display, may be provided that may permit user to determine a chassis design. In some embodiments, the software may be able to access the safety requirements. For instance, the safety requirements may be stored in a local memory of the software. The safety requirements may be updated in real-time, on a periodic basis, or on an event-driven basis (e.g., pulled by the software when the user makes a request, pushed from off-board the software, e.g., when there is as new safety requirement). Alternatively, the safety requirements may be stored off-board and may be accessible by the software on an as-needed basis.

When a user tries to form a chassis design, it may be determined whether the proposed design or design feature complies with the safety requirements. If the proposed design or feature does comply with the safety requirement, the user may proceed with the design. If the proposed design or feature does not comply with a safety requirement, the user may be alerted to the non-compliance with the safety requirement. The alert may optionally include information about why the design or feature does not comply with a safety requirement or with which safety requirement(s) it does not comply. The alert may optionally include suggestions on changes that can be made to comply with the safety requirements. A user may or may permitted to continue with the design or feature if it does not comply with the safety requirements. For instance, a user may be alerted of any non-compliance, but may be able to proceed with the design. Alternatively, the user may not be permitted to proceed with the design if non-compliant and the design may revert to an earlier step or stage that was in compliance.

In some instances, designing the chassis may be an iterative process. For instance, an initial chassis design may be provided. One or more vehicle scenarios, such as various crash or other safety related scenarios may be simulated using the initial chassis design. Based on the results of the simulation, the chassis design may be modified. Further simulations may occur on the modified chassis design. Any number of iterations of the design may occur. For each design and/or modification, safety considerations may be taken into account. In some embodiments, the simulations may provide an indication of how various components of the vehicle may move or deform during a scenario, such as a crash. The components of the vehicle may be designed with the overall design in mine and how the various components of the vehicle may move during the crash. The chassis design may provide a desired outcome for the scenario by absorbing more energy in various areas where desired, and absorbing less energy in various areas where desired. The chassis design may also control how the various components may shift, and may prevent certain components from moving in various directions, or may guide components in desired directions.

As previously described, once a chassis design has been obtained, tube specifications may be determined 212 as well as structural requirements 213. A node may be designed 214 based on tube specifications and/or structural requirements. The tube design, structural design, and/or node designs may take safety requirements into account. The safety requirements incorporated in the chassis design may perpetuate down to the individual component level. For instance, the tubes and/or nodes may have structural features or shapes that may function as a safety feature to meet the safety requirements.

Once the node has been designed, the node may be fabricated 215. The node may be 3-D printed or may undergo any other type of fabrication process. In some embodiments, other examples of fabrication techniques may include, but are not limited to, welding, milling, extrusion, molding, casting, or any other technique or combinations thereof.

Figure 3:
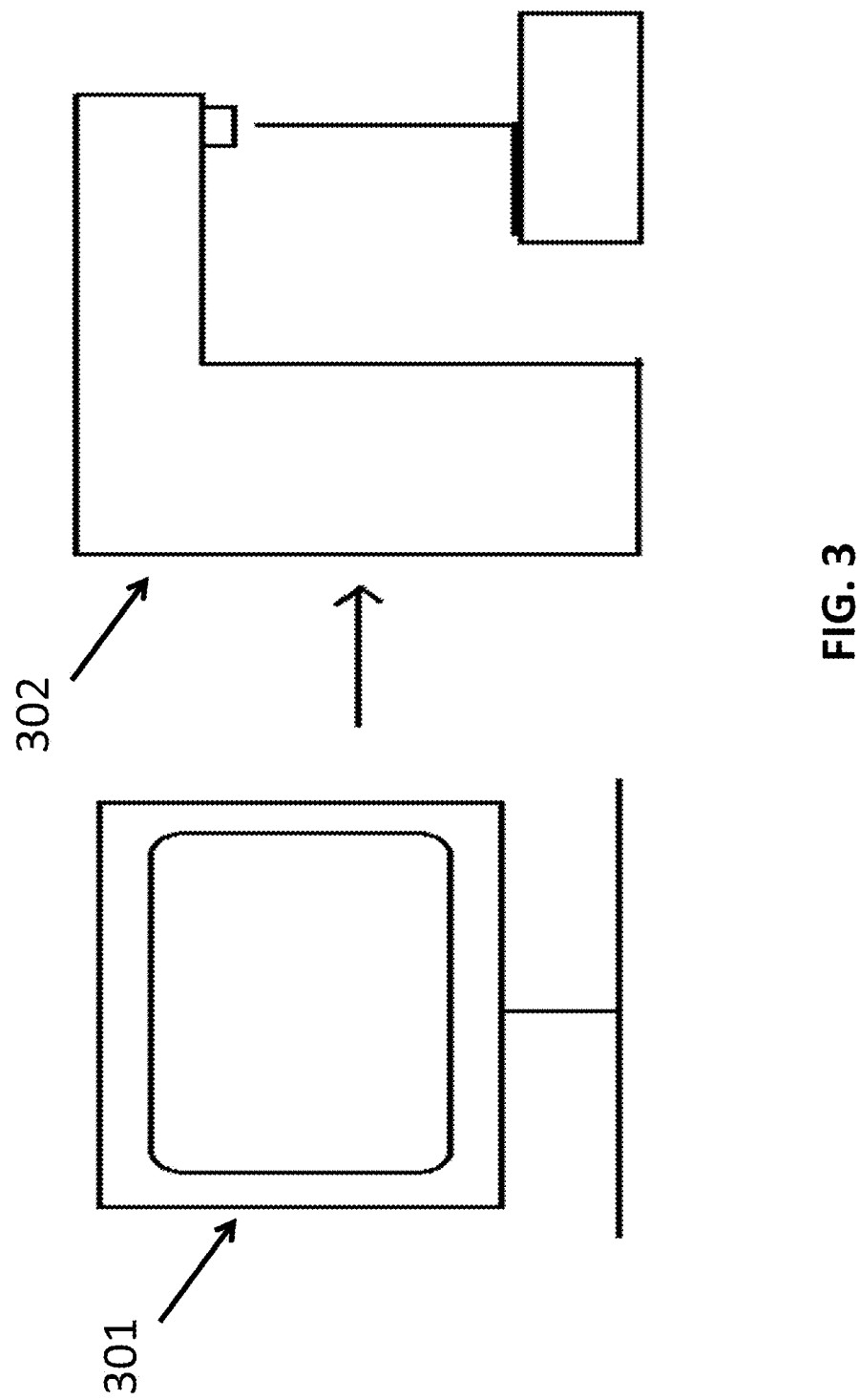
FIG. 3 shows a computer in communication with a 3-D printer.

The final joint design may be determined by the tube dimension and shape requirements, location of integrated structural, mechanical, electrical, and fluid components, and the calculated stress type and magnitude, along with any performance specifications. FIG. 3 shows a diagram of how a computational model of a joint meeting the necessary specifications may be developed in a software program on a device 301. The device may comprise a processor and/or a memory. The memory may comprise non-transitory computer readable media comprising code, logic, or instructions for performing one or more steps, such as the design steps or computations. The processor may be configured to perform the steps in accordance with the non-transitory computer readable media. The device may be a desktop computer, cell, smartphone, tablet, laptop, server, or any other type of computational device. The device may be in communication with a 3-D printer 302. The 3-D printer 302 may print the joint according to the design developed in the software program. The 3-D printer can be configured to generate an object through additive and/or subtractive manufacturing. The 3-D printer can be configured to form a metallic, composite, or polymer object. The 3-D printer may be a direct metal laser sintering (DMLS) printer, electron beam melting (EBM) printer, fused deposition modeling (FDM) printer, or a Polyjet printer. The 3-D printer may print joints made of titanium, aluminum, stainless steel, structural plastics, or any other structural material.

3-D printing may comprise a process of making a 3-dimensional structure based on a computational or electronic model as an input. The 3-D printer may employ any known printing technique including extrusion deposition, granular binding, lamination, or stereolithography. The general technique of 3-D printing may involve breaking down the design of the 3-dimensional object into a series of digital layers which the printer will then form layer by layer until the object is completed. Joints may be printed in a layer by layer fashion, and may accommodate a wide range of geometric designs and detailed features, which may include internal and external features.

The 3-D printed joints may be assembled with the tubes to form a frame structure. The design may be flexible to accommodate late design changes. For example if a support tube is added to the design late in the design process, additional joints can be printed quickly and at low cost to accommodate the additional support tube. The method of using a computer model in communication with a 3-D printer to generate joints may allow for a wide range of geometries to be produced quickly at low cost.

3-D printing can be used to form nodes (e.g., joints), connectors (e.g., tubes), and/or panels, honeycomb structures, and/or any portion of a vehicle. Any component, such as those described above, can be printed on any other type of structure or component, including but not limited to node, connector, panel, crossbars, beams, etc. The 3-D printer can be used to form connectors, such as tubes between joints. The 3-D printer can be used to print panels or features on panels. For instance, portions of the vehicle may use honeycomb structures in the panels. The 3-D printing technology as discussed herein may also be used to directly print structures directly onto and/or into the honeycomb panels. For instance, the honeycomb panel may have one or more exterior sheets. The printed features may be printed onto the exterior sheets. Alternatively, a portion of the exterior sheet may be removed (e.g., machined, or otherwise cut away) to expose the internal honeycomb structure. The printed features may be printed directly into the honeycomb structure. The printed features may be used for any function. In some examples, the printed features may aid in connecting the panel with one or more other components (e.g., other panels, connecting tubes, joints, etc.). In some instances, one or more nodes may be directly printed onto the panel and extend from a surface of the panel. The nodes may be printed on an exterior sheet or the internal honeycomb structure, or any combination thereof. The one or more other components may be further attached to the 3-D printed nodes using adhesives (e.g., glue), fasteners (e.g., bolts), or combinations thereof. Alternatively or in combination, other printing techniques, stamping, bending, extruding, casting, and/or other manufacturing methods may be used to manufacture any portion of a vehicle.

Figure 4A:
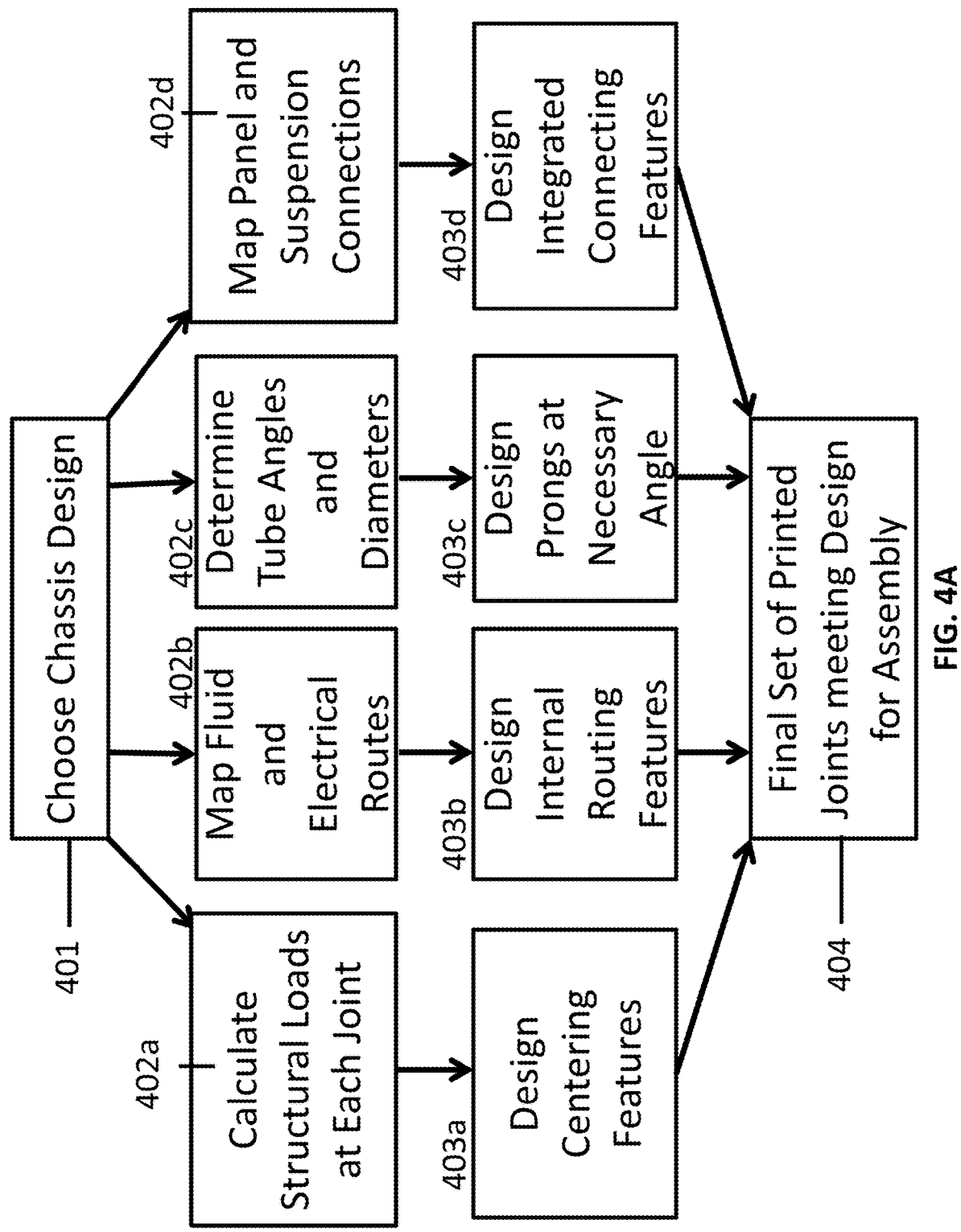
FIG. 4A shows a detailed flow chart describing how a design model may be used to generate printed joints for assembly of the given design model.

FIG. 4A shows a detailed flow chart of the method previously described. The steps described are provided by way of example only. Some steps may be omitted, completed out of order, or swapped out with other steps. Any of the steps may be performed automatically with aid of one or more processors. The one or more steps may or may not be performed with user input of intervention. The process begins with step 401, which involves choosing a frame design, such as a chassis design, the design may be chosen from a library of stored designs or it may be a new design developed for a specific project.

After the design is chosen the next steps are 402a, 402b, 402c, and/or 402d, which may include calculating structural needs or specifications for the joints of the frame. Steps 402a-d may be completed in any order, all steps 402a-d may be completed or only some of the steps may occur. Step 402a involves calculating the structural load at each joint. The structural load may be determined by a finite element method and may include the direction and magnitude of shear stresses, compressive stresses, tension stresses, torsional stress, or any combination of stresses. The stresses may be calculated assuming that the vehicle is in motion or assuming the vehicle is stationary. This may also include calculating any performance specifications, such as safety, manufacturing, durability specifications. Step 402b is to map the fluid and electrical routes throughout the vehicle. Examples of fluid passageways may include coolant, lubrication, ventilation, air conditioning, and/or heating ducts. Examples of electrical system that may require electrical routing from a source to a system may include audio systems, interior lighting systems, exterior lighting systems, engine ignition components, on board navigation systems, and control systems. Step 402c is the determination of the tube angle, shape, and size at each joint. In step 402d the structural components such as panel and suspension connections are mapped.

Following the calculation of the joint needs/specifications in steps 402a-d the joint member may be designed to accommodate the joint needs/specifications in steps 403a-d. The joint design method may comprise steps 403a-d. Steps 403a-d may be completed in any order, all steps 403a-d may be completed or only some of the steps may occur. The known stress profile at each joint may determine the wall thickness of the joint, the joint material, or necessary centering features to print on the joint 403a. After the fluid and electrical routes are mapped corresponding internal routing features may be designed to be printed on the joints 403b. The joint may have separate internal routing features for the fluid and electrical pathways or the joint may have one routing feature shared by fluid and electrical passageways. After determining the tube angle, shape, and size the joint may be designed 403c such that it can accommodate the necessary tubes while meeting the other specifications. Using the map determined in 402d, the locations of integrated connecting features are designed to be printed on the joints 403d. Such design steps may occur in sequence or in parallel. The various joint design needs may be considered in combination when designing the joint for printing. In some instances, the 3-D printing process may also be considered in designing the joint.

In the final step 404 a set of printed joints are produced for used in the frame assembly chosen in 401. The printed joints may be 3-D printed in compliance with the joint designed using the collective considerations of steps 403a-d. The printed joints may be used to complete the assembly of the chassis.

The 3-D printing method described herein adapted to fabricate joints for connecting tubes may decrease the time required to assemble a chassis. For example the total time to design and build a chassis may be less than or equal to about 15 min, 30 min, 45 min, 1 hour, 2 hours, 3 hours, 4 hours, 5 hours, 6 hours, 7, hours, 8 hours, 9 hours, 10 hours, 12 hours, 1 day, 2 days, 3 days, 4 days, 5 days, 6 days, 1 week, 2 weeks, 3 weeks, 4 weeks, or 1 month. In some instances, the printing of a joint itself may take less than or equal to about 1 min, 3 min, 5 min, 10 min, 15 min, 20 min, 30 min, 40 min, 50 min, 1 hour, 1.5 hours, 2 hours, 2.5 hours, or 3 hours. The time required to assemble a chassis may be reduced because the 3-D printing method may require fewer tools than a typical manufacturing method. In the method described herein, a single tool (e.g. 3-D printer) may be configured to fabricate a plurality of joints with different specifications (e.g., sizes/shapes). For example, a series of joints may be printed using a single 3-D printer that all have the same design. In another example, a series of joints may be printed using a single 3-D printer, the series of joints having different designs. The different designs may all belong to the same frame assembly, or may be printed for different frame assemblies. This may provide a higher degree of flexibility in scheduling joint print jobs at a site, and may permit a manufacturer to optimize production of joints to meet specified goals. In some cases, the 3-D printer can be sized and shaped such that it can be transported to a site where a vehicle is being built. Furthermore, 3-D printing may increase quality control or consistency of joints.

The manufacturing process described by FIG. 4A may reduce manufacturing time and expense. Manufacturing time and/or expenses can be reduced by reducing the number of tools required to form one or more joints. All of the joints can be formed with a single too, the 3-D printer. Similarly, manufacturing time and/or expenses can be reduced by a higher level of quality control compared to other manufacturing techniques that is provided by the 3-D printer. For example the cost of producing joints using the method previously described may reduce manufacturing costs by at least 5%, 10%, 15%, 20%, 30%, 40%, 50%, 60%, 70%, 80%, or 90% compared to other methods. The use of 3-D printing for the manufacturing of joints to connect tubes in a space frame allows each joint to have different shape and dimensions without requiring separate molds or tools for each joint. The 3-D printing process for joints may be easily scaled.

Figure 4B:
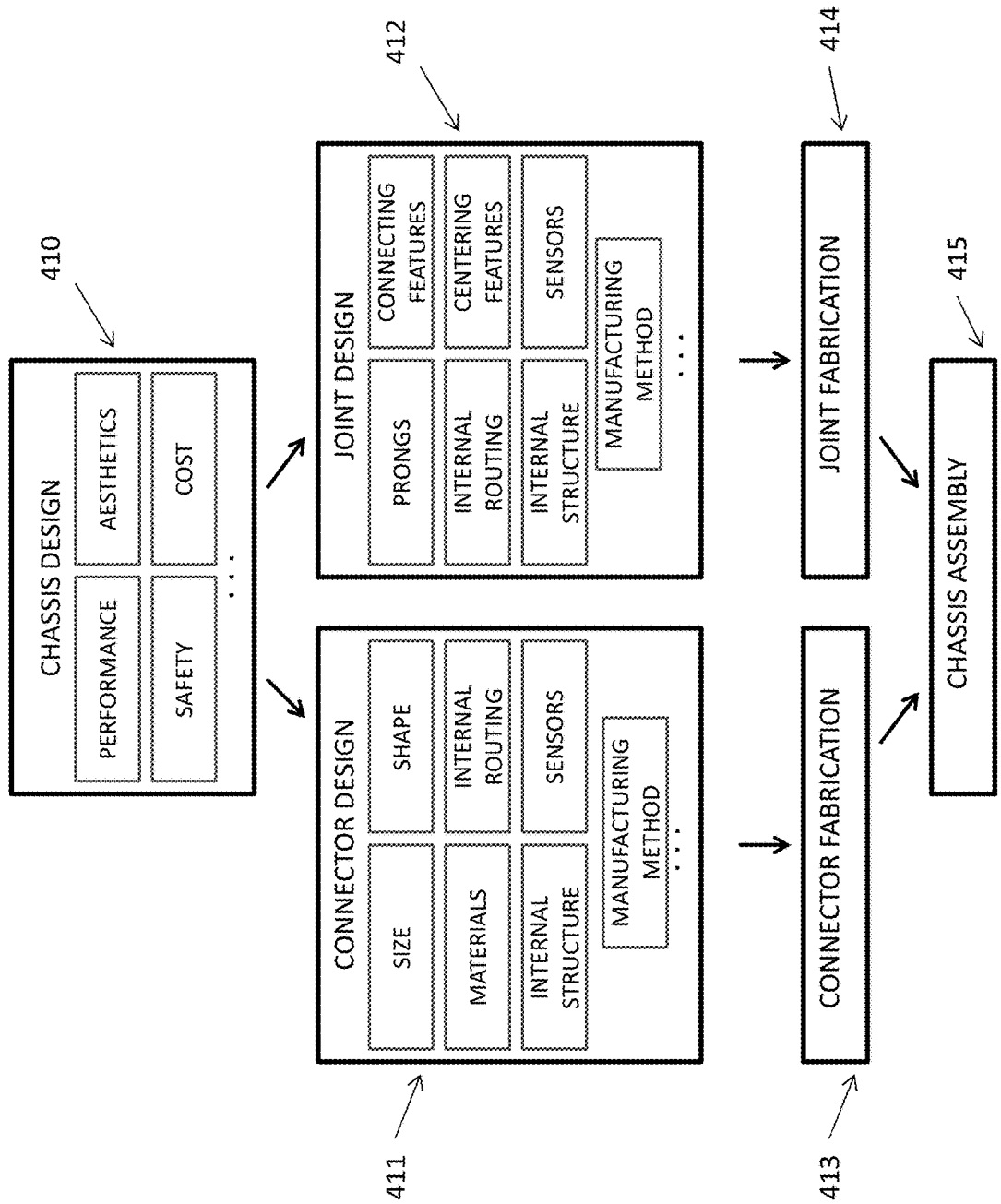
FIG. 4B shows an example of a flow chart for a fabrication process.

FIG. 4B shows an example of a flow chart for a fabrication process. The fabrication process may be used for fabricating a chassis. Any illustration in FIG. 4B of a chassis design can be used for designing and/or manufacturing chassis modules (e.g., as discussed in FIG. 1C), chassis sub-structures (e.g., as discussed in FIG. 1D), chassis sub-assemblies (e.g., as discussed in FIG. 1D), and/or other portions/parts of a chassis. Sub-assemblies may be assembled to form chassis modules. Chassis modules may further be assembled to form a chassis. The end product of the process illustrated in FIG. 4B can be a chassis module, a chassis sub-structure, a chassis sub-assembly, and/or other portions/parts of a vehicle chassis.

The fabrication process may include a design stage and a manufacturing stage. The design stage may include chassis design 410 (or chassis module design, sub-assembly design, sub-structure design, sub-section design, etc.). The chassis design may be used to determined connector (e.g., tube) design 411 and/or node (e.g., joint) design 412. Sub-assemblies for different chassis modules may have different numbers of nodes and/or connectors fabricated with different designs, shapes, structures, and/or materials. Chassis modules for different vehicle chassis may have different numbers of sub-assemblies fabricated with different shapes, structures, and/or assembly processes. The manufacturing stage may include connector (e.g., tube) fabrication 413 and/or node (e.g., joint) fabrication 414. The connectors and/or nodes may be assembled together to form a sub-assembly, chassis module, and/or chassis 415.

In some instances, an individual node may be assigned with a distinct node identifier and an individual connector may be assigned with a unique connector identifier, such that each node and each connector can be tracked in design, manufacturing, assembly, optionally inventory, maintenance, fixing, replacing, scrapping, and/or any other stages. A sub-assembly formed from nodes and connectors may be assigned with a sub-assembly identifier for tracking purpose in various stages of fabrication and/or usage of the vehicle. A chassis sub-structure formed from sub-assemblies may be assigned with a chassis sub-structure identifier for tracking purpose in various stages of fabrication and/or usage. A chassis module formed from sub-assemblies may be assigned with a chassis module identifier for tracking purpose in various stages of fabrication and/or usage of the vehicle. The identifier of any part may be a barcode, a QR code, a serial number, a string of characters, numbers, and/or marks, or combinations thereof. The identifier may be stamped, etched, engraved, adhered, or printed on the corresponding part.

A database (e.g., a library, vehicle design repository) may be created and used during the design stage. The database may be stored on one or more non-volatile memories of a computing device. The database may be stored on a local computing device of a user/designer. The database may also be stored on a cloud infrastructure which can be accessible by multiple users at various locations. The nodes and connectors, chassis sub-assemblies, chassis sub-structures, chassis modules, and/or chassis that have been designed and manufactured for an individual vehicle may be recorded in the database. Various characteristics and corresponding identifiers of each part may be recorded in the database. Such database may be used as a template when a user starts to design and manufacture another vehicle. Such database may also be used as references for maintaining and/or upgrading a previously fabricated vehicle.

Tables 1, 2, and 3 are examples of various characteristics of vehicles made with nodes, connectors, sub-assemblies, and chassis modules. One or more characteristics listed in the tables may be recorded as database entries for fabricating other vehicles or upgrading a previously fabricated vehicle.

Table 1 is an example used for fabricating a vehicle chassis.

TABLE 1

An example of a database entry for fabricating a vehicle chassis (e.g., at a vehicle level)

| Vehicle level: | Min | Max |
|---|---|---|
| Number of Nodes in Vehicle | 10 | 200 |
| Number of Panels in Vehicle | 0 | 150 |
| Number of Tubes in Vehicle | 10 | 1000 |
| Number of Modules in Vehicle | 1 | 10 |
| Vehicle torsional stiffness (Nm/deg) | 1000 | 30000 |
| Range of vehicle mass (lbs) | 600 | 23000 |
| Number of wheel wells for wheel attachments | 0 | 18 |
| Number of crumple zones | 0 | 8 |
| Library of structures containing standard parts for fast design (tubes from x thickness and y, from x +/− z) | Diameter: 1 to 100 mm Wall thickness: 0.5 mm to 10 mm Length: 10 mm to 6000 mm | |
| Max vehicle x-axis deceleration during impact on NHTSA tests | 0 | 100 g |
| Max vehicle y-axis deceleration during impact on NHTSA tests | 0 | 100 g |
| Max vehicle z-axis deceleration during impact on NHTSA tests | 0 | 40 g |
| Max passenger x-axis deceleration during impact on NHTSA tests | 0 | 100 g |
| Max passenger y-axis deceleration during impact on NHTSA tests | 0 | 100 g |
| Max passenger z-axis deceleration during impact on NHTSA tests | 0 | 40 g |
| Node features to achieve deceleration above (crumple zones, low density regions, breakaway structures, printed force diverting structures) | 0 | 10 |
| Range of module volume reduction based on impact (0-z) | 0 | 10 |

Table 2 is an example used for fabricating a chassis module.

TABLE 2

An example of a database entry for fabricating a chassis module

| Module level: | Min | Max |
|---|---|---|
| Number of Nodes in Modules | 2 | 20 |
| Number of Panels in Modules | 0 | 15 |
| Number of Tubes in Modules | 6 | 100 |
| Dimensions of modules (mm) | 100 | 1500 |
| Shapes of modules: pyramid triangle, square, trapezoid, 2 d 3 d, etc. | any polytope inlcudeing polyhedrons, tetrahedron, icosidodecahedron, rhomic triacontahedron, great cubicboctahedron, polygon, triangle, quadrilateral, pentagon, hexagon, heptagon | |
| Mix of node size (x smaller than L, y larger than L) | 100 smaller than 200 mm^3; 100 larger than 200 mm^3 | |
| number of crumple zones | 0 | 8 |

Table 3 is an example used for fabricating nodes, connectors and/or panels

TABLE 3

An example of a database entry for fabricating nodes, connectors and/or panels

|  | Min | Max |
|---|---|---|
| Nodes/junctions/panels: | | |
| Size of joints (mm) | 0.1 | 100 |
| Wall thickness (mm) | 0.1 | 50 |
| Number of injection ports(1-6, think multi joint connections) | 1 | 6 |
| # of o-rings | 0 | 5 |
| shape of bars (number of sides) | 2 | 10 |
| number of crumple features | 0 | 4 |
| Tubes per node | 1 | 10 |
| Nodes/panel | 1 | 10 |
| Junctions per node | 0 | 8 |
| rivets per node | 0 | 50 |
| Fasteners per node | 0 | 50 |
| Weight of Panels | 100 g | 100000 g |
| Weight of Joints | 10 g | 10000 g |
| Inserts per Panel | 0 | 1000 |
| reinforcements per panel | 0.1 | 10 |
| spreader plate thickness (mm) | 2 | 4 |
| reinforcement printed strut forks (2 for pencil brace to 4 for complex major support) | 1 | 20 |
| materials | (Al, Ti, Steel) | |
| Internal Structure: | | |
| Bone like (wall thickness) (mm) | 0.01 | 5 |
| Geometric features (characteristic length)(mm) | 0.1 | 1000 |

Chassis design 410 may incorporate one or more factors such as performance, aesthetics, safety, and/or cost. Additional or alternative factors may be considered. Performance may include factors such as number of passengers or internal space for passengers, load to carry, storage space, mileage, aerodynamics, stiffness, torsion, horse power, motor power or speed, acceleration, overall size and/or volume, overall weight, durability, suspension, or any other factors. Aesthetics may include factors relating to visual appearance of car, sound of car, or overall feel. Safety may relate to one or more safety requirements or metrics that may be met by the vehicle, as described in greater detail elsewhere herein. Safety may include factors that comply with any regulations required by a transportation entity. A transportation entity may be a government agency such as National Transportation Safety Board (NTSB), Federal Aviation Administration (FAA), Coast Guard, National Transportation Safety Commission, Department of Transportation, and/or any other governmental, non-governmental, regulatory bodies. Cost considerations, such as cost of materials, manufacturing, or labor may be considered.

The chassis design may inform the connector design 411. As previously discussed, the connectors may include connecting tubes. Various factors for the connectors may be affected by the chassis design (e.g., any factors of the chassis design). For instance, connector size, shape (e.g., cross-sectional shape, lateral shape), materials, internal routing features (if any), internal structure (if any), built-in sensors (if any), or other factors may be determined for connector design. One or more of the connector design factors may be affected by performance, aesthetics, safety, or cost for the vehicle. Manufacturing methods may also be selected during the design stage. For example, a node, a connector, a panel, a sub-assembly, a chassis module, and/or a chassis may be selected to be manufactured using 3-D printing, stamping, bending, extruding, casting, or combinations thereof. Various combinations of manufacturing methods may be used to fabricate a chassis. Examples of possible connector features are provided in greater detail further below.

The chassis design may also inform the joint design 412. In some instances, the joint design may be determined based on connector design, or vice versa. The overall shape of the chassis design may be considered when determining individual connector design and/or joint design. Various factors for the joints may be affected by the chassis design (e.g., any factors of the chassis design). For instance, design of joint prongs, joint connecting features, joint centering features, materials, internal routing features (if any), internal structure (if any), built-in sensors (if any), or other factors may be determined for joint design. One or more of the joint design factors may be affected by performance, aesthetics, safety, or cost for the vehicle. Examples of possible joint features are provided in greater detail further below.

The connector may be fabricated 413 as designed. Any fabrication technique may be used for the connector, including but not limited to, 3-D printing, braiding, composites, lithography, welding, milling, extrusion, molding, casting, or any other technique or combinations thereof. Similarly, a joint may be fabricated 414 as designed. Any fabrication technique may be used for the connector, including but not limited to, 3-D printing, braiding, composites, lithography, welding, milling, extrusion, molding, casting, or any other technique or combinations thereof. Different techniques may be used for connector fabrication and joint fabrication. Alternatively, the same technique or techniques may be used for connector fabrication and joint fabrication. The connector and/or joint fabrication may occur as part of an automated process. The connector and/or joint fabrication may occur with aid of one or more machines that may in communication with a computing device that may aid in the connector design and/or the joint design. Direct communications may be provided between the computing device and the one or more machines used for fabrication, or indirect communications may be provided over a network. In some instances, one or more manual steps may occur during connector and/or joint fabrication.

Chassis assembly may occur 415. The chassis assembly may include the connection of one or more connectors to one or more joints to form a space frame chassis. In some embodiments, adhesives or other techniques may be used to permanently affix the one or more connectors to the one or more joints. The chassis assembly may occur as part of an automated process. The assembly may occur with aid of one or more machines that may in communication with a computing device that may aid in the connector design and/or the joint design. Direct communications may be provided between the computing device and the one or more machines used for assembly, or indirect communications may be provided over a network. In some instances, one or more manual steps may occur during assembly. Thus, a vehicle chassis may be assembled that may take original chassis design factors into account, which may include safety.

Figure 4C:
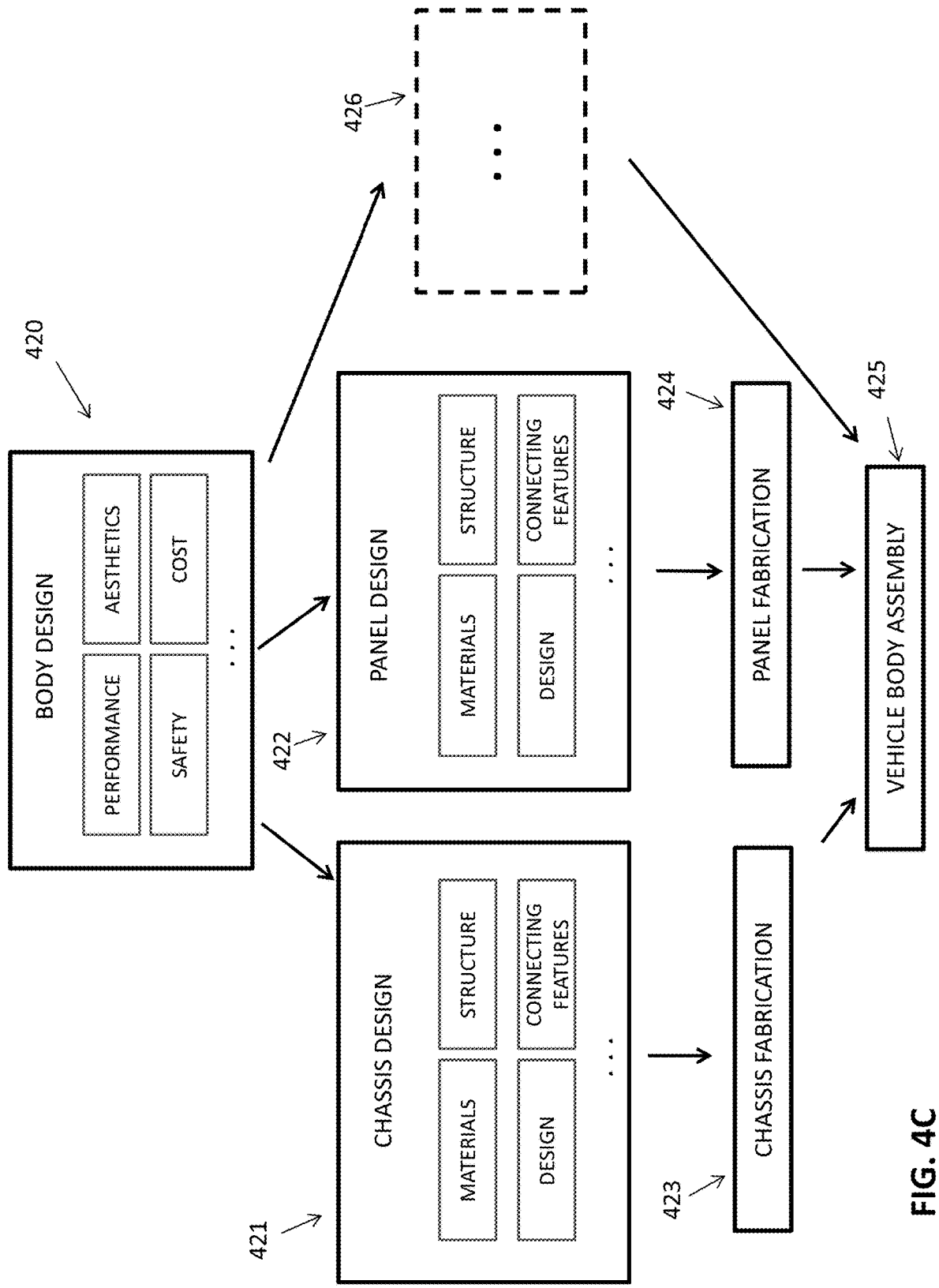
FIG. 4C shows an example of a flow chart for a vehicle body fabrication process.

FIG. 4C shows an example of a flow chart for a vehicle body fabrication process. The fabrication process may include a design stage and a manufacturing stage. The design stage may start from body design 420. The body design may be used to determine chassis design 421 and/or panel design 422. The body design may also be used to determine chassis modules and/or sub-assemblies. The manufacturing stage may include chassis fabrication 423 and/or panel fabrication 424. The design stage and manufacturing stage may also be used for fabricating other parts 426 of a vehicle, such as engine, fuel system, electronics, sensors, etc. In some instances, the nodes may be smart nodes that are integrated with sensors for detecting forces, usage states, pressures, temperatures, and/or any other parameters. The smart nodes may be used for sending warnings when the vehicle has abnormal status. The smart nodes may also be used for tracking parts of the vehicle. The chassis and panel fabrication may occur in series, in parallel and/or may be integrated with one another. The chassis and the panels may be assembled together to form a vehicle body 425.

Body design 420 may incorporate one or more factors such as performance, aesthetics, safety, and/or cost. Additional or alternative factors may be considered. Performance may include factors such as number of passengers or internal space for passengers, load to carry, storage space, mileage, aerodynamics, stiffness, torsion, horse power, motor power or speed, acceleration, overall size and/or volume, overall weight, durability, suspension, or any other factors. Aesthetics may include factors relating to visual appearance of car, sound of car, or overall feel. Safety may relate to one or more safety requirements or metrics that may be met by the vehicle, as described in greater detail elsewhere herein. Safety may include factors that comply with any regulations required by a transportation entity. A transportation entity may be a government agency such as National Transportation Safety Board (NTSB), Federal Aviation Administration (FAA), Coast Guard, National Transportation Safety Commission, Department of Transportation, and/or any other governmental, non-governmental, regulatory bodies. Cost considerations, such as cost of materials, manufacturing, or labor may be considered.

Chassis design 421 may incorporate one or more factors such as materials, structure, design, and/or connecting features. As for materials to fabricate the chassis or components thereof, individual connectors, nodes, sub-assemblies, and/or chassis modules, carbon tube fiber may be used to reduce the weight. Alternatively or in combination, metal materials, such as aluminum, steel, iron, nickel, titanium, copper, brass, silver, or any combination or alloy thereof, may be used to absorb more energy during deformation thus provide better safety and other performance features. Various techniques may be used to connect different parts of a chassis. For example, adhesives may be used to connect nodes and connectors. Alternatively or in combination, fastening techniques may be used to provide flexibility for swapping modules or parts of a chassis.

Panel design 422 may incorporate one or more factors such as materials, structure, design, and/or connecting features. The sheets may be made of carbon fibers to reduce chassis weight. The sheets may alternatively or additionally made from metal materials, such as aluminum, steel, iron, nickel, titanium, copper, brass, silver, or any combination or alloy thereof. Advantages of using metal materials may include improving puncture resistance. The panels may have various structures, such as plain sheets, honeycomb, sandwiched sheets including internal structures such as honeycomb structure, bone structure, and/or any other suitable 2D or 3D structures as discussed herein. Panels may be formed by honeycomb structures to allow enhanced strength by using reduced amount of materials, weight and cost. Alternatively or additionally, panels may be formed by sandwiching honeycomb structures between sheets. Alternatively or additionally, panels may be formed to contain any suitable internal structures, such as bone structure described further herein.

The chassis design may inform the chassis fabrication 423. The panel design may inform the panel fabrication 424. Any fabrication technique may be used for chassis and/or panel fabrications, including but not limited to, 3-D printing, braiding, composites, lithography, welding, milling, extrusion, molding, casting, or any other technique or combinations thereof.

Fabrications may occur as part of an automated process. Fabrication may occur with aid of one or more machines that may in communication with a computing device that may aid in the connector design and/or the joint design. Direct communications may be provided between the computing device and the one or more machines used for fabrication, or indirect communications may be provided over a network. In some instances, one or more manual steps may occur during fabrication.

Vehicle body may be assembled 425. The assembly at various stage may include the connection of one or more connectors to one or more joints to form a space frame for a corresponding part, e.g., chassis and/or panel. The assembly may also include connection of chassis to the panels. In some embodiments, adhesives or fastening or other techniques may be used to connect the one or more connectors to the one or more joints. The assembly may occur as part of an automated process. The assembly may occur with aid of one or more machines that may in communication with a computing device that may aid in the connector design and/or the joint design. Direct communications may be provided between the computing device and the one or more machines used for assembly, or indirect communications may be provided over a network. In some instances, one or more manual steps may occur during assembly. Thus, a vehicle body may be assembled that may take original design factors into account, which may include safety.

Figure 17B:
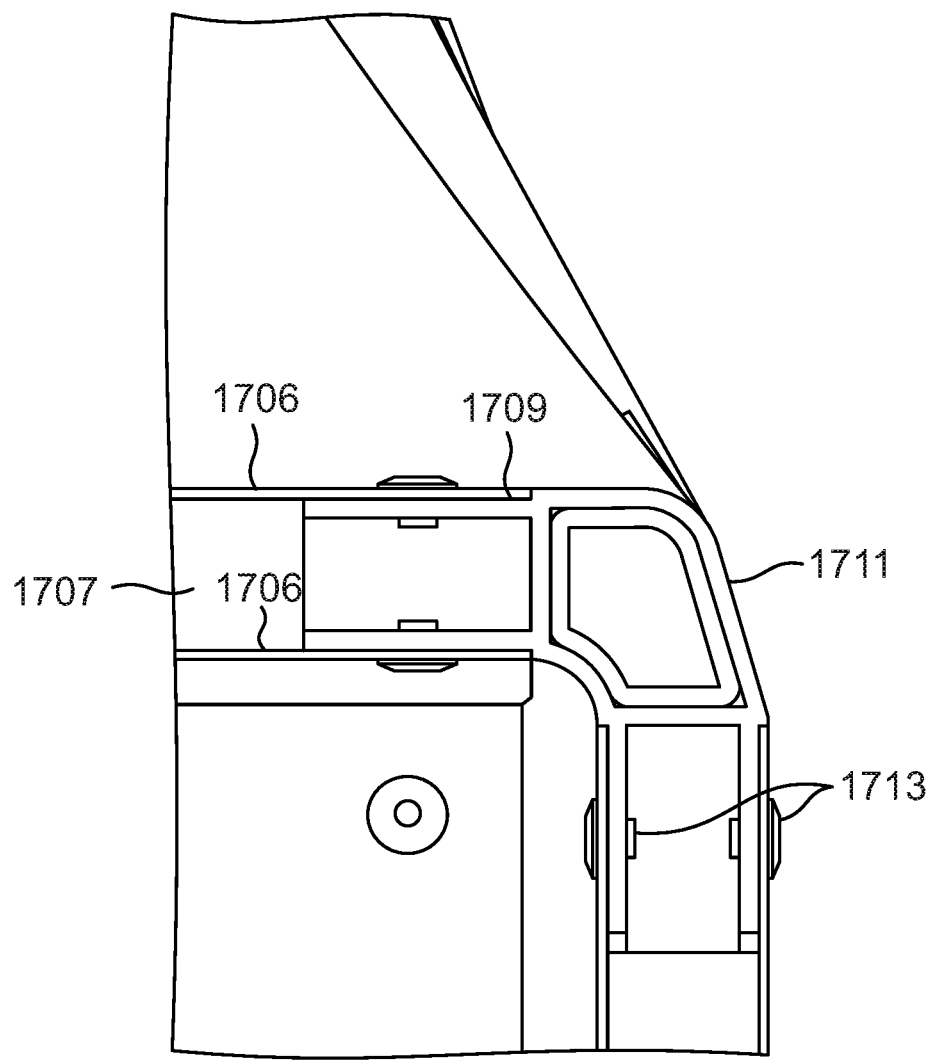

FIGS. 17A-17G show various embodiments of connecting various vehicle components, such as the joints, tubes, and/or panels. FIG. 17A shows an example of connecting a tube 1701 (e.g., a connector) with a node 1703 (e.g., a joint) using a slip-on structure 1700. The node may have a hollow structure for the tube to insert through the hollow center of the node. This slip-on structure may allow for a continuous tube structure to extend through the node. In some cases, after the tube is inserted through the node, additional fixing means such as adhesives may be applied to further enable a coupling between the tube and the node. For instance, the node may comprise structures such as grooves 1705 for infusion sealing. The continuous tube connected with the node may provide better load paths and improved tolerance control over a long dimension.

FIG. 17B shows an example of connecting a panel with a node. The node may have extrusions 1709 to extend from the body of the node, and the extrusions may function as connecting features to engage with the panels. For example, panel skin sheets 1706 may engage with the extrusions of the node. In some cases, the panel skin sheets may be formed with extrusion features such as flanges at the end of the panel to be engaged with the nodes. Fasteners 1713 (e.g., bolts, screws, rivets, clamps, interlocks) may be used to fixedly connect the panel with the node. The panel may include various internal structures 1707, such as honeycomb foam or bone structure. The variety of internal structures may be fabricated using 3D printing. In some instances, the panel may be pre-drilled to accelerate riveting to shear panels. Alternatively, adhesives may be applied to the interface of the extrusion and the panel skin to form a connection.

Figure 17C:
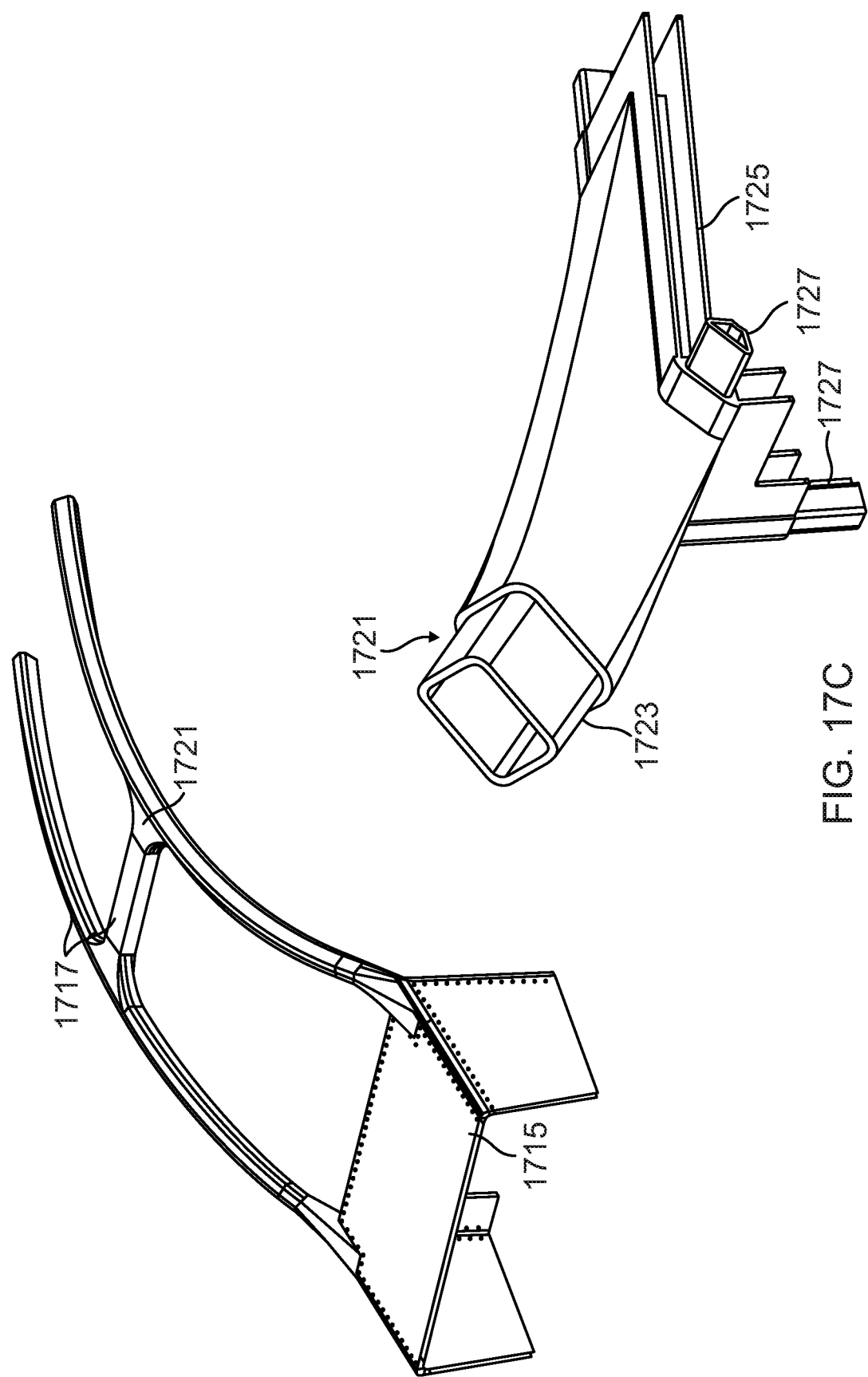
Figure 17D:
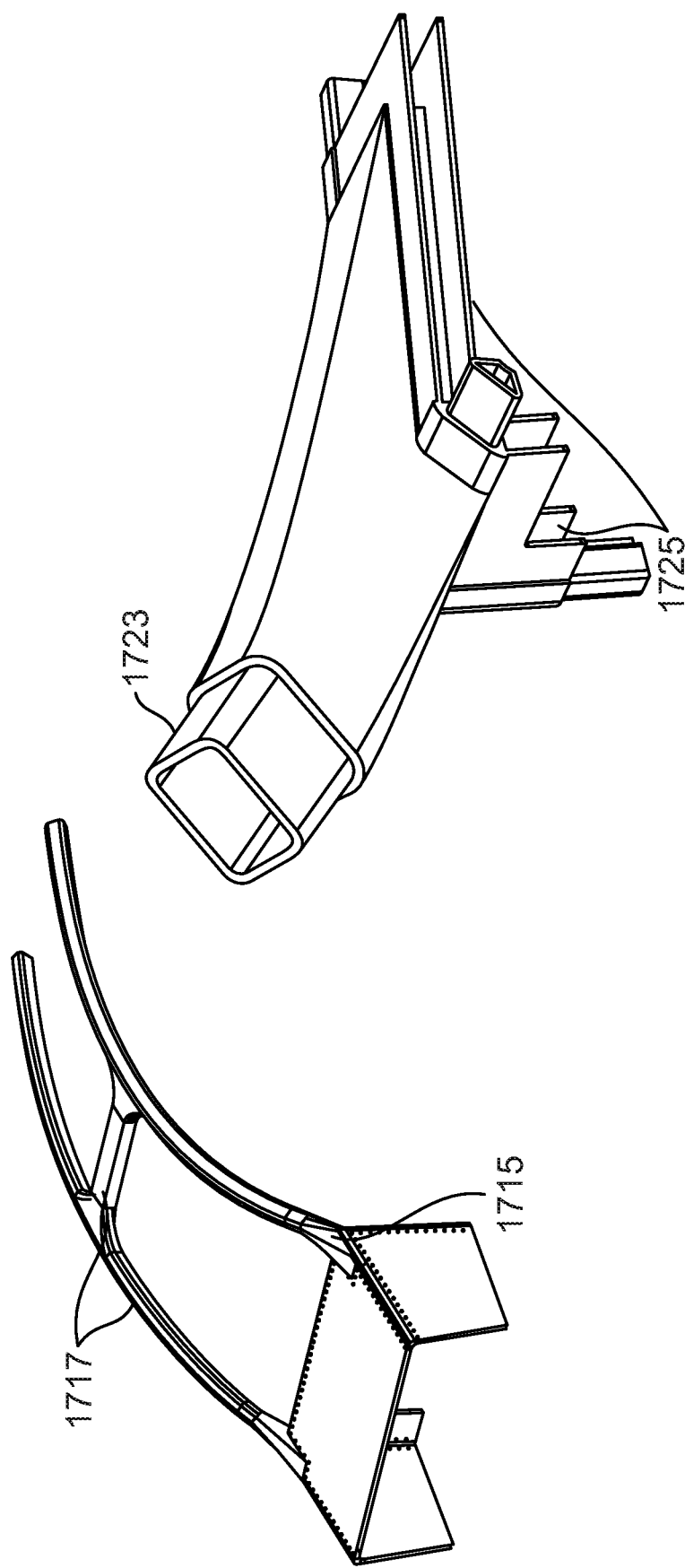

FIGS. 17C-17D show examples of smooth connections between panels 1715 and tubes 1717. Panels may be connected to tubes using via one or more nodes 1721. Adhesives and/or fasteners may be used to connect the panels and the tubes. Alternatively or additionally, standard or custom extrusions or tubes may be formed directly from the panels, using 3-D printing, braiding, composites, lithography, welding, milling, extrusion, molding, casting, or any other technique or combinations thereof. Nodes may be formed on the tubes to provide strong connection between two tubes. Nodes may be formed by 3-D printing, welding, extrusion, molding, casting, or any other technique or combinations thereof. Nodes may be formed in various configurations, for example, a node may have a large socket 1723 to connect with a tube. A node may also have panel mounting flanges 1725 and interfaces 1727 for extrusions. Smooth structural transitions provided by these connecting methods may reduce stress concentrations while maintaining positional accuracy.

Figure 17E:
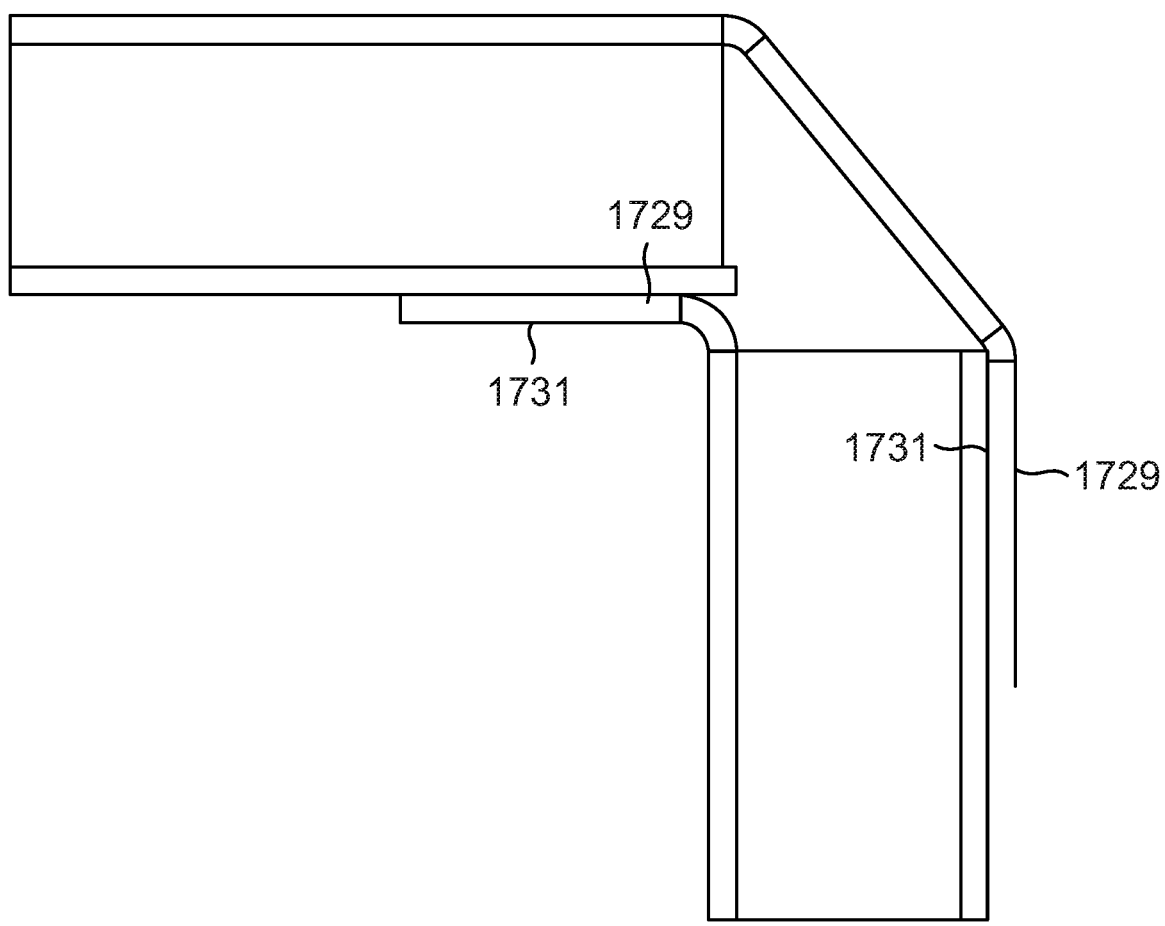

FIG. 17E shows an example of shear panel connections without additional pieces (e.g., without using nodes). Two panels may be connected to each other at a certain angle. The angle may be in a range for example from 5 degree to 175 degree. In some cases, the angle may be determined by a geometry of flanges extended from skin sheets of the panel. A panel may include a sandwiched structure including a honeycomb or a bone structure sandwiched between two thin sheets. At the end of each panel, one or more flanges 1729, 1731 may be formed to extend from the outer or inner sheet. The extended flanges may curve at a certain angle. The flanges may include holes for applying fasteners to connect a flange of a panel with the skin or the sheet of a another panel. Various other coupling means may be applied such as adhesives to connect the two panels. This structure may allow for more continuous stress propagation and reduced part count.

Figure 17F:
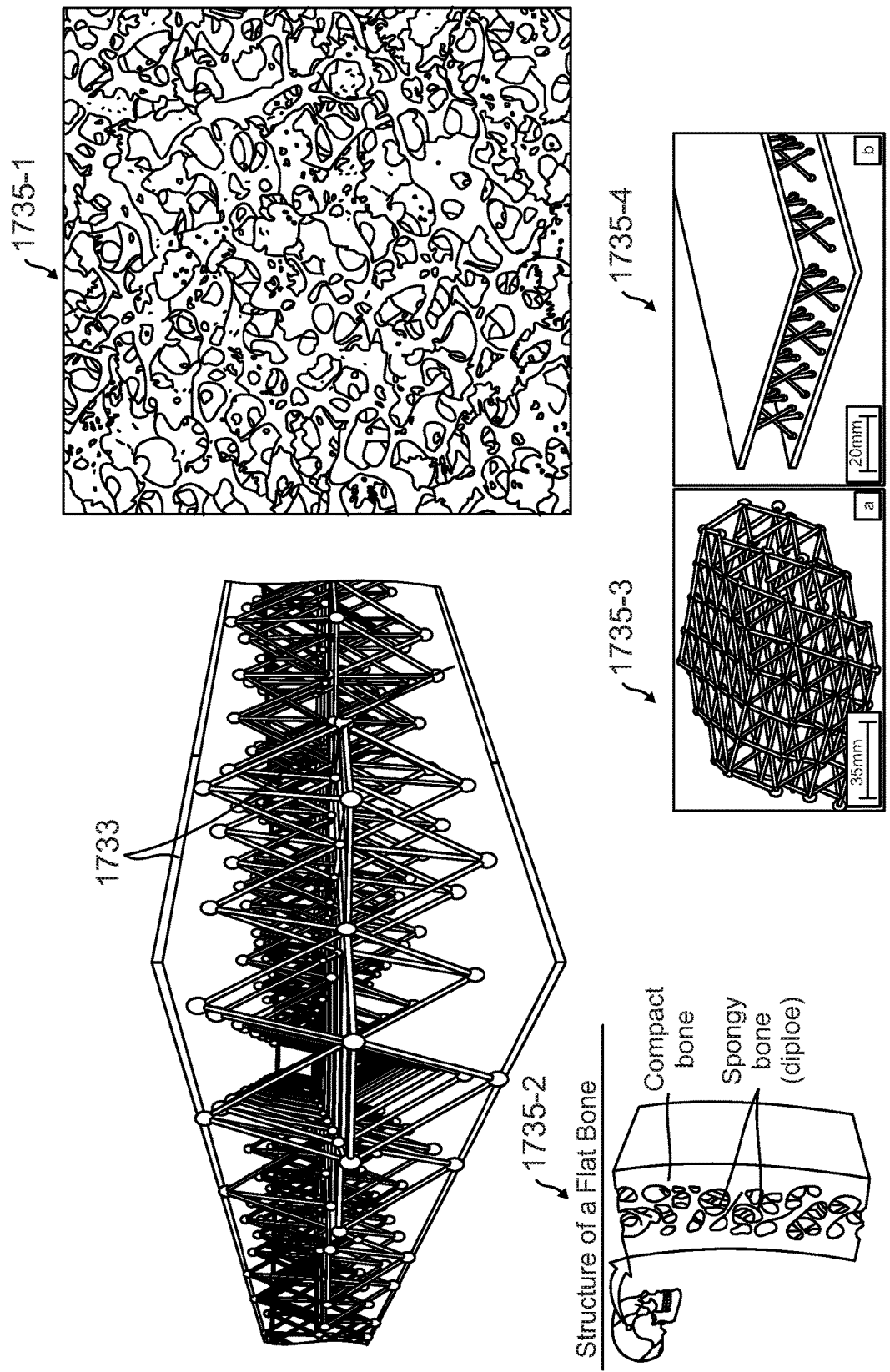

FIGS. 17F-17G show examples of internal structures of the panels. The panel may include an internal structure (e.g., sandwich panel core) sandwiched between a pair of thin sheets 1733. The internal structure may include honeycomb structure, bone structure 1735-2, porous structure 1735-1, tetrahedral bracing 1735-4, columnar structure, or any other suitable structures. The internal structure may include biomimetic structures. The internal structure may or may not be evenly distributed. For example, the shapes of the internal structures can be optimized for loading in specific places. In some cases, a direction and/or dimension of the internal structures may be designed to meet loading requirement. In FIG. 17G, a panel including honeycomb structure with foam fillings may be formed between two sheets 1737. The honeycomb structure may comprise an array of hexagonal tubular cells with walls which extend in the thickness direction of the panel. In some cases, some of the cells may be filled with a foam material. The honeycomb structure may be formed using 3D-printing. Strengthened features (e.g., hard points) may be printed on the honeycomb structure for attachments. In some cases, the panel may further comprise potting or foam 1739 between the two skin sheets. In some cases, the space between the internal structures may be filled with potting material. In some cases, strengthened features (e.g., hard points) may be printed on the honeycomb structure for attachments.

Figure 18A:
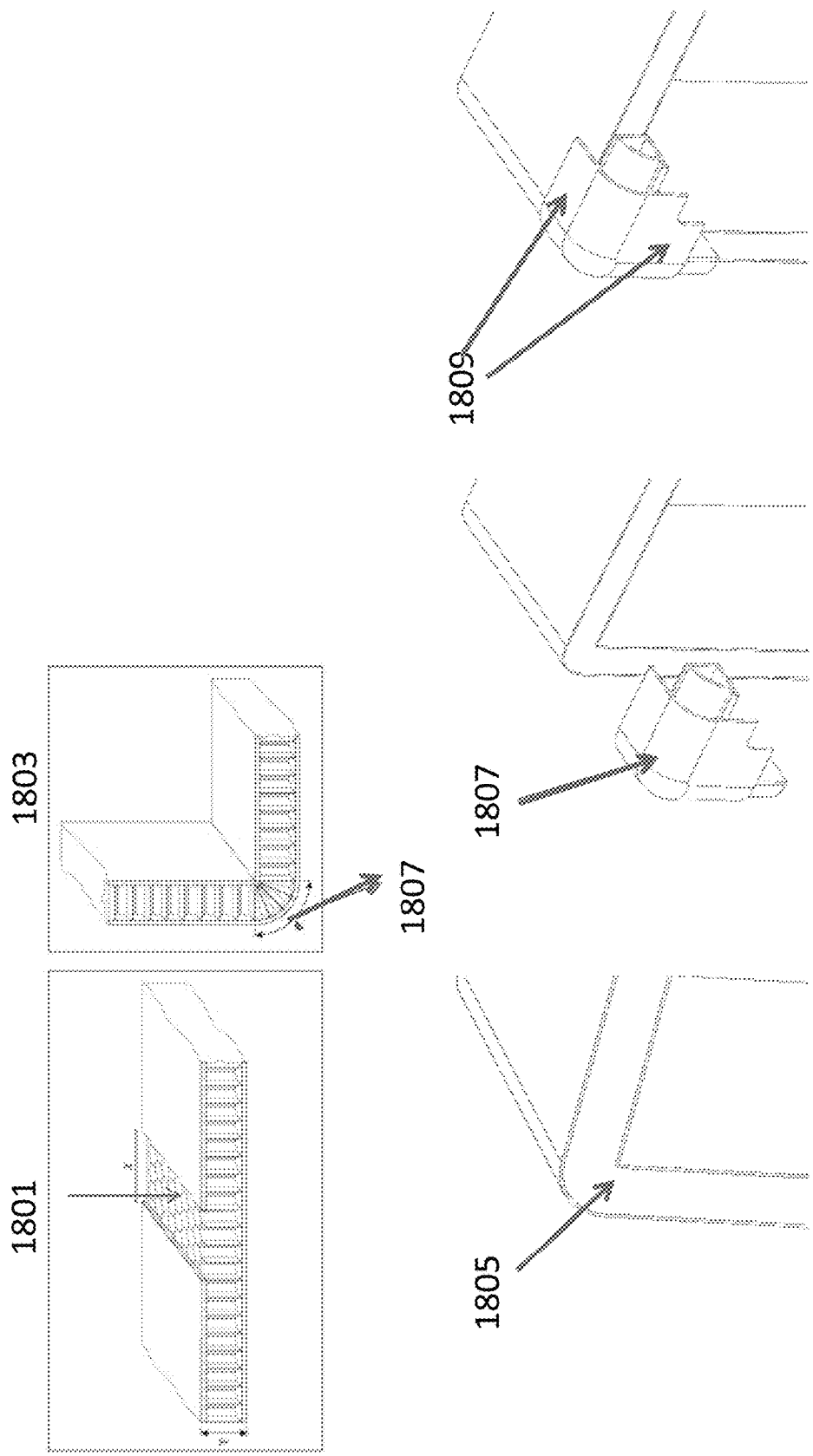

FIGS. 18A-18K show various examples for fabricating various vehicle components. As shown in FIG. 18A, a vehicle component such as a panel may comprise internal honeycomb structures. The panel may have a flat plate shape. In some cases, the panel may be bent to form a desired angle 1807. For example, a portion of a panel may be removed (e.g., scraped or cut away) to expose a portion of the internal honeycomb structure 1801. The panel may bend to form a desired angle 1803. A dimension of the removed area 1801 may have a geometric relationship with the formed angle 1807. For instance, an arc length around the formed angle may correspond to a width of the removed area. The panel may be bent into an angle in any range such as from 5 degree to 175 degree. In some cases, the angle 1805 may be designed to fit with a geometric requirement of a node 1807. A node with may be fabricated using 3-D printing to include panel mounting flanges 1809 or other suitable connecting structures. In some cases, the node may comprise two mounting flanges 1809 to be fitted with the bending panel. The node may be attached to the panel using adhesives and/or fasteners (e.g., bolts, screws, rivets, clamps, interlocks). The node may be coupled to the bending panel via a mating surface between the flanges and the panel using any suitable coupling means such as adhesive or easterners. The node may be configured to further receive connecting tubes or couple to other vehicle components (e.g. panels) such that the bending panel is connected with other vehicle components via the node.

Figure 18B:
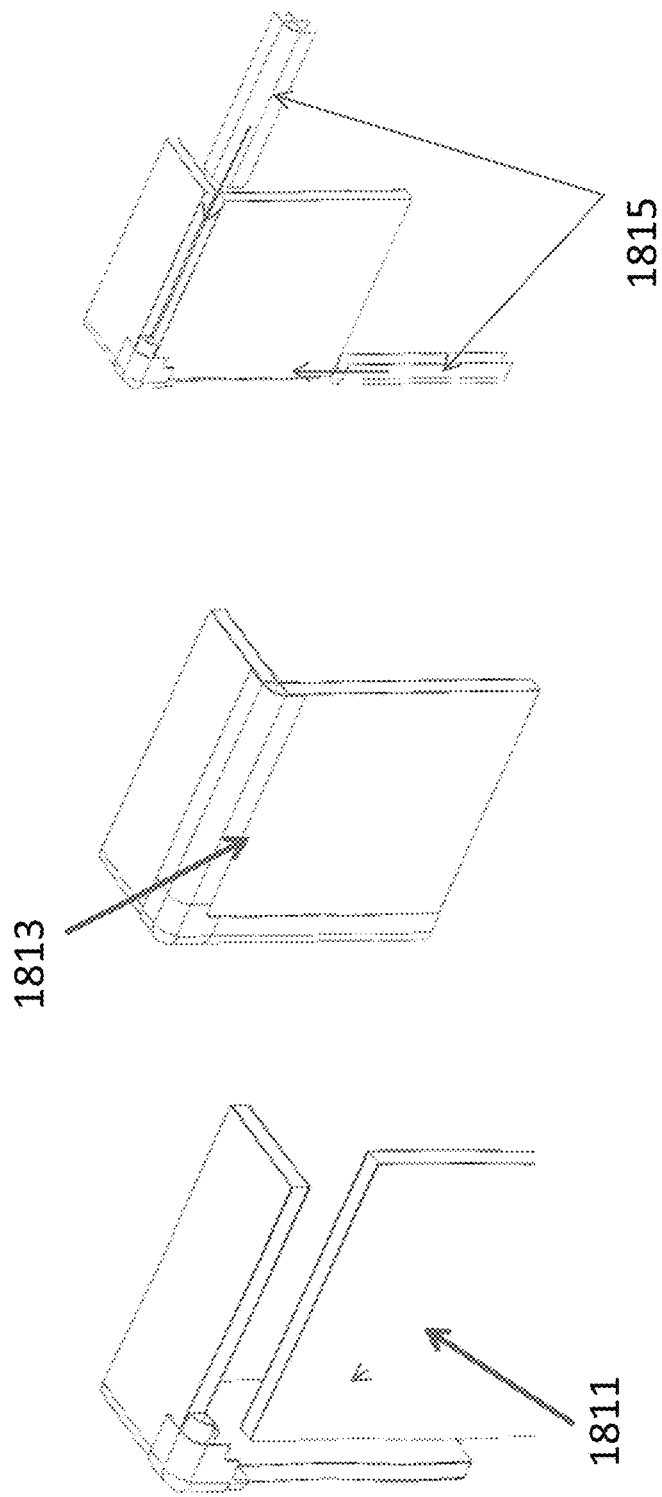

In FIG. 18B, a panel 1811 may be further attached to the node using the panel mounting structures. Various coupling means as described elsewhere herein may be used to couple the mounting structure to the connecting structure (e.g. flanges) of the node 1813. In some cases, extrusions 1815 may be further formed to connect the panel having the honeycomb structure. The extrusions may be formed using a variety fabrication technologies such as 3-D printing or extrusion. A variety of coupling means such as adhesives, and/or fasteners (e.g., screws, rivets) may be used to couple the extrusion to the node and panels. The extrusions may function as connecting features to engage with the panels. For example, panel skins may engage with the extrusions of the node. The extrusions may be formed using metal, plastic, composite (e.g., carbon tubes), or any other suitable materials.

Figure 18C:
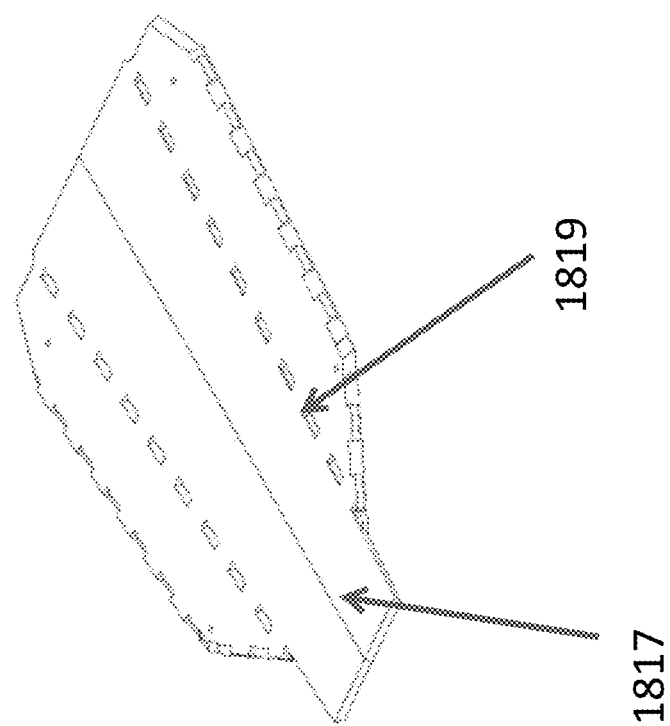

FIGS. 18C-E show an example of forming a vehicle component, such as a chassis module. In FIG. 18C, a sandwich panel (e.g., sheet) may include honeycomb, foam, bone, or other internal structures. The sandwich panels may be pre-cut using computer numerical control routing. For example, the panel may be 3 or 5 axis machined to form a desired shape and geometry. The panel may be with or without interlock features. The panel may be formed using metal (e.g., aluminum, steel, etc), plastic, composite, or any other suitable materials. One or more spots 1819 for inserting other components may be marked. In FIG. 18D, one or more nodes 1821 may be connected to the panel. The one or more nodes may be formed using 3-D printing. A variety of coupling means may be used to couple the node to the panel such as adhesives, and/or fasteners. The nodes may be used for connecting other panels. In some cases, the nodes may be used to support structural members. The nodes may determine a location of the panel relative to other structural members such as suspension pick-up points. Adhesives may be added to interface edges 1823 of the panel which may be configured to be coupled to other panels. In FIG. 18E, one or more panels 1825 may be attached to the sandwich panel at the interface edge. The one or more added panels may be attached to the sandwich panel using adhesives and/or fasteners to form a component (e.g., a chassis module) as shown in FIG. 18E.

FIGS. 18F-18H show an example of forming another vehicle component, such as a chassis module. The vehicle component may be a panel assembly. In FIG. 18F, sandwich panel (e.g., sheet) 1827 may include honeycomb, foam, bone, or other internal structures. The sandwich panels may be pre-cut using computer numerical control routing. For example, the panel may be 3 or 5 axis machined to form a desired shape and geometry. One or more nodes 1829 may be formed using 3-D printing or other suitable methods. The one or more nodes may be made from metal, plastic or composite materials. In FIG. 18G, the one or more nodes may be connected to the panel to form a sub-assembly 1831. The one or more nodes may be attached to the panel using adhesives and/or fasteners. One or more sub-assemblies 1833 may be further connected to each other using adhesives and/or fasteners. For examples, adhesives may be added to mating surface of the individual sub-assemblies. In some cases, a panel sub-assembly may comprise the same panels. Alternatively, the panels may be different. In FIG. 18H, the one or more sub-assemblies may be attached to each other using the applied adhesives. In some cases, additional coupling means 1835 such as fasteners may be added to provide additional structure and clamping during a curing process of applying the adhesives. A chassis module 1837 may be formed after connecting the one or more sub-assemblies together.

Figure 18I:
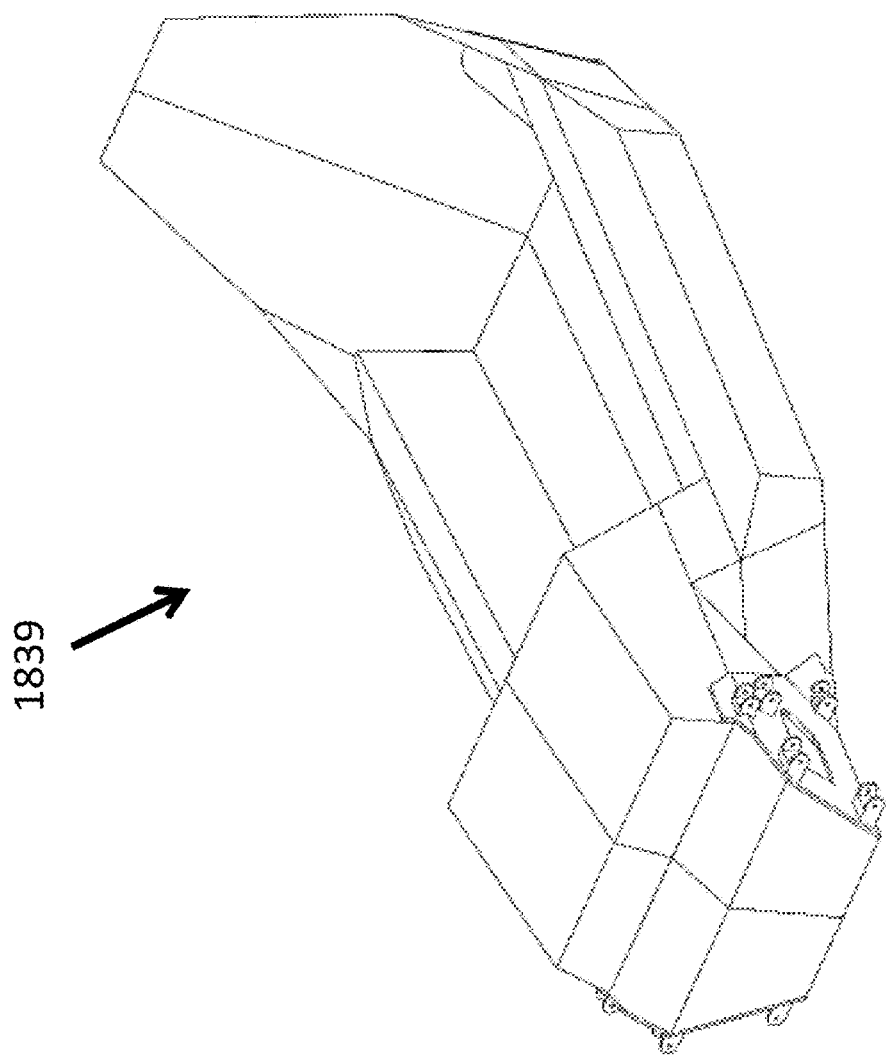

FIGS. 18I-18L shows an example of a monocoque vehicle chassis 1839 which may be formed using methods combined to produce hybrid space frame/monocoque structure. The space frame may be fabricated from nodes and/or connectors as discussed herein. One or more sub-assemblies and chassis modules may be formed as discussed herein. One or more chassis modules may be further assembled to form the monocuque vehicle chassis. In FIG. 18I, for example, the floor structure, firewall, and rocker structures may be formed using honeycomb panels and/or other panel based structure (curved or flat) as discussed herein. The panels may be connected using 3D printed nodes specifically designed to interface with one another. Alternatively or additionally, one or more nodes may be formed on the panels using adhesives and/or fasteners. The nodes may include clamping features, flanges, tube mounting features, panel mounting features, and/or other suitable connecting features to connect to one or more components. The locations of the nodes on the panels may be identified for mounting the space frame. Nodes for attaching/mounting the space frame may be formed on these locations.

Figure 18J:
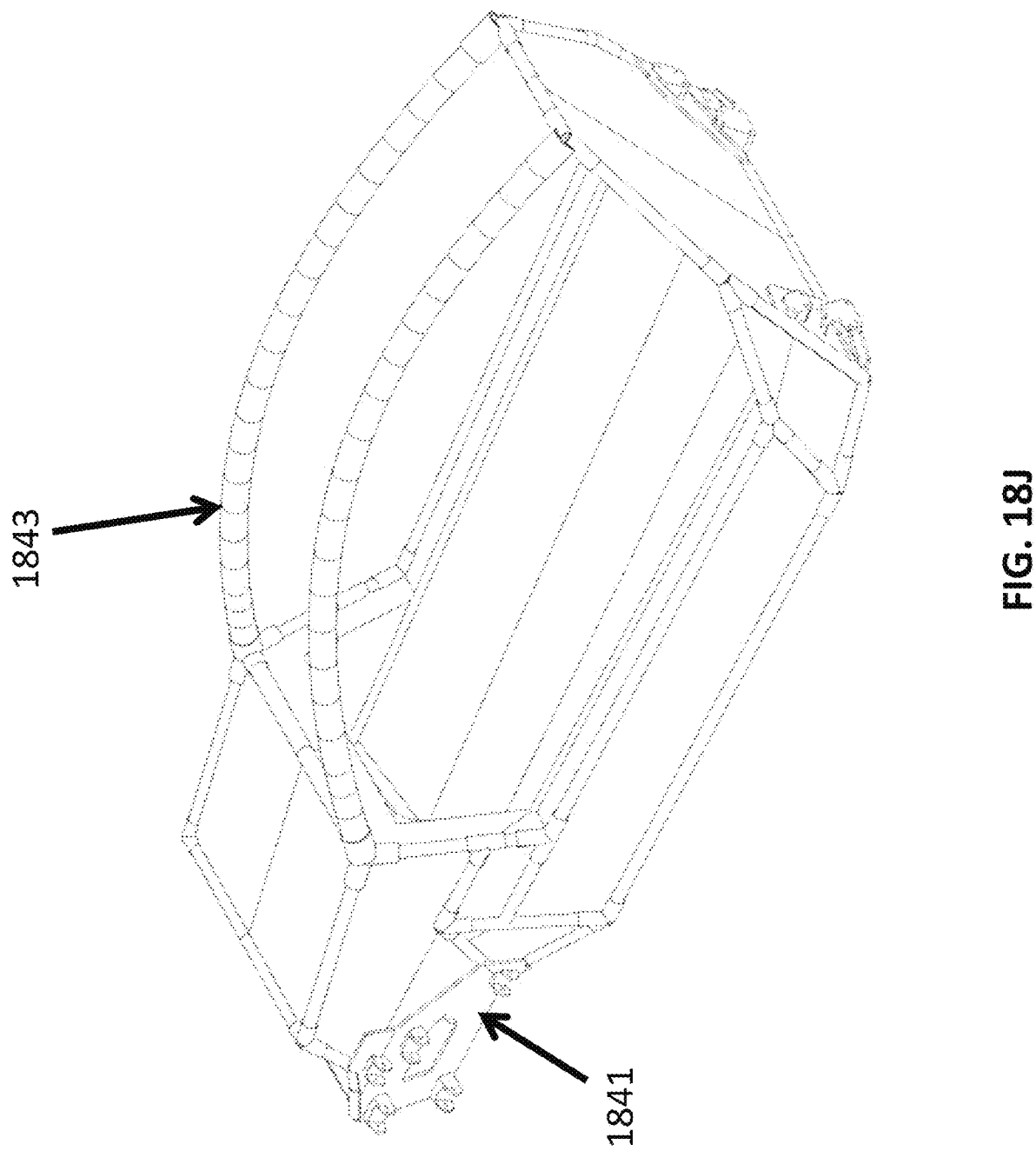
Figure 18K:
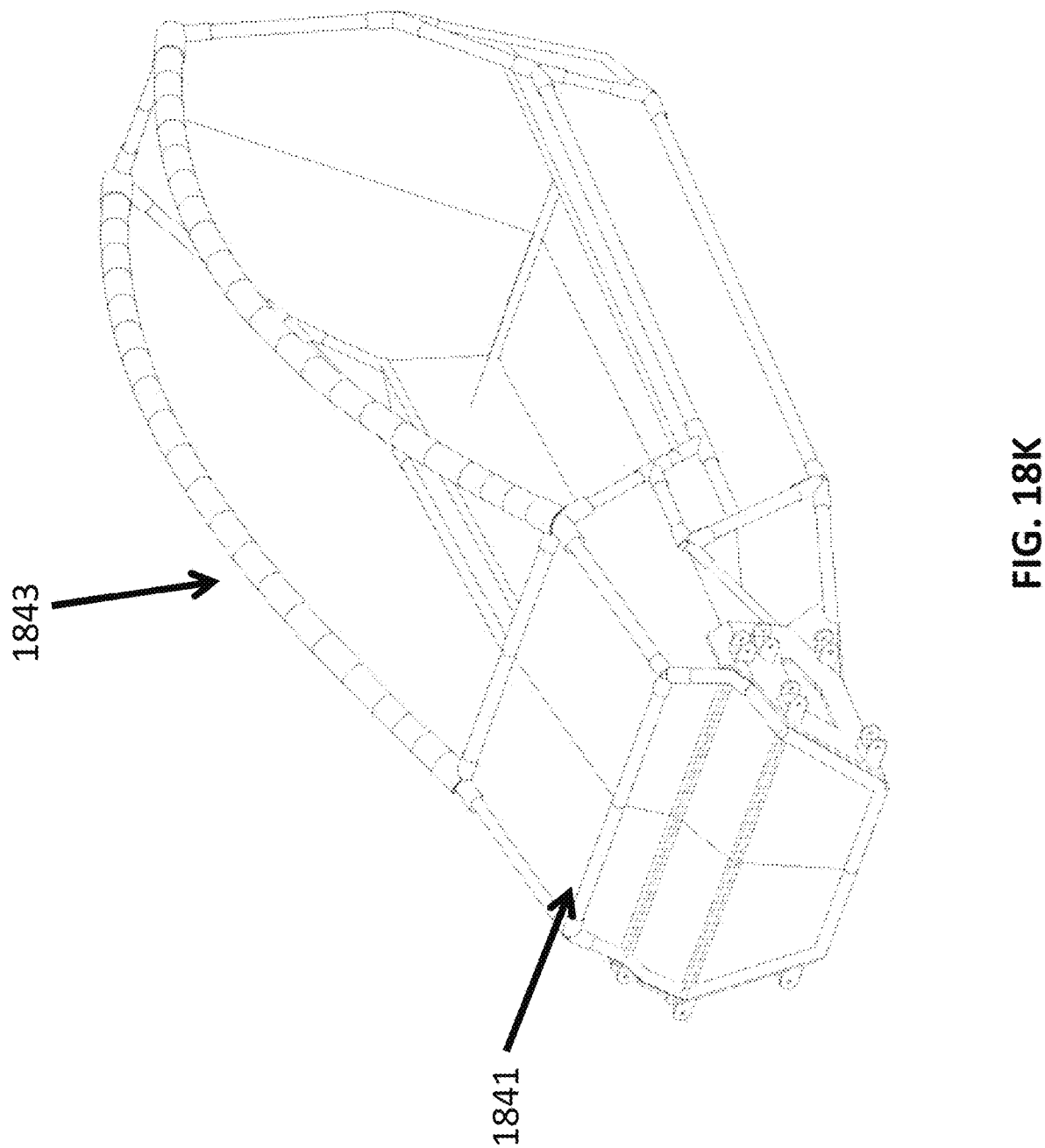

For example, function points may be formed for incorporation of interface with tube based structures. The tubes may be made of carbon fiber in some embodiments, and of various metals in other embodiments. The tubes may be straight, or curved in up to 3 dimensions, or a mix of those options. Additionally, the cross section of the tubes may or may not be circular. For example, a square tube providing vehicle roof structure may be joined with a node connecting feature to attach to a forward bulkhead of the lower monocoque structure (e.g., square shaped cross section as shown in FIGS. 17D and 17E). As shown in FIGS. 18J-18K, the vehicle may have a monocoque lower structure 1841 married with a space frame upper structure 1843 with joints of at least some of the interfaces. The connection between the monocoque structure and the tubes are enabled using 3D printed connecting nodes to fabricate the hybrid space frame/monocoque structure.

Figure 5:
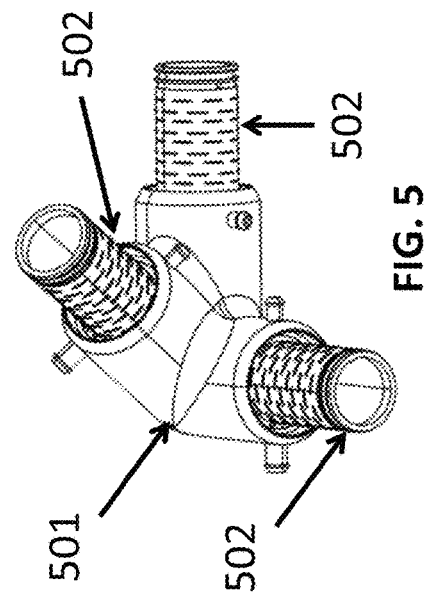
FIG. 5 shows an example of a joint printed using the method described herein.

An example of a joint that may be manufactured using the described describe fabrication process (e.g., a 3-D printing method) is shown in FIG. 5. The joint shown in FIG. 5 has a body portion 501 and three acceptor ports 502 exiting the joint body. The acceptor ports 502 may be locations for mating with a connecting tube. The acceptor ports may mate with a connecting tube by being inserted into an interior portion of the connecting tube and/or overlying an exterior surface of the connecting tube. The acceptor ports may have any angle relative to each other in three dimensional space. The angle of the ports relative to each other may be dictated by the chassis design. In some instances, three or more ports may be provided. The three or more ports may or may not be coplanar. The ports may be able to accept round, square, oval, or irregularly shaped tubes. Different cross-sectional shapes/dimensions for connecting tubes, ports may be configured to accommodate the different shapes/dimensions of tubes, the ports themselves may have different cross-sectional shapes/dimensions. The ports may be round, square, oval, or irregularly shaped.

The protrusion 502 may be designed such that it may be inserted in to a connecting tube. The wall thickness of the joint protrusion may be printed such that the joint is able to support the structural load calculated by a finite element model for the complete chassis design. For example a joint that needs to support a large magnitude load may have a thicker wall than a joint that supports a smaller load.

Figure 6:
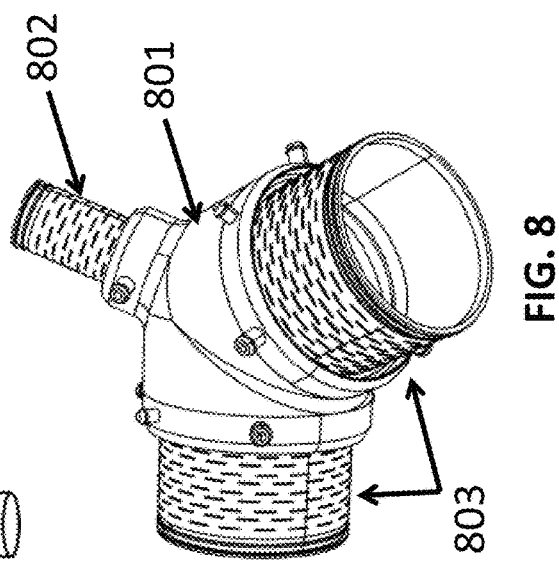
FIG. 6 shows a joint connected to tubes where the tubes are at non-equal angles relative to each other.

FIG. 6 shows a joint 601 connecting with three tubes 602a-c. The figure shows how the joint can be designed to connect tubes at varying angles. The angles between a set of tubes connecting to a joint may be equal or non-equal. In the example show in FIG. 6 two of the angles are labeled, the angle between tube 602a and 602b is labeled 603 and the angle between tubes 602b and 602c is labeled 604. In FIG. 6 angles 603 and 604 are not equal. Possible values for 603 and 604 can be at least 1°, 5°, 10°, 15°, 20°, 30°, 45°, 60°, 75°, 90°, 105°, 120°, 135°, 150°, 165°, or 180°.

Figure 8:
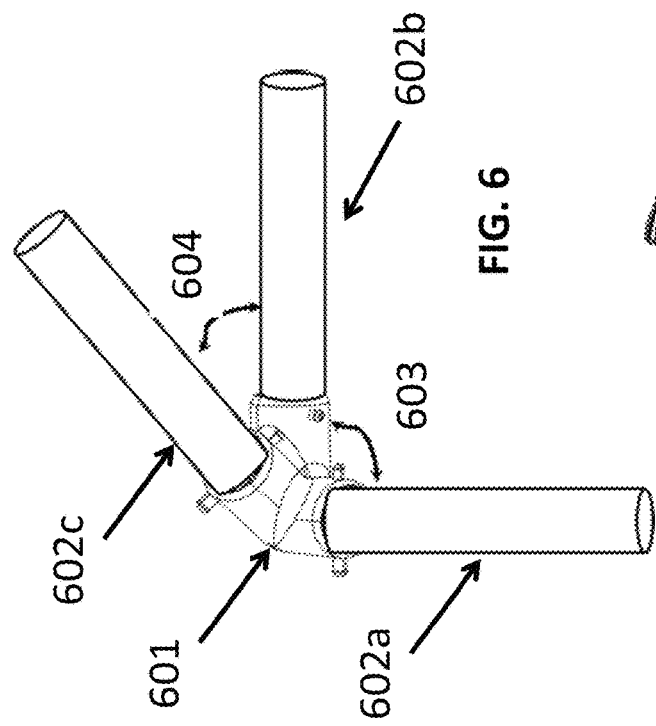
FIG. 8 shows a joint printed to connect with tubes of non-equal cross-section size.
Figure 7:
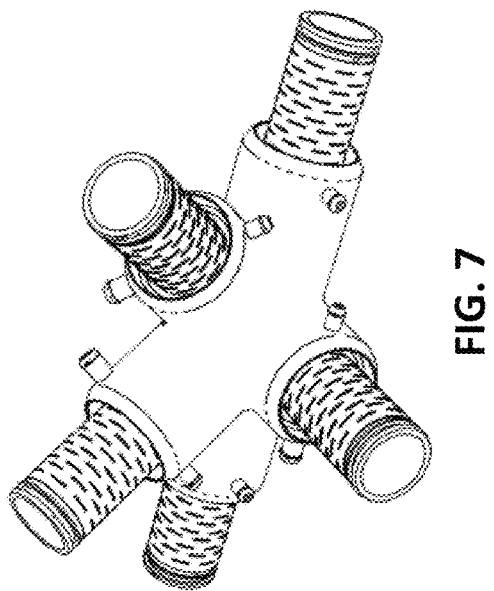
FIG. 7 shows a joint with 5 protrusions.

Joints may be printed with any number of protruding acceptor ports to mate with a connecting tube. For example, the joint may have at least one, two, three, four, five, six, seven, eight, nine, ten, twelve, fifteen, twenty, thirty, or fifty acceptor ports, or prongs. The joint may have less than any of the number of acceptor ports described herein. The joint may have a number of acceptor ports falling into a range between any two of the values described herein. FIG. 7 shows an example of a joint with five protrusions. Furthermore, the protrusions may have equal or non-equal diameters. For example, FIG. 8 shows a joint 801 designed to accept tubes of different diameters with a smaller tube being accepted at the upper port 802 and larger tubes accepted at the lower ports 803. In another example, different ports on the same joint may be able to accept tubes with a diameter ratio between different tubes of 1:2, 1:3, 1:4, 1:5, 1:6, 2:3, 2:5, 2:7, 3:5, or 3:7. In the case of non-round tubes, diameter could be represented by the relevant fundamental length scale, for example side length in the case of a square tube. Additionally, tubes with different cross sectional shapes may be able to fit on to different protrusions on the same joint. For example, a joint may have protrusions with all or any combination of round, oval, square, rectangular, or irregularly shapes. In other implementations, a single joint may have protrusions with equal diameters and/or the same shape. 3-D printing of the joint may accommodate this wide array of joint configurations.

The joint may be printed such that it comprises a region of the protrusion configured to fit inside of a connecting tube and a lip to fit over the connecting tube. The joint protrusion configured to fit inside of the connecting tube may be printed such that an annular region may be formed between the surface of the protrusion and the inner diameter of the lip.

The joints (e.g., nodes) may be formed from a single integral printed piece. Alternatively, the nodes may be formed from multiple pieces that may be attached to one another. Multiple node components may be used to form a node as illustrated, or having different features or characteristics. The individual node components may be formed using any manufacturing technique, which may include 3-D printing or any other printing, extruding, braiding, composites, lithography, welding, milling, extrusion, molding, casting, or any other technique or combinations thereof. The node components may be fastened to one another to form a node. The node components may be connected to each other with aid of one or more fasteners, such as screws, bolts, nuts, or rivets.

One or more tubes (e.g., connectors) may be attached (e.g., adhered) to a node component, such as an acceptor port of a joint component. In some instances, a single joint component may have a single acceptor port, or may have multiple acceptor ports. Each prong of a joint may be on a separate joint component, or in some instances, multiple prongs of a joint may be on a shared joint component. Some joint components may optionally not have a prong, and may be used to facilitate connection between various joint components which may or may not have prongs.

In one example, one or more tubes may be glued onto an acceptor port of a joint component. Centering features, as discussed in greater detail elsewhere herein, may be used to center the tube on the acceptor port and provide space for the glue. The joint components may be fastened to one another (e.g., using screws, bolts, nuts, or rivets to connect to one another). In some instances, the joint components may comprise one or more flanges or protruding pieces that may lie against one another and then be fastened together.

Similarly, joints may have one or more panel connecting features. The panel connecting features may accept a body panel of the vehicle. One or more joint components may have a panel connecting feature that may allow a panel to be fastened to the joint component and/or adhered to a joint component. A single joint may connect tubes, panels, or any combination thereof.

FIGS. 16A-16B show examples of connecting joints with panels using various configurations. In FIG. 16A, a joint 1602 may be connected to panels 1604 and 1606. Joint 1602 may include protruding features 1603, such as panel connecting features, for connecting joints to panels. Panels may include internal structures, such as honeycomb structures, bone structures, sandwiched between two sheets. Panels may include connecting features (e.g., panel skin, flanges, or other suitable structures) for connecting to the panel connecting features 1603 on the joint. For example, panels may engage with the panel connecting features from outside to connect to the joint. Fasteners 1608 (e.g., screws, bolts, nuts, or rivets) may be used to connect the joint with panels. The fasteners may or may not drill all the way through the panels. Alternatively or additionally, other connecting techniques (e.g., adhesives) may be used to connect the joint with panels. In FIG. 16B, a joint 1612 may include panel connecting features 1613. A panel 1614 may be inserted into a panel mounting flange. Fasteners 1618 (e.g., screws, bolts, nuts, or rivets) may be used to connect the joint with the panel. Alternatively or additionally, other connecting techniques (e.g., adhesives) may be used to connect the joint with panels. The connections discussed in FIGS. 16A-16B may require less processing on the sandwiched panels while providing stronger connection between the panels and the nodes. Fasteners (e.g., rivets) may or may not deform the honeycomb foil during assembly. Holes may be pre-drilled during honeycomb routing to minimize honeycomb deformation during fastening process.

Any part of the vehicle body components (e.g., tubes, connectors, joints, nodes, panels, sub-assemblies, and/or chassis modules) may be fabricated using any materials, such as metal, carbon fibers, or combinations thereof. Carbon fibers can reduce the weight of the overall structures, while metal can provide better ductile property to accommodate manufacturing of various shapes. Metal can also deform to absorb energy during a car crash to protect passengers in the car. The placement of carbon fiber versus metal pieces can be selected throughout the vehicle to provide desired characteristics to desired sections of the vehicle.

In one example, one or more of the tubes may be carbon fiber tubes. The carbon fiber tubes may be lightweight. In other examples, one or more of the tubes may be metal tubes, such as tubes formed from aluminum, titanium, or stainless steel, brass, copper, chromoly steel, or iron, or any combinations or alloys thereof. Honeycomb structure may also be used to fabricate tubes.

Various structures may be designed to extrude from nodes. For example, beams/tubes may be printed or attached to the inside or outside of nodes. The extruded beams/tubes may be flexible in design, materials, and/or shape to provide flexibility of shape with fewer nodes. Prior to assembly, the extruded beams/tubes may bend to enable more complex shapes. The extruded beams/tubes from the nodes can be used to build cross-car beams and/or cage structures for the glass house (e.g., A-pillar, B-pillar, and/or C-pillar). The printing technique may enable features, such as the nodes, to be printed onto structural features. For example, a cross-car beam may have printed nodes or other features easily attach thereon.

The 3-D printing method described herein may permit inclusion of fine structural features which may be impossible or cost prohibitive using other fabrication methods. For example centering features may be printed on the protrusion region of the joint. Centering features may be raised bumps or other shapes in a regular or irregular pattern on the joint protrusion. Centering features may center the joint protrusion inside of a connecting tube when a joint and tube are assembled. If adhesive is placed between the joint protrusion and the connecting tube, centering features may create fluid pathways to spread the adhesive in a desired thickness or location. In another example nipples may be printed on to the joints. Nipples may provide vacuum or injection ports for introduction of adhesive in a space between a joint protrusion and a connecting tube. In some cases, the centering features can promote even distribution of adhesive in the space between the joint protrusion and the connecting tube as described in detail elsewhere herein.

Figure 9D:
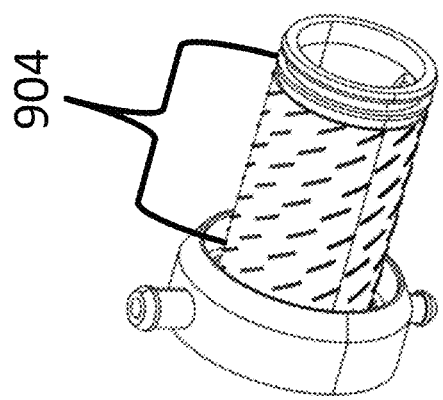
FIG. 9a-d show examples of centering features printed on joints.
Figure 9C:
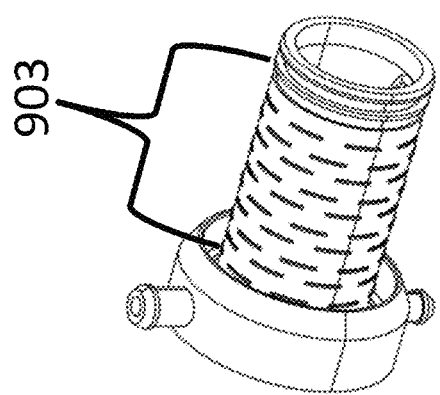

Centering features may comprise a raised printed pattern on the joint protrusion designed to fit inside of a connecting tube. The centering features may be printed on the joint protrusion when the protrusion is originally formed or they may be printed on the joint protrusion some time after the joint has been designed. The centering feature may be raised from an outer surface of a protrusion of the acceptor port (tube engagement region). The height of a raised centering feature may be at least 0.001", 0.005", 0.006", 0.007", 0.008", 0.009", 0.010", 0.020", 0.030", 0.040", or 0.050". Centering features may preferably be printed on the region of the protrusion configured to fit inside of the connecting tube as shown in FIG. 9a-d. In an alternative embodiment the centering features may be printed on the lip region on the joint configured to fit over the outer diameter of the connecting tube in addition to or instead of printing the centering features on the tube engagement region. The centering features may be printed on either or both the protrusion configured to fit inside of the connecting tube and the lip region on the joint configured to fit over the outer diameter of the connecting tube FIGS. 9a-d show detailed views of four possible joint centering feature embodiments. FIG. 9a shows a small nub centering feature 901, this feature comprises a pattern of raised dots on a tube engagement region of the joint protrusion. A tube engagement region of the joint protrusion may be a portion of the joint protrusion configured to come into contact with a surface of the tube. The tube engagement region may be configured to be inserted into the tube. The dots may be provided in one or more row or column, or in staggered rows and/or columns. The raised dots may have a diameter of at least 0.001", 0.005", 0.006", 0.007", 0.008", 0.009", 0.010", 0.020", 0.030", 0.040", or 0.050".

Figure 9B:
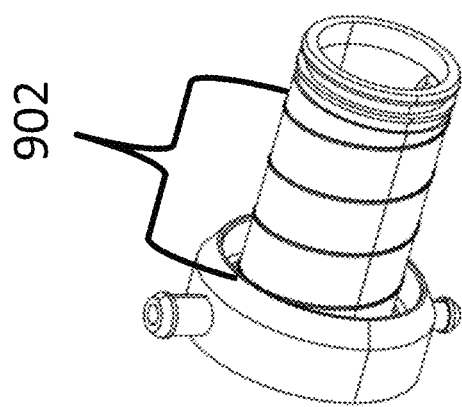
Figure 9A:
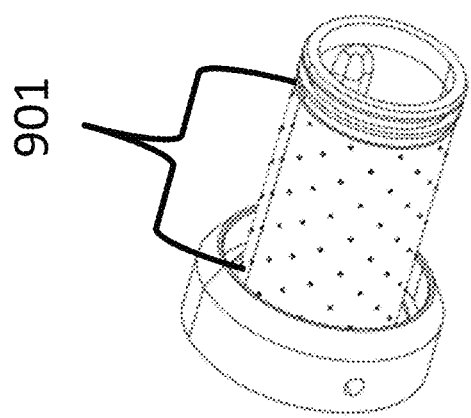

FIG. 9b shows a spiral path centering feature 902, this feature comprises a continuous raised line that winds around the full length of the tube engagement region of the joint protrusion. The continuous raised line may wrap around the tube joint protrusion a single time or multiple times. Alternative designs may comprise centering features with a raised spiral centering feature that does not wrap around the full diameter of the tube engagement region. In alternative embodiments the spiral centering feature may wind around 10°, 20°, 30°, 40°, 50°, 60°, 70°, 80°, 90°, 100°, 110°, 120°, 130°, 140°, 150°, 180°, 190°, 200°, 210°, 220°, 230°, 240°, 250°, 260°, 270°, 280°, 290°, 300°, 310°, 320°, 330°, 340°, 350°, or the full 360° of the circumference of the engagement region. The centering feature may further comprise multiple raised lines that wind around the full length of the tube without intersecting in a fashion similar to multi-start screw threads.

FIG. 9c shows a labyrinth centering feature 903, this feature comprises raised dashed lines circumscribing the tube engagement region of the joint at a 90 degree angle to the direction of the length of the joint protrusion. Adjacent dashed lines in the labyrinth centering feature are organized in a staggered pattern. Multiple rows of dashed lines may be provided. The dashed lines may be substantially parallel to one another. Alternatively, varying angles may be provided.

FIG. 9d shows an interrupted helix centering feature 904, this feature comprises raised dashed lines circumscribing the tube engagement region of the joint at a 45 degree angle to the direction of the length of the tube engagement region. In another example, the centering feature could have a raised line circumscribing the tube engagement region at an angle of 1°, 5°, 10°, 15°, 20°, 30°, 45°, 60°, 75°, 90°, 105°, 120°, 135°, 150°, 165°, or 180°. The dashed lines in the centering features shown in FIG. 9c and FIG. 9d may have a length of at least 0.005", 0.006", 0.007", 0.008", 0.009", 0.010", 0.020", 0.030", 0.040", 0.050" or 0.100".

Other patterns in addition to those described in FIG. 9a-FIG. 9d may be used. Alternative patterns may include dashed lines at irregular angles or spacing, a combination of lines and dots, or a group of solid lines winding around the engagement region with uniform or non-uniform spacing between the lines. In some instances, the centering features may be patterned so a direct straight line may not be drawn from a distal end of an inner protrusion to the proximal end without intersecting one or more centering feature. This may force adhesive to take a more roundabout path and encourage spreading of the adhesive, as described further elsewhere herein. Alternatively, a straight line may be provided from a distal end to a proximal end of the inner protrusion without intersecting one or more centering feature.

The centering features may be printed on the joint protrusion with different densities. For example, a joint protrusion may be printed such that 90% of the protrusion is covered with raised centering features. In the case with 90% centering feature coverage the features may be very closely spaced. Alternatively the centering features may cover at least 5%, 10%, 15%, 20%, 25%, 30%, 40%, 45%, 50%, 55%, 60%, 65%, 70%, 75%, 80%, 85%, 90%, or 95% of the protrusion. The centering features may cover less than any of the percentages described herein. The centering features may fall within a range between any two of the percentage values described herein. The density of the centering features printed on the joints may be chosen to provide a structural feature as determined from the chassis model.

The centering features may be raised such that a joint/tube assembly comprises space between an inner surface of the connecting tube and the surface of the joint protrusion designed to enter into a connecting tube. The tolerance between the inner tube diameter and the protrusion may be such that the joint and tube form a force fit connection. In the case of a force fit connection, centering features may or may not deform upon tube insertion in to the joint. The centering features may center the joint protrusion inside of a connecting tube such that the distance between the inner surface of the connecting tube and the surface of the joint protrusion may have a uniform radial thickness. Alternatively the centering features may encourage non-uniform distribution of the space between the joint protrusion and the connecting tube.

Figure 10:
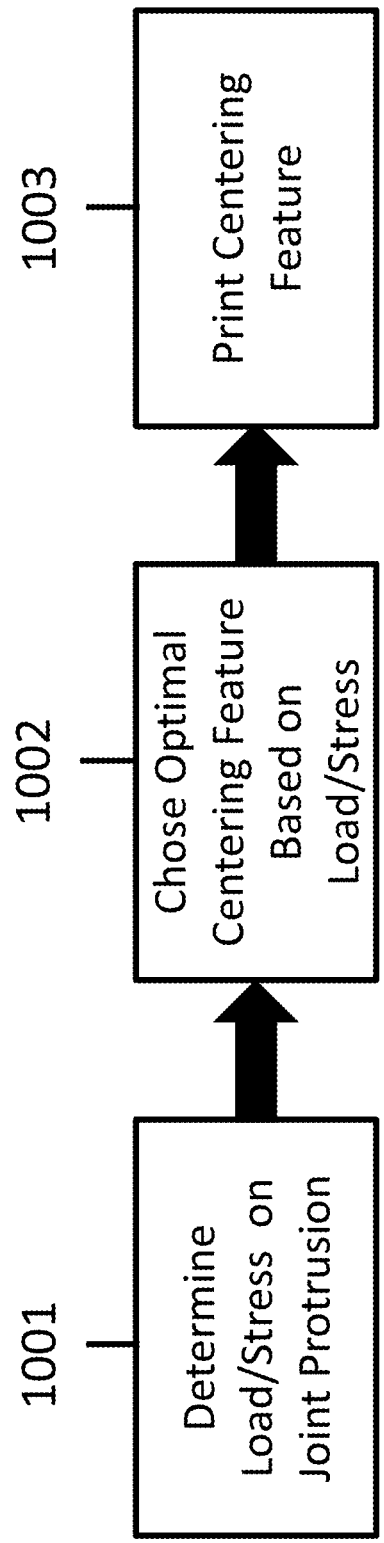
FIG. 10 shows a flow chart describing a method to choose centering features based on an expected load or stress on a joint.

Different centering features may be printed on different joints in the same chassis structure. Different centering features can be printed on different joint protrusion on the same joint. The centering features printed on a joint protrusion may be chosen so that the joint supports a stress profile determined by a finite element analysis performed on the chassis structure. An example of a method to determine a centering feature to print on a joint is shown in FIG. 10. In this method the first step 1001 is to determine the load or stress on a joint protrusion. The stress may be calculated using a finite element analysis employing a linear or non-linear stress model. Stress may be calculated on the joints while the chassis is stationary or while the chassis is moving along a typical path, for example, along a straight line, curved trajectory, flat terrain, or hilly terrain. The calculated stress on the joint may be shear, tensile, compressive, torsional stress, or a combination of stress types. The next step in the method shown in FIG. 10 is to choose a centering feature that will provide optimal structural support for the determined stress or load profile 1002. Choosing a centering feature may involve choosing any combination of pattern, dimension, and density of a possible centering feature. The final step in the process may be to print the centering feature on the joint.

For example, a joint that is expected to experience a high magnitude tension force may be printed with a small nub centering feature such that that an adhesive contact area between the joint and the tube is maximized. In another example, a joint that is expected to experience a torsional stress in the clockwise direction may be printed with a spiral centering feature in the clockwise direction to provide resistance to the torsional force.

The dimension and density of the centering features may also be chosen so that the joint supports a stress profile determined by a computational and/or empirical analysis performed on the chassis structure. The height of the centering feature may dictate the volume of the annulus formed between the surface of the joint protrusion and the inner diameter of a connecting tube. The volume of the annulus may be filled with adhesive when the joint and tube are assembled. The centering feature height may be chosen such that the volume of adhesive is optimized to support the expected stress or load on the joint. The density of centering features may also alter the volume of the annular region. For example, a joint with a high density of centering features may have a smaller volume in the annular region compared to a joint with a sparse density of centering features. The centering feature density may be chosen such that the volume of adhesive is optimized to support the expected stress or load on the joint.

Nipples for the connection of vacuum or injection tubing may be printed directly on the joint. The nipples may be printed on the joint at the time that the joint is printed such that the joint and the nipples may be carved from the same bulk material. Alternatively the nipples may be printed separately and added to the joint after it is printed. The nipples may have delicate internal pathways that may be impossible to achieve with manufacturing methods other than 3-D printing. In some cases, fluid can be delivered to an annular space between the tube accepting region of the protrusion and an inner diameter of a tube attached to the protrusion through the nipple and/or the internal pathways in fluid communication with the nipple. The fluid can be an adhesive. Adhesive may be sucked or pushed into the annular region through the printed nipples. The nipples may be positioned on opposite sides of the joint to distribute adhesive uniformly. Two or more nipples can be attached to the joint symmetrically or asymmetrically. For example, they may be provided circumferentially opposing one another on an acceptor port of a joint. They may be provided at or near a proximal end of an acceptor port for a joint. Alternatively, they may be provided at or near a distal end of an acceptor port of the joint, or any combinations thereof. A joint may have at least about 1, 2, 3, 4, 5, 10, 15, or 20 nipples on each protrusion.

Figure 11:
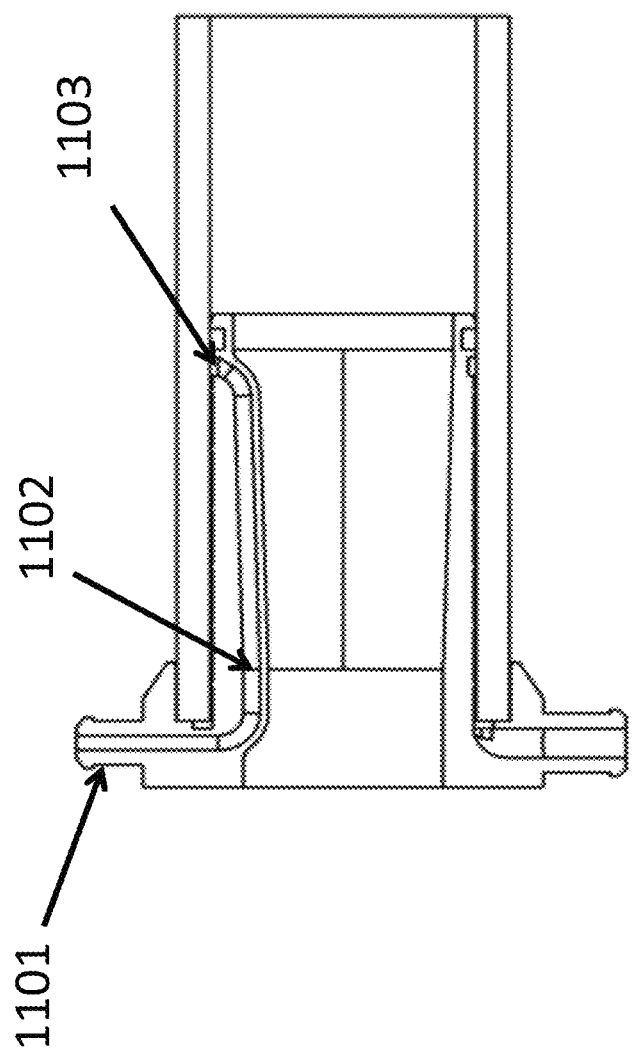
FIG. 11 shows a cross section of a joint protrusion with nipples connecting to internal passageways in the side wall of the joint protrusion.

Nipples can be positioned far from, in close proximity to, or co-axially with an internal joint feature such as the fluid pathway inside of a wall of the inner joint protrusion which may provide uniform adhesive coating. FIG. 11 shows a cross section of an example of a joint protrusion with nipples 1101 connecting to an internal fluid pathway 1102 inside the wall of the joint protrusion. The internal pathway may be printed in the side wall of the joint. The internal pathway may have an outlet 1103 in to the annular region. The internal pathway may introduce fluid (e.g. adhesive) into the annular region. The internal pathway may have a round cross section, a square cross section, an oval cross section, or an irregularly shaped cross section. The diameter of the internal pathway may be at least 1/100", 1/64", 1/50", 1/32", 1/16", 1/8", 1/4", or 1/2". If the internal fluid pathway has a non-round cross section the listed diameters may correspond to a relevant fundamental length scale of the cross section. The fluid pathway may run along the full length of the joint protrusion or any fraction of the length.

Nipples can be shaped and configured to connect with vacuum and/or pressure injection equipment. Printing nipples directly on the joint may decrease the need for equipment to inject adhesive in to the annular region. After adhesive is introduced the nipples may be removed from the joint by cutting or melting the nipple off of the joint.

Integrated structural features may be printed directly on to or inside of the joints. Integrated structural features may include fluid plumbing, electrical wiring, electrical buses, panel mounts, suspension mounts, or locating features. Integrated structural features may simplify the chassis design and decrease the time, labor, parts, and cost needed to construct the chassis structure. The location for the integrated structural features on each joint may be determined by the chassis model and the software may communicate with a 3-D printer to fabricate each joint with the necessary integrated structural features for a chosen chassis design.

Figure 12:
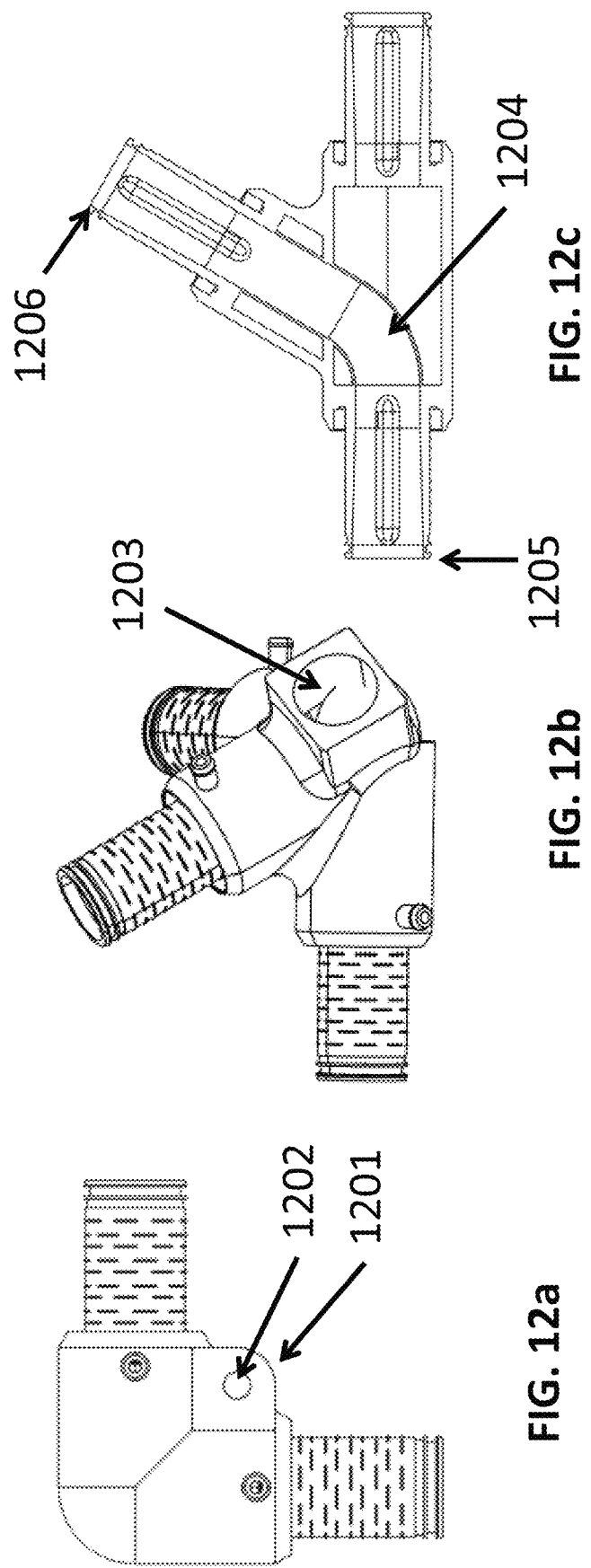
FIG. 12a-c show joints printed with integrated structural features and passageways for electrical and fluid routing.

Joints may be printed such that they comprise mounting features for shear panels or body panels of a vehicle. Mounting features on the joints may allow panels to be connected directly to a vehicle chassis frame. Mounting features on the joints may be designed to mate with complimentary mating features on the panels. For example mounting features on the joints may be flanges with holes for hardware (e.g. screws, bolts, nuts, or rivets), snaps, or flanges designed for welding or adhesive application. FIGS. 12a-c show features of the joints designed for integration with other systems on-board a structure, such as a vehicle. Joints may be designed to integrate with shear panels or body panels of a structure.

FIG. 12a shows a joint with a flange 1201. The flange 1201 may be used to connect to a shear panel or body panel (not shown). In the case of use of the joint members to construct a vehicle chassis, the joint member may be integrated with a suspension system. A suspension system may comprise hydraulic, air, rubber, or spring loaded shock absorbers. The suspension system may connect to the joint member by an attachment to a flange 1201. The flange may be printed such that it contains at least one hole 1202 for mating with connecting hardware (e.g. screw, nail, rivet).

Joints may be printed such that they include integrated passageways for electrical connections. Electrical connections integrated into the joints may be electrically insulated. Electrical connections integrated into the joints may be grounded. Electrical connections integrated into the joints may be in communication with wiring routed through the tubes connected to the joint. The electrical wiring may be used to provide power to systems on board a vehicle and/or to provide power to a battery to start or run the vehicle engine. Systems on board a vehicle that use power from the integrated joints may include, navigation, audio, video display, power windows, or power seat adjustment. Power distribution within a vehicle may travel exclusively through a tube/joint network. FIG. 12b shows a possible joint embodiment for routing of electrical wires throughout a structure. The joint shown in FIG. 12b has with an inlet region 1203; this inlet could be used for insertion of electrical connections or wires. Electrical wires may be inserted into the inlet region and routed from the joint to the tube for transmission throughout the chassis. One or more system that may be powered using the electrical wires may connect with the wire through the inlet region. The electrical connections integrated into the joints can provide plugins that permit a user to plug in one or more devices to obtain power for the device. In some cases, one or more electrical contacts can be printed onto the joints before, after, or during 3-D printing of the joints.

Joints may be printed such that they comprise an integrated heating and cooling fluid system to provide heat and air conditioning in the vehicle chassis. Other applications may include cooling and/or heating various components of the vehicle. Integration of fluid (e.g. gas or liquid) systems into the joint/tube construction may partially or fully eliminate the need for conventional air ducts and plumbing from vehicle design. Joints may route hot or cold fluid from a production source (e.g. electric heating element, engine block heat exchanger, refrigerator, air conditioning unit, or boiler) to a location in the chassis where a passenger or vehicle operator may wish to heat or cool the interior. Joints may contain integrated components to intake hot or cold fluid from a source, distribute hot or cold fluid, and vent hot or cold fluid at a location away from the source. Joints and tubes in the assembly may be thermally insulated using fiberglass, foam insulation, cellulose, or glass wool. The joint and tube assembly may be fluid tight. In the case of a joint comprising an integrated fluid system the joint embodiment shown in FIG. 12b may be used. An inlet such as the one illustrated in the FIG. 1203 may be used to route fluid for heating or cooling throughout a structure by means piping the fluid between a plurality of joints through the connector tubes.

A cross sectional view of a joint that may be used for routing of fluid or electricity is shown in FIG. 12c. In the example shown in FIG. 12c two joint protrusions are joined by an internal passageway 1204. In an embodiment the joint in FIG. 12c may route fluid or wiring from the inlet at 1205 to the outlet at 1206. The passageways used for routing of fluid and electricity may be the same passageways or they may be separate. Internal joint routing may keep two or more fluids separate within a joint while still providing desired routing between tubes, or from tube to joint-mounted connectors or features.

Joints may be printed such that they include integrated locating or identifying features. The features may enable automated identification or handling of the joints during assembly and processing. Examples of locating features may include a cylindrical boss (e.g. a boss with a flat and radial groove), an extruded C-shape with a cap, a bayonet or reverse bayonet fitting with a non-symmetric pin pattern, a hook feature, or other features with geometry that may uniquely define the feature orientation and position when examined. These locating features may be interfaced to or grasped by robotic grippers or work holding tools. The interface of the joint may be fully defined once the grasping motion begins, is partially finished, or is complete. The locating features may enable repeatable and optionally automated positioning of the joints prior to and during space frame assembly. The defining geometry of the features may also enable automated systems to coordinate the motion of multiple joints along defined paths in space during insertion of tubes into the joints. At least two tubes may be inserted into multiple joints in parallel without resulting in geometric binding during assembly. The integrated locating feature may further comprise integral identifying features. For example identifying features may be a one dimensional bar code, a two dimensional QR code, a three dimensional geometric pattern, or a combination of these elements. The identifying feature may encode information about the joint to which it is attached. This joint information may include: geometry of the joint, including the orientation of the tube entries relative to the identifying/location feature; material of the joint; positioning of adhesive injection and vacuum ports relative to the identifying/locating features; adhesive required by the joint; and joint tube diameters. The combined identifying/locating feature may enable automated positioning of joints for assembly without requiring external information to be supplied to the automated assembly cell.

As previously described, joints may be manufactured to incorporate one or more safety feature. In some embodiments, such safety features may be used in the event of a crash to a vehicle. The safety features may be used to reduce or prevent harm to a passenger of the vehicle or a passerby. The safety features may be used to alert users to conditions of the vehicle that may affect safety of the vehicle.

One or more structural features may be provided to the joint that may improve safety of the vehicle. In some examples, the structural features may absorb energy from an impact, while also providing the desired performance characteristics.

FIG. 13 provides an example of a structural feature that may be provided to a joint. In one example, a honeycomb structure may be integral to one or more joints. The honeycomb structures may be 3-D printed. 3-D printing may advantageously permit the honeycomb structure to be internally printed on the joints. In some instances, the honeycomb structure may be printed within an interior of a joint. Any description of a honeycomb structure may apply to any structure that may have a cavity or cell of any shape, regular or irregular. For instance, the cavities or cells may be geometric (e.g., the hexagons of the honeycomb) or may have differing or organic shapes, such as structures resembling animal bones. In some instances, the honeycomb structure may be an integrated structure of the joint itself, such as a wall of the joint. Alternatively, the honeycomb structure may be provided within an interior cavity or hollow region of the joint. The honeycomb structure may optionally be printed on an exterior surface or region of the joint. The honeycomb structure may be provided in spaces between two or more joints. The honeycomb structure may aid in connecting chassis structural members. For instance, a honeycomb structure may be provided two or more joints and may optionally connect the two or more joints. The honeycomb structure may optionally connect one or more connecting tubes as well. The honeycomb shape may increase strength of the joint and/or overall chassis, and may allow for energy absorption from the chassis itself.

In some embodiments, panels may cover the honeycomb structure. For instance, the panels may be carbon-based (e.g., carbon fiber) panels which may provide stiffness and rigidity to the structure. Alternatively, the panels may be formed of a metal, such as aluminum, steel, iron, nickel, titanium, copper, brass, silver, or any combination or alloy thereof. A honeycomb structure may be sandwiched between the panels. In some embodiments, the panels may be provided between two or more joints. The panels may connect two or more joints, with the honeycomb structure within.

Panels may be used for various sections of the vehicles, such as the lower portions of the vehicles (e.g., the floor, walls, and/or rockers). The panels may be made from carbon based materials (e.g., carbon fibers) or metal materials (e.g. aluminum, titanium, or stainless steel, brass, copper, chromoly steel, or iron). Panels may be further connected to tubes directly or via nodes/joints as discussed herein. Alternatively or additionally, honeycomb structures may be sandwiched between the panels. Honeycomb structures may be applied to all panels of a vehicle. Alternatively, a vehicle may have a combination of honeycomb structures and tube connected structures. In some instances, nodes and/or tubes may be connected to nodes or tubes using various techniques. For example, nodes and/or tubes may be directly printed on to the honeycomb structures. Nodes and/or tubes may be attached to honeycomb structures using adhesives and/or fasteners.

Panels may be connected to one another using node configurations (e.g., protruding panel connecting features). Nodes may be glued, printed on, or bolted to panels. Alternatively, nodes may be incorporated in panels, e.g., by printing technique. In some instances, multiple nodes may be attached to a panel using mixed methods, e.g., one or more nodes are glued to a portion of the panel, one or more other nodes are bolted to another portion of the panel. The panel may also have certain node structures that were formed during 3-D printing. The methods to connect the nodes to the panels may be selected based on the functions, materials, shapes, and/or replaceability of certain nodes and/or panels. In some instances, certain portions of a panel may be shaved off to expose the honeycomb structure beneath, and certain structures (e.g., nodes or tubes) may be further attached to (e.g., 3-D printed to) the exposed honeycomb structure. For example, nodes may be printed directly into or onto the exposed honeycomb structure. These additional printed nodes may provide flexibility to the panels, e.g., in perspectives of extending shapes, functions, structures, and/or other features. In some instances, the panels may be assembled with the joints using adhesives/glues or bolted structures such that the assembly can be continued before the glue completely dries out.

The honeycomb structure may be provided for any other component of the vehicle. For instance, the honeycomb structure may be integral to one or more connecting tubes. The honeycomb structure may be built into the connecting tube walls themselves, or within an interior space of the connecting tubes. The honeycomb structure may be printed on an exterior surface of the connecting tube. Similarly, the honeycomb structure may be provided for a vehicle body panel. The vehicle body panel may be stamped, 3-D printed, molded, or formed in any other manner. The honeycomb structure may be integral to the vehicle body panel and may form the actual shape of the body panel. Alternatively, the honeycomb structure may be printed on an exterior of the body panel.

The honeycomb structure itself may allow for some internal deformation that may absorb energy from a crash. The internal deformation may be temporary (e.g., the honeycomb structure may deform during the impact but then return to its original form) or may be permanent (e.g., may crumple and not return to its original form). The honeycomb is an example of a built-in structural feature (e.g., crush structure) to the node that may absorb energy of impact while providing desired performance characteristics.

In some instances, the honeycomb structures or other suitable internal structures may be used in combination with metal panels. For example, honeycomb structures may be sandwiched between metal panels. Metal panels provide better ductile property compared with carbon-based panels such that metal panels can be more resistant to puncture type damages. The combination of honeycomb structure and metal panels may work individually and/or collectively to absorb more energy during deformation thus provide better safety and other performance features. Alternatively, certain panels of a vehicle that require better safety feature may use metal panels, while panels in other locations of the vehicle may use carbon-based panels to reduce overall weight of the vehicle.

Figure 14:
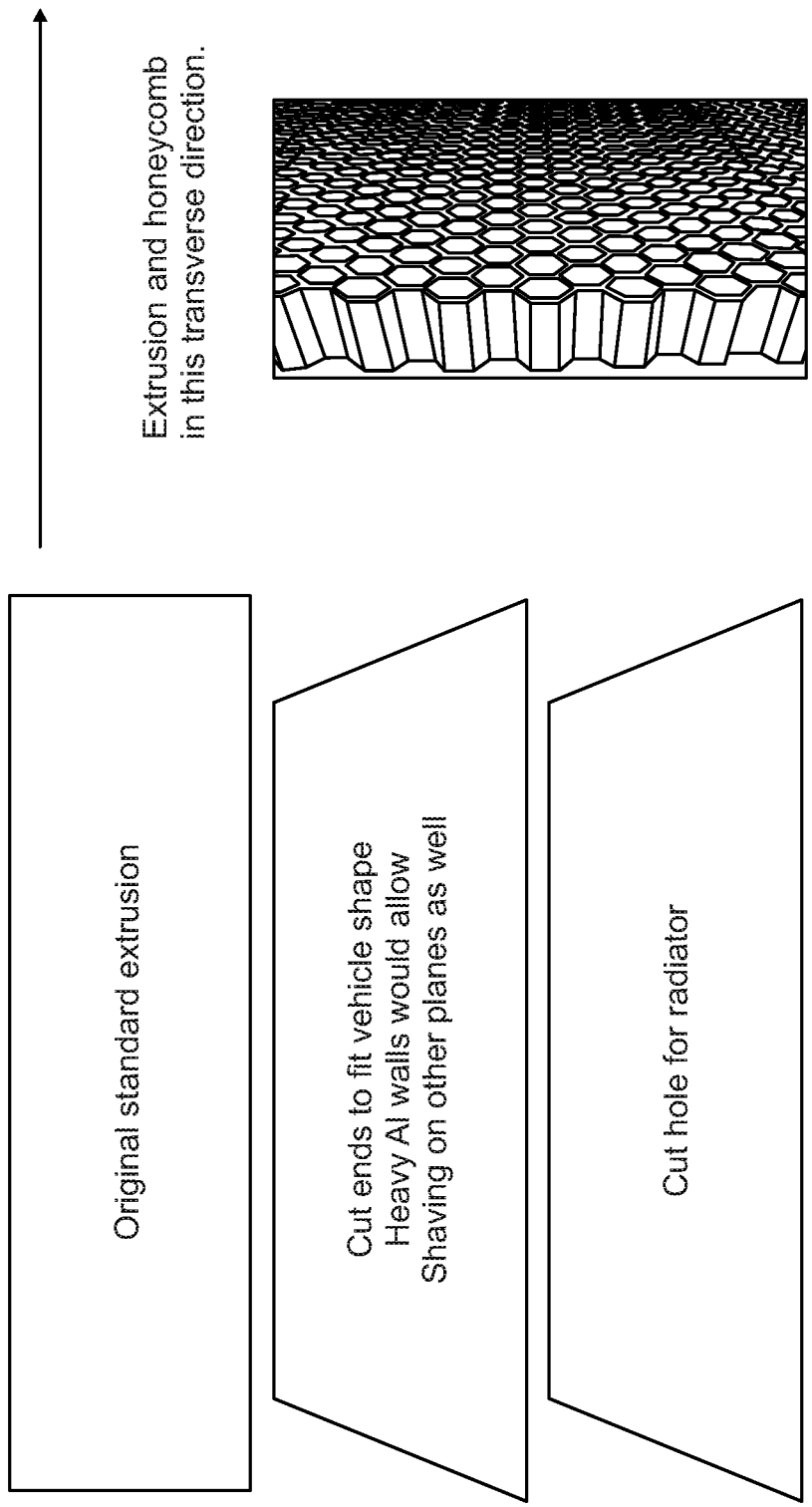
FIG. 14 shows how various crush structures may be built added onto various vehicle components, such as the node, tubes, or panels.

FIG. 14 shows how various crush structures may be built added onto various vehicle components, such as the joint, tubes, or panels. The crush structures may be provided in addition to various vehicle chassis components such as the joints or tubes. The crush structures may be supported by the vehicle chassis. The crush structures may be integrally built-in to the components or may be attached (e.g., bolted on or glued on) to mass produced parts. In some instances, one or more components, such as a joint, may have a spreader plate, that may be configured to attach to the crush structure (e.g., honeycomb structure). Optionally, the spreader plate may be integrally formed with the component (e.g., joint), and/or may be 3-D printed onto the component. The spread plate may have features that may allow for easy attachment with the crush structure.

In some instances, the crush structures can be added in on much the same way carbon fiber tubes may be mass produced common parts cut to shape. The use of attached parts may allow for greater disposability in sensitive areas. The crush sections may be joined by spreader plates attached to the joints. Alternatively, joints may be formed (e.g., printed) that may have large contact areas (e.g., printed onto them) to accept the crush structures (e.g., honeycomb structures) without the need of complex attachments.

In one possible configuration, extruded sections of energy absorbing material may be provided. A light to heavy gage extruded (or printed) material (e.g., aluminum) section can be cut to a desired dimension. Any type of cutting mechanism may be used, such as a saw or water-jet. The cutting may be performed to make room for the component openings and airflow. The cutting may allow the extruded sections to form a desired three-dimensional shape. The sections may have a regular or irregular profile.

In some embodiments, a space frame may attach to spreader plates on the extruded (or printed) sections. For instance the space frame may bolt and bond to spreader plates on the aluminum, The spreader plates may be pre-attached to the extrusions prior to or after installation into the vehicle. Alternatively, one or more connecting (e.g., carbon fiber) tube regions may be provisioned into an extrusion which may be trimmed to accept a joint from a main vehicle structure. In some instances the crush structure may be trimmed to accommodate various features of a vehicle. For example, a hole may be cut for a radiator. The crush structure may be shaped to allow for desired passages for components or fluid flow (e.g., airflow). Additionally, extrusions with through holes may use their porous nature to allow airflow to radiators or other cooling or breathing systems.

One or more spreader plates may have a joint point to receive a connecting tube.

The crush section (e.g., honeycomb structure) may be shaped in three dimensions to fit a desired section of a vehicle (e.g., front end of a vehicle). This may provide a modular way to do crush structures that may mate with joints or other portions of the vehicle chassis. In some embodiments, light honeycomb panels (e.g., aluminum honeycomb panels) may be used to build crush structure.

Figure 15:
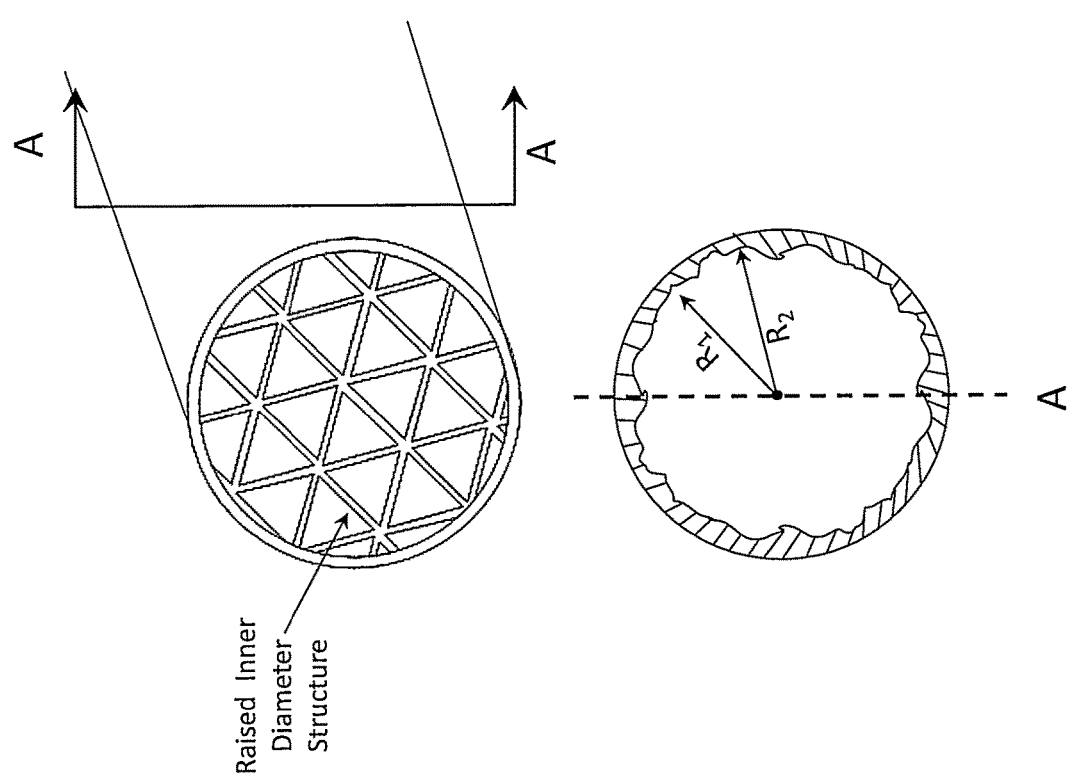
FIG. 15 provides an example of internal geometric configurations that may be provided for one or more components of the vehicle.

FIG. 15 provides an example of internal geometric configurations that may be provided for one or more components of the vehicle. Forming (e.g., printing) various three-dimensional geometric configurations within a vehicle component such as a joint, connecting tube, panel, or space encompassed by the vehicle chassis may increase strength of the component. For instance, printing three-dimensional geometric configurations within a node may increase strength and allow for a decrease in wall thickness. Similarly, printing three-dimensional geometric configurations within a tube may increase strength and allow for a decrease in wall thickness. The geometry within the component may compensate for the component's thin wall and protect against punctures or damage to the component while still retaining a hollow configuration. For example, the joint may be protected from punctures or damage while retaining a hollow configuration.

In some embodiments, internal structure within a joint or other component may be formed with similar geometry to a human bone. For instance, the joint may have a printed core geometry like a human bone. The internal structure need not be regular and may be individually designed based on desired component characteristics. For instance, a first joint may have a different internal structure than a second joint. In some instances, the internal structure may have an organic configuration and need not have a regular pattern. This may increase the hoop strength of the joint without adding material because this material used to create this geometry may be taken from wall thickness. The three dimensional structure may be built into the joint walls themselves, may be provided within an interior cavity of the joint, or may be provided on an external surface of the joint.

In addition to printing internal structures, such as honeycomb or bone-like features, within joints, the structures (e.g., honeycomb, bone-like, or other three-dimensional features) may extend into the connecting tubes. During assembly, the tubes may slide over the structures that extend into the tubes. It may also be possible to have the structures (e.g., honeycomb, bone-like or other three-dimensional features) be separate from the joint. The structures may still be placed within the connecting tubes but not be part of the joint. Mass may be minimized or reduced of the reinforcement is just added to portions where it is needed most. For example, a center of a tube in bending may benefit from the presence of the structures.

The structures (e.g., honeycomb, bone-like, or other three-dimensional features) may be added to the exterior of the connecting tubes (e.g., when the tubes are slid into place during assembly). The structures may be beneficial at the base near the joints, where sheet fractures are a risk. The external reinforcements may be integral to the joint or may be an independent piece from the joint. In some instances, similar to the internal reinforcements, the external reinforcements may be provided where they are needed most. As previously described, the structures may have any shape. The structures have a three-dimensional shape. They may be porous, like bone, or may include regular structures with hollow regions like honeycombs. If structure is more important than mass, the reinforcements may have solid regions. The structures may provide additional strength and/or stiffness. The structures may or may not be designed to absorb energy from an impact and/or crumple.

One or more components of the vehicle (e.g., joint, tube, panel) may have a crumple zone configured to absorb energy of impact by deforming. In some embodiments, each joint, tube, or panel may have a crumple/crush zone.

Any of the components of the vehicle chassis may be formed with controlled dimensions, such as thickness. For instance, a joint or connecting tube may be formed with controlled wall thicknesses. The wall thicknesses may be determined during a design phase of the fabrication process. Variable wall thickness may be provided depending on how the vehicle chassis and/or component is intended to deform. Such deformation may occur during a crash or during regular use of the vehicle. The deformation path and/or energy absorbed by the component may be controlled by controlling the section geometry along the component (e.g., printed joint). The components of the vehicle may be formed to route energy within the vehicle chassis along a desired pathway in the event of a crash.

In some instances, the method of failure at various components of the chassis in the event of a crash may be controlled. For instance, the method of failure for each joint and/or connecting tube of a chassis may be controlled. The geometry and/or inflection of points may be altered to control how the component (e.g., joint, tube) may deform in a crash. A desired breaking point may be designed with thinner walls than other sections. In other examples, the desired breaking point may be formed from a weaker or more brittle material than the other sections.

A joint (or any other component) may have features designed to locate and/or accept adjacent components so that when vehicle distortion occurs (e.g., due to impact or other events), the adjacent components may transfer load into the nodes, thereby transferring load into the structural features (e.g. cage structure). Any description herein of a joint feature may apply to any other component of the vehicle, such as a connecting tube or body panel.

A joint may include a valley (e.g., crevice) that is designed into the joint. The valley may be designed to catch the edge of a body panel or offshoot of a body panel to help share the load with the body panel. The valley may be close to the corresponding panel and may be designed to accept the panel once a vehicle distortion (e.g., deformation event such as a crash) starts. Alternatively, the valley may have a panel inserted into it intentionally during assembly. The inserted panel may be attached to the valley with adhesive. Thus, a portion of the joint may be used to support other parts of the vehicle.

This configuration may advantageously permit gaps between various components and not require extra connecting mechanisms (e.g., bolts). This may result in reduction of manufacturing time, complexity, and/or vehicle mass. This configuration may allow parts of the vehicle to support one another during regular use or during impact once deformation occurs, despite lack of fasteners or even contact with the assembled location.

Adhesive application features may be provided for the vehicle. The adhesive application features may be similar to internal routing features as previously described (e.g., those used in tube attachment points). The application features may allow an operator to apply a vacuum to a joint of a valley surface, while adhesive is added to an interface area of a cavity. A simple rubber gasket may be used to ensure a seal when the vacuum is applied, similar to node/tube connecting mechanisms. This may also allow for gluing of traditional uni-body stampings into slots printed into the nodes. The slots may serve as an interface between regions of the vehicle that are built with joints, and those that are built with uni-body construction. If plane-based sharing of loads is desirable, a stamping or body panel could be used to reinforce a node at a location using these features. Additionally, the body panel or other sheet-like structure may be printed rather than stamped.

In some instances, a joint may have a guiding feature that may allow another portion of a vehicle chassis to pass through it or along/adjacent to it. For instance, a guide feature may be a hole that may allow another portion to pass through it without being rigidly being affixed with a joint end point (although it may be glued to hold it in place during non-crash events). In some instances, the joints may receive reactionary forces from a connecting tube during a deformation event, and may cause it to deform in a controlled manner (e.g., along a controlled line) rather than deforming or displacing into an undesirable location, direction, or a random location. For instance, a mid-frame-rail joint have a guiding feature (e.g., feedthrough feature) that may cause it to deform rearward upon frontal impact, rather than shifting towards a driver's feet. The guiding feature may provide controlled deformation and/or guidance of various components (e.g., tubes, panels, joints), so that upon impact, some of the energy may be absorbed without components traveling in a manner that may potentially harm a passenger. Moving parts during a deformation may be guided away from one or more passengers or sensitive components (e.g., fuel tank or line). Guiding features may optionally be structurally reinforced to provide the desired guiding results.

In some embodiments, connecting tubes may have various cross-sectional geometries. The use of tubes with circular cross-sections may not package well within available real estate of the vehicle in some areas. For instance, in an area near the pillars on the inside of the vehicle, it may be difficult to get sufficient plastic deformation on the header and pillar covers during head strike events, without the tubes becoming so large that vision would be impeded through the windows. In some instances, connecting tubes with selected cross-sectional shapes may be used. For instance, a cross-sectional shape similar to an airfoil may be used. The flattened tubes can be mass-produced or built as needed. The vehicles may use common flattened tubes or air-foil-like tubes when needed. The tubes may have any other cross-sectional shape. The cross-sectional shape may be designed to fit the space within which the tubes are to be used. Examples of cross-sectional shapes may include, but are not limited to, circular cross-sections, oval cross-sections, ellipsoidal cross-sections, triangular cross-sections, quadrilateral cross-sections, pentagonal cross-sections, hexagonal cross-sections, octagonal cross-sections, star-shaped cross-sections, crescent-shaped cross-sections, teardrop-shaped cross-sections, airfoil-shaped cross sections, or any other shape. There may be oval O-rings to achieve adhesive sealing at the nodes. The tubes may allow a designer to have a low-profile structure in selected areas (e.g., pillars, rollbars). The tubes may also be useful for aerodynamics when used outside the body. The tube dimensions and/or shapes may be variable and selected to fit various parts of the vehicle. The joints may have correspondingly shaped prongs to connect the corresponding tubes.

The tubes may be straight, may curve, or may have bent configurations. For instance, curved members may be used when a standard tube does not package in a way that will allow safety requirements to be met. This may be achieved with aid of a bent connecting tube. It may also be achieved with extruded material (e.g., aluminum or other metals) tubes, which may be bent so that they can transfer load and/or energy along a more complicated path. In addition to cross-sectional dimension and shape, the longitudinal geometry and/or shape may be considered in tube design.

Any of the features described herein may be printed with the rest of the joint or in addition to the joint. For example, the entire joint including the various features described herein (e.g., centering features, nipples, passageways, etc.) may be printed in a single step and formed a single integral material. Alternatively, specific features may be printed onto a pre-existing joint component. For example, a center feature may be printed onto an existing acceptor port.

The vehicle chassis may be formed of joints and connecting tubes. In some instances, the space frame may form a complex three-dimensional cage. In some instances, a mini-three-dimensional matrix may be formed with smaller joints and/or tubes. A wide variety of joint and/or tube sizes may be provided throughout the vehicle chassis for various purposes. For instance, in an area where an a-pillar meets a vehicle floor, it may be difficult to achieve proper load-sharing between simple structures. This may lead to collapse of a foot-well region during frontal impacts. The mini-matrix structure may be provided for these regions, such that a smaller network of joints and tubes may be used to make a three-dimensional cage that may approximate a transition typically achieved only by stamping. This mini-matrix structure may weigh less, than the stamping structure which would make the whole interface out of a printed part. The mini-matrix may have other advantages over integration of sheet metal. Additional flexibility of design and assembly may be achieved. This mini-matrix may enable replacement of some stampings in traditional uni-body vehicles by transitioning to the joint-based system. The mini-matrix may fit into a wider variety of shapes or volumes than a larger matrix.

As previously discussed, the vehicle chassis may have a complex structural shape. In some locations, it may be difficult to assemble a vehicle body that requires tubes coming from multiple angles to a couple of different joints. It may be difficult to insert the tubes simultaneously, or the geometry may make it difficult for various parts (such as a final bar) to be inserted. It may be advantageous to have one or more connected (e.g., bolted, or adhered) members. The joints may include cross-members that may be bolted in a pin configuration. The joints may be attached (e.g., bolted, adhered) to one another in a way that may share significant surface area to better share load, and may provide reaction forces in multiple dimensions. Although bolting is described, joints may be connected to one another in any other manner. This may allow couple joints to potentially act as a single super-joint when in deformation. In some instances, some components may be pre-connected to the joints before the joints are attached to one another.

One or more components of the vehicle chassis may have a cord or other mechanism that may aid in restraining movement of portions during a crash. For instance, a cord made of a high strength material (e.g., Kevlar) may be integrated into a joint to control displacement of a fractured joint and/or chassis members in the event of a crash. The cord may restrain projection of chassis components to surrounding areas. The cord may be provided within the joint and/or provide a network of cords within the joint. The cord may or may not connect the joint to other components. In some instances, a cord may be routed through multiple components of a vehicle chassis or through an entirety of the vehicle chassis. The cord may prevent pieces connected to the cord from flying apart in the event of a crash. The cord may prevent other components from passing through the cord. For instance, if a piece is moving, the cord may catch the piece and prevent it from moving past the cord.

Optionally, path interference features in nodes may be provided that may dissipate energy from a crash through the production of heat. The path interference features may be print controlled. This features may be printed on the joint, thereby increasing surface area for possible interference and more energy dissipation. The features may be provided on an inner surface and/or outer surface of the joint. In some embodiments, the features may include components that may overlap. For instance, an inner component and an outer component may be provided, wherein the inner component may be capable of being within a portion of the outer component. For instance an inner joint may be provided within an outer joint, or a portion of a first joint (e.g., a first prong) may be provided within a portion of a second joint (e.g., second prong). In the event of a crash, the inner component may be pressed into the outer component. In some instances, a dampening effect may be provided as a result of this pressing motion. There may be interference features that may absorb some of the energy of the movement and convert it to heat. In some instances, the interference features may include direct contact, and a frictional fit may cause the pieces to scrape together and generate heat. In some instances, once the deformation has occurred, it is irreversible.

In some embodiments, the joints may be smart joints that may be outfitted with one or more sensors. The sensors may be internal to the joints and/or external to the joints. The sensors may be built into a joint structure, on an inner surface of a joint, or an outer surface of a joint. The sensors may be printed onto or into the joint. In some instances, the sensors may be attached to the joint. The joint may optionally have one or more printed features that may provide an attachment region for the sensors. The attachment region may have a geometry or other feature that may be specific to a corresponding sensor. Other components of the vehicle such as connecting tubes may optionally have sensors. Similarly, such sensors may be printed or otherwise integrally formed with the components, or may be attached to the components. The integrated joint sensors may detect movement of local components to help prevent major failures and/or notify users if a failure occurs (or if a failure condition is imminent). The sensors may detect structural failures and/or fluid leaks. The sensors may detect temperature. The sensors may help prevent combustion events. The sensors may be configured to collect and/or send information about the components' history (e.g., any crashes it's gone through, etc.) to a local or remote controller for storage and processing.

In some embodiments, the sensors may be integrated into the joint via a 3-D printing process. The sensor may be detect major failure of the joint or a tube. This may trigger certain actions by the vehicle. For instance, this may result in the trigger of airbags, active safety systems, fire suppression, and/or provide alerts. The alerts may indicate severity and/or type of failure to a driver. The driver may be prevented from driving the vehicle further if a likelihood of dangerous failure is high. An integrated sensor may determine whether a joint or other components of the vehicle are fit for service after a crash. If they are fit for service, the vehicle may be permitted to continue operation. If they are somewhat fit for service, the vehicle may be permitted limited functionality (e.g., limited types of function, limited speed, limited distance, limited time) so that a user can make it to a location for further testing and/or repair. If they are not fit for service, the vehicle may automatically shut down.

In some instances, inspection joints having sensors may be re-usable. In some instances, as long as a catastrophic failure is not detected for the joint, the joint with sensor may be reused.

In some embodiments, the sensors may include one or more electronic component. The sensors may be capable may be capable of generating a signal that may sent to a controller of the vehicle that make the determination whether the vehicle is fit for service. Alternatively, the signal may be sent to a remote controller or storage which may perform additional functions. The controller of a vehicle may focus on safety of the vehicle. Alternatively, the controller of the vehicle may perform additional functions, including those relating to the actual propulsion and/or driving of the vehicle.

Mechanical features may be printed into a joint that may indicate if the joint has experienced an event that may cause it to be no longer fit for service. This can indicate various conditions, including but not limited to, internal stress, pressure, temperature, forces (e.g., G's) experienced, etc. The mechanical features may optionally include physical features such as nubs or protrusions that may be visually apparent on the component. When the joint experiences particular conditions, the nubs or protrusions may become deformed, flattened, or sheared. Such mechanical effects may depend on magnitude and/or direction of the condition. In some instances, multiple mechanical features, such as multiple nubs or protrusions, may be provided and may be geared for different levels of magnitude and/or different directions so that depending on which mechanical features experience various mechanical effects, information about the conditions may be gathered. For instance, if a first nub is configured to be flattened when a crash magnitude exceeds a first threshold, and a second nub is configured to be flattened when a crash magnitude exceeds a second threshold greater than the first threshold, and only the first nub is flattened, then it may be determined that a crash occurred having a magnitude between the first threshold and the second threshold.

The mechanical features may provide information upon visual inspection. In some instances, the mechanical features may communicate with a controller that may send an alert to a user if the joint is no longer fit for service. The mechanical feature may send an electronic communication when the joint is no longer fit for service. The mechanical features may provide visual indication when the joint is no longer fit for service. In some instances, the mechanical features may provide a binary go/no-go indication for the joint and/or vehicle. Alternatively, they may provide details about the type of potential failure or effect on the joint.

In some embodiments, a component of the vehicle such as a joint or tube may be pressurized. A positive pressure joint or node may have a feature that may control release of pressure to additional chambers and/or to the atmosphere. The release to additional chambers may eventually end in release to the atmosphere. The joint and/or tube may be pressurized using a fluid (e.g., gaseous fluid, liquid fluid). The feature that may control the release of the pressure may be an integrated printed feature on the joint. The feature may be provided on an external or internal portion of the joint. In some instances, the feature may include permeable or semi-permeable surfaces, valves, conduits, pumps, or any other features. In some instances, the pressure may be used to dissipate energy along a controlled path.

A pressurized gas may also be used as an indicator of a failure in the chassis of the vehicle. For instance, the vehicle chassis and/or components of the vehicle chassis may be filled with a pressurized gas. Any loss in pressure may indicate a structural problem. For instance, if the joints are filled with pressurized gas, and a loss of pressure is detected in one of the joints, that joint may have a leak caused by a crack or another structural problem.

In some embodiments, the vehicle chassis and/or components of the vehicle chassis may be filled with a lighter-than-air gas. The gas may be an inert gas. The gas may be a gas not that is not prone to being flammable. For instance, the vehicle chassis and/or components may be filled with helium. This may be useful to reduce the weight of the vehicle. Reducing the weight of the vehicle may be useful when the vehicle is an aerial vehicle. This may improve the fuel efficiency of the vehicle. The gas may be filled at a positive pressures, or may be at ambient pressure.

In another example, the vehicle chassis and/or components of the vehicle chassis may be filled with fuel. The fuel may be a liquid fuel or a gaseous fuel for the vehicle. The fuel may be gasoline. The fuel may be a diesel fuel. The fuel may be a compressed natural gas (CNG).

One or more sensors may be configured to detect a leak of a fluid within a vehicle chassis and/or any components of the vehicle (e.g., joint, tube). For instance, an unexpected drop of pressure within a pressurized component of the vehicle may be detected. Leaks from various portions of the vehicle may be detected and/or indicated to a controller or a user.

A 3-D printing method of joint fabrication may be a high efficiency manufacturing process. A single set of equipment may be configured to generate a variety of joint geometries with varying detailed features. The production may have lower time and cost requirements compared to traditional manufacturing methods, furthermore the process may be easily scaled from small volume production to large volume production. The process may provide superior quality control over traditional manufacturing methods which may reduce waste associated with misshapen parts and the time required to re-make parts which may not meet a standard of quality control.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A vehicle chassis support component comprising:
    at least one vehicle tube comprising:
        an inner surface defining an interior of the vehicle tube; and
        a 3-D printed internal structure within the interior and extending to contact the inner surface at multiple locations distributed about a perimeter thereof for at least a section of the at least one vehicle tube;
    at least one 3-D printed node comprising one or more tube mounting features coupled to a first portion of the at least one vehicle tube;
        wherein at least a second portion of the at least one vehicle tube is configured to connect with one or more other nodes coupled to other structural members of a vehicle, and
    at least one panel connected to one of the at least one 3-D printed node, the one or more other nodes, or the at least one vehicle tube, the at least one panel comprising a 3-D printed internal structure sandwiched between a pair of sheets;
        wherein the 3-D printed internal structure of the at least one panel is exposed through a portion of the at least one panel.

2. The vehicle chassis support component of claim 1, wherein the inner surface encloses the 3-D printed internal structure of the vehicle tube to form the inner surface of the vehicle tube.

3. The vehicle chassis support component of claim 1, wherein the one or more other nodes comprise at least a joint member having one or more connecting features to be mated with the vehicle chassis support component.

4. The vehicle chassis support component of claim 3, wherein the at least one joint member comprises a 3-D printed joint member.

* * * * *